(12) United States Patent
Shrivastava et al.

(10) Patent No.: US 11,445,025 B2
(45) Date of Patent: Sep. 13, 2022

(54) APPLICATIONS FOR CONTROLLING OPTICALLY SWITCHABLE DEVICES

(71) Applicant: View, Inc., Milpitas, CA (US)

(72) Inventors: Dhairya Shrivastava, Los Altos, CA (US); Todd Marques, Pleasanton, CA (US); Stephen C. Brown, San Mateo, CA (US)

(73) Assignee: View, Inc., Milpitas, CA (US)

( * ) Notice: Subject to any disclaimer, the term of this patent is extended or adjusted under 35 U.S.C. 154(b) by 275 days.

(21) Appl. No.: 16/527,554

(22) Filed: Jul. 31, 2019

(65) Prior Publication Data

US 2019/0353972 A1    Nov. 21, 2019

Related U.S. Application Data

(63) Continuation of application No. 16/438,177, filed on Jun. 11, 2019, which is a continuation of application
(Continued)

(51) Int. Cl.
*H04L 67/125* (2022.01)
*G02F 1/163* (2006.01)
(Continued)

(52) U.S. Cl.
CPC ............ *H04L 67/125* (2013.01); *G02F 1/163* (2013.01); *G08C 17/02* (2013.01); *G08C 23/04* (2013.01);
(Continued)

(58) Field of Classification Search
CPC ......... E06B 2009/2464; H04L 12/2803; H04L 67/125; G06Q 10/06; H04Q 9/00; G08C 2201/93; G06F 9/06; G02F 1/163
(Continued)

(56) References Cited

U.S. PATENT DOCUMENTS 4,129,861 A    12/1978 Giglia
4,553,085 A    11/1985 Canzano
(Continued)

FOREIGN PATENT DOCUMENTS

CN    1161092 A    10/1997
CN    1311935 A    9/2001
(Continued)

OTHER PUBLICATIONS

U.S. Final Office Action dated Jan. 27, 2014 in U.S. Appl. No. 13/479,137.
(Continued)

*Primary Examiner* — Kristina M Deherrera
(74) *Attorney, Agent, or Firm* — Weaver Austin Villeneuve & Sampson LLP; Brian D. Griedel

(57) ABSTRACT

Software applications are used for controlling the optical state of one or more optically switchable windows or other optical products installed in a structure such as building. The applications permit users to send and/or receive data and/or commands for controlling the switchable optical products. In some embodiments, the applications provide an interface with a window network controller, which directly or indirectly controls windows in a structure. Relevant processing involving the application may include user authentication, commissioning, adaptive control, and decisions on whether to permit an action or change requested by a user. In some embodiments, the application allows users to directly control the tint state of one or more tintable windows. In some embodiments, the application allows users to change a rule or property associated with controlling a switchable optical product.

20 Claims, 37 Drawing Sheets

Related U.S. Application Data

No. 14/391,122, filed as application No. PCT/US2013/036456 on Apr. 12, 2013, now Pat. No. 10,365,531.

(60) Provisional application No. 61/624,175, filed on Apr. 13, 2012.

(51) Int. Cl.
    *G08C 17/02*     (2006.01)
    *G08C 23/04*     (2006.01)
    *H04Q 9/00*     (2006.01)

(52) U.S. Cl.
    CPC ........... *H04Q 9/00* (2013.01); *G08C 2201/40* (2013.01); *G08C 2201/93* (2013.01)

(58) Field of Classification Search
    USPC ................ 359/265–275, 277, 245–247, 242; 709/231; 700/299; 250/70; 438/929; 345/49, 105, 107; 348/814, 817; 349/182–186
See application file for complete search history.

(56) References Cited

U.S. PATENT DOCUMENTS

| | | |
|---|---|---|
| 5,384,653 A | 1/1995 | Benson et al. |
| 5,416,617 A | 5/1995 | Loiseaux et al. |
| 5,440,317 A | 8/1995 | Jalloul et al. |
| 5,477,152 A | 12/1995 | Hayhurst |
| 5,579,149 A | 11/1996 | Moret et al. |
| 6,039,390 A | 3/2000 | Agrawal et al. |
| 6,055,089 A | 4/2000 | Schulz et al. |
| 6,066,801 A | 5/2000 | Kodaira et al. |
| 6,262,831 B1 | 7/2001 | Bauer et al. |
| 6,344,748 B1 | 2/2002 | Gannon |
| 6,407,847 B1 | 6/2002 | Poll et al. |
| 6,567,708 B1 | 5/2003 | Bechtel et al. |
| 6,707,590 B1 | 3/2004 | Bartsch |
| 6,897,936 B1 | 5/2005 | Li et al. |
| 6,965,813 B2 | 11/2005 | Granqvist et al. |
| 7,133,181 B2 | 11/2006 | Greer |
| 7,684,105 B2 | 3/2010 | Lamontagne et al. |
| 7,800,812 B2 | 9/2010 | Moskowitz |
| 7,941,245 B1 | 5/2011 | Popat |
| 8,149,756 B2 | 4/2012 | Hottinen |
| 8,213,074 B1 | 7/2012 | Shrivastava et al. |
| 8,254,013 B2 | 8/2012 | Mehtani et al. |
| 8,705,162 B2 | 4/2014 | Brown et al. |
| 8,843,238 B2 | 9/2014 | Wenzel et al. |
| 8,976,440 B2 | 3/2015 | Berland et al. |
| 9,081,246 B2 | 7/2015 | Rozbicki |
| 9,128,346 B2 | 9/2015 | Shrivastava et al. |
| 9,170,008 B2 | 10/2015 | Reul et al. |
| 9,225,286 B1 | 12/2015 | Tweedie |
| 9,300,581 B1 | 3/2016 | Hui et al. |
| 9,442,338 B2 | 9/2016 | Uhm et al. |
| 9,442,341 B2 | 9/2016 | Shrivastava et al. |
| 9,470,947 B2 | 10/2016 | Nagel et al. |
| 9,494,055 B2 | 11/2016 | Rusche |
| 9,551,913 B2 | 1/2017 | Kim et al. |
| 9,677,327 B1 | 6/2017 | Nagel et al. |
| 9,690,174 B2 | 6/2017 | Wang |
| 9,709,869 B2 | 7/2017 | Baumann et al. |
| 9,740,074 B2 | 8/2017 | Agrawal et al. |
| 9,778,533 B2 | 10/2017 | Bertolini |
| 9,898,912 B1 | 2/2018 | Jordan, II et al. |
| 9,946,138 B2 | 4/2018 | Shrivastava et al. |
| 10,001,691 B2 | 6/2018 | Shrivastava et al. |
| 10,137,764 B2 | 11/2018 | Driscoll et al. |
| 10,268,098 B2 | 4/2019 | Shrivastava et al. |
| 10,286,839 B1 | 5/2019 | Mazuir et al. |
| 10,288,971 B2 | 5/2019 | Phillips et al. |
| 10,303,035 B2 | 5/2019 | Brown et al. |
| 10,329,839 B2 | 6/2019 | Fasi et al. |
| 10,387,221 B2 | 8/2019 | Shrivastava et al. |
| 10,409,652 B2 | 9/2019 | Shrivastava et al. |
| 10,481,459 B2 | 11/2019 | Shrivastava et al. |
| 10,488,837 B2 | 11/2019 | Cirino |
| 10,514,963 B2 | 12/2019 | Shrivastava et al. |
| 10,720,766 B2 | 7/2020 | Krammer et al. |
| 10,746,761 B2 | 8/2020 | Rayman et al. |
| 10,747,082 B2 | 8/2020 | Shrivastava et al. |
| 10,768,582 B2 | 9/2020 | Shrivastava et al. |
| 10,859,983 B2 | 12/2020 | Shrivastava et al. |
| 10,917,259 B1 | 2/2021 | Chein et al. |
| 10,921,675 B2 | 2/2021 | Barnum et al. |
| 10,949,267 B2 | 3/2021 | Shrivastava et al. |
| 10,954,677 B1 | 3/2021 | Scanlin |
| 10,956,231 B2 | 3/2021 | Shrivastava et al. |
| 10,989,977 B2 | 4/2021 | Shrivastava et al. |
| 11,016,357 B2 | 5/2021 | Brown et al. |
| 11,054,792 B2 | 7/2021 | Shrivastava et al. |
| 11,073,800 B2 | 7/2021 | Shrivastava et al. |
| 11,150,616 B2 | 10/2021 | Shrivastava et al. |
| 2002/0027504 A1 | 3/2002 | Davis et al. |
| 2002/0149829 A1 | 10/2002 | Mochizuka et al. |
| 2003/0169574 A1 | 9/2003 | Maruyama et al. |
| 2003/0191546 A1 | 10/2003 | Bechtel et al. |
| 2003/0227663 A1 | 12/2003 | Agrawal et al. |
| 2004/0001056 A1 | 1/2004 | Atherton et al. |
| 2004/0215520 A1 | 10/2004 | Butler et al. |
| 2005/0270620 A1 | 12/2005 | Bauer et al. |
| 2005/0270621 A1 | 12/2005 | Bauer et al. |
| 2006/0018000 A1 | 1/2006 | Greer |
| 2006/0107616 A1 | 5/2006 | Ratti et al. |
| 2006/0174333 A1 | 8/2006 | Thomas et al. |
| 2006/0279527 A1 | 12/2006 | Zehner et al. |
| 2007/0053053 A1 | 3/2007 | Moskowitz |
| 2007/0067048 A1 | 3/2007 | Bechtel et al. |
| 2007/0285759 A1 | 12/2007 | Ash et al. |
| 2008/0042012 A1 | 2/2008 | Callahan et al. |
| 2008/0043316 A2 | 2/2008 | Moskowitz |
| 2008/0048101 A1 | 2/2008 | Romig et al. |
| 2008/0147847 A1 | 6/2008 | Pitkow et al. |
| 2008/0186562 A2 | 8/2008 | Moskowitz |
| 2008/0211682 A1 | 9/2008 | Hyland et al. |
| 2008/0238706 A1 | 10/2008 | Kenwright |
| 2009/0271042 A1 | 10/2009 | Voysey |
| 2009/0323160 A1 | 12/2009 | Egerton et al. |
| 2010/0039410 A1 | 2/2010 | Becker et al. |
| 2010/0172010 A1 | 7/2010 | Gustavsson et al. |
| 2010/0188057 A1 | 7/2010 | Tamg |
| 2010/0228854 A1 | 9/2010 | Morrison et al. |
| 2010/0243427 A1 | 9/2010 | Kozlowski et al. |
| 2010/0245973 A1 | 9/2010 | Wang et al. |
| 2010/0274366 A1 | 10/2010 | Fata et al. |
| 2010/0315693 A1 | 12/2010 | Lam et al. |
| 2011/0050756 A1 | 3/2011 | Cassidy et al. |
| 2011/0071685 A1 | 3/2011 | Huneycutt et al. |
| 2011/0097081 A1 | 4/2011 | Gupta et al. |
| 2011/0148218 A1 | 6/2011 | Rozbicki |
| 2011/0164317 A1 | 7/2011 | Verghol et al. |
| 2012/0026573 A1 | 2/2012 | Collins et al. |
| 2012/0033287 A1 | 2/2012 | Friedman et al. |
| 2012/0062975 A1 | 3/2012 | Mehtani et al. |
| 2012/0086363 A1 | 4/2012 | Golding et al. |
| 2012/0140492 A1 | 6/2012 | Alvarez |
| 2012/0188627 A1 | 7/2012 | Chen et al. |
| 2012/0190386 A1 | 7/2012 | Anderson |
| 2012/0194895 A1 | 8/2012 | Podbelski et al. |
| 2012/0229275 A1 | 9/2012 | Mattern |
| 2012/0235493 A1 | 9/2012 | Kiuchi et al. |
| 2012/0239209 A1 | 9/2012 | Brown et al. |
| 2012/0259583 A1 | 10/2012 | Noboa et al. |
| 2012/0293855 A1 | 11/2012 | Shrivastava et al. |
| 2013/0013921 A1 | 1/2013 | Bhathena et al. |
| 2013/0060357 A1 | 3/2013 | Li et al. |
| 2013/0085614 A1 | 4/2013 | Wenzel et al. |
| 2013/0085615 A1 | 4/2013 | Barker |
| 2013/0085616 A1 | 4/2013 | Wenzel et al. |
| 2013/0088331 A1 | 4/2013 | Cho et al. |
| 2013/0131869 A1 | 5/2013 | Majewski et al. |

(56) References Cited

U.S. PATENT DOCUMENTS

| | | |
|---|---|---|
| 2013/0157493 A1 | 6/2013 | Brown |
| 2013/0158790 A1 | 6/2013 | McIntyre, Jr. et al. |
| 2013/0182308 A1 | 7/2013 | Guarr et al. |
| 2013/0196600 A1 | 8/2013 | Capers et al. |
| 2013/0241299 A1 | 9/2013 | Snyker et al. |
| 2013/0243425 A1 | 9/2013 | Franklin |
| 2013/0271812 A1 | 10/2013 | Brown et al. |
| 2013/0271813 A1 | 10/2013 | Brown |
| 2013/0271814 A1 | 10/2013 | Brown |
| 2013/0278989 A1 | 10/2013 | Lam et al. |
| 2014/0156097 A1 | 6/2014 | Nesler et al. |
| 2014/0160550 A1 | 6/2014 | Brown et al. |
| 2014/0170863 A1 | 6/2014 | Brown |
| 2014/0172557 A1 | 6/2014 | Eden et al. |
| 2014/0182350 A1 | 7/2014 | Bhavaraju et al. |
| 2014/0236323 A1 | 8/2014 | Brown et al. |
| 2014/0274458 A1 | 9/2014 | Kronenberg et al. |
| 2014/0300945 A1 | 10/2014 | Parker |
| 2014/0303788 A1 | 10/2014 | Sanders et al. |
| 2014/0330538 A1 | 11/2014 | Conklin et al. |
| 2014/0347190 A1 | 11/2014 | Grimm |
| 2014/0349497 A1 | 11/2014 | Brown et al. |
| 2014/0367057 A1 | 12/2014 | Feldstein |
| 2014/0368899 A1 | 12/2014 | Greer |
| 2014/0371931 A1 | 12/2014 | Lin et al. |
| 2015/0002919 A1 | 1/2015 | Jack et al. |
| 2015/0023661 A1 | 1/2015 | Borkenhagen et al. |
| 2015/0098121 A1 | 4/2015 | Turnbull et al. |
| 2015/0116811 A1 | 4/2015 | Shrivastava et al. |
| 2015/0120297 A1 | 4/2015 | Meruva |
| 2015/0129140 A1 | 5/2015 | Dean et al. |
| 2015/0003822 A1 | 6/2015 | Fukada et al. |
| 2015/0160525 A1 | 6/2015 | Shi |
| 2015/0378230 A1 | 12/2015 | Gudmunson et al. |
| 2015/0378231 A1 | 12/2015 | Greer et al. |
| 2016/0070151 A1 | 3/2016 | Shrivastava et al. |
| 2016/0109778 A1 | 4/2016 | Shrivastava et al. |
| 2016/0134932 A1 | 5/2016 | Karp et al. |
| 2016/0154290 A1 | 6/2016 | Brown et al. |
| 2016/0202589 A1 | 7/2016 | Nagel et al. |
| 2016/0203403 A1 | 7/2016 | Nagel et al. |
| 2016/0225832 A1 | 8/2016 | Kwon et al. |
| 2017/0063429 A1 | 3/2017 | Flask |
| 2017/0075323 A1 | 3/2017 | Shrivastava et al. |
| 2017/0082903 A1 | 3/2017 | Vigano et al. |
| 2017/0097259 A1 | 4/2017 | Brown et al. |
| 2017/0139301 A1 | 5/2017 | Messere et al. |
| 2017/0197494 A1 | 7/2017 | Li |
| 2017/0200424 A1 | 7/2017 | Xu et al. |
| 2017/0212400 A1 | 7/2017 | Shrivastava et al. |
| 2017/0234067 A1 | 8/2017 | Fasi et al. |
| 2017/0251488 A1 | 8/2017 | Urban et al. |
| 2017/0253801 A1 | 9/2017 | Bae et al. |
| 2017/0279930 A1 | 9/2017 | Zhang |
| 2017/0285432 A1 | 10/2017 | Shrivastava et al. |
| 2017/0285433 A1 | 10/2017 | Shrivastava et al. |
| 2017/0347129 A1 | 11/2017 | Levi et al. |
| 2017/0364395 A1 | 12/2017 | Shrivastava et al. |
| 2018/0090992 A1 | 3/2018 | Shrivastava et al. |
| 2018/0129172 A1 | 5/2018 | Shrivastava et al. |
| 2018/0144712 A1 | 5/2018 | Threlkel et al. |
| 2018/0189117 A1 | 7/2018 | Shrivastava et al. |
| 2018/0267380 A1 | 9/2018 | Shrivastava et al. |
| 2018/0284555 A1 | 10/2018 | Klawuhn et al. |
| 2018/0335939 A1 | 11/2018 | Karunamuni et al. |
| 2019/0155122 A1 | 5/2019 | Brown et al. |
| 2019/0235451 A1 | 8/2019 | Shrivastava et al. |
| 2019/0271895 A1 | 9/2019 | Shrivastava et al. |
| 2019/0331978 A1 | 10/2019 | Shrivastava et al. |
| 2019/0347141 A1 | 11/2019 | Shrivastava et al. |
| 2019/0384652 A1 | 12/2019 | Shrivastava et al. |
| 2020/0041963 A1 | 2/2020 | Shrivastava et al. |
| 2020/0041967 A1 | 2/2020 | Shrivastava et al. |
| 2020/0057421 A1 | 2/2020 | Trikha et al. |
| 2020/0103841 A1 | 4/2020 | Pillai et al. |
| 2020/0150508 A1 | 5/2020 | Patterson et al. |
| 2020/0387041 A1 | 12/2020 | Shrivastava et al. |
| 2021/0165696 A1 | 6/2021 | Shrivastava et al. |
| 2021/0191221 A1 | 6/2021 | Shrivastava et al. |
| 2021/0232015 A1 | 7/2021 | Brown et al. |
| 2021/0246719 A1 | 8/2021 | Shrivastava et al. |
| 2021/0373511 A1 | 12/2021 | Shrivastava et al. |
| 2022/0011729 A1 | 1/2022 | Shrivastava et al. |
| 2022/0121078 A1 | 4/2022 | Vollen et al. |
| 2022/0159077 A1 | 5/2022 | Shrivastava et al. |
| 2022/0171248 A1 | 6/2022 | Shrivastava et al. |
| 2022/0179275 A1 | 6/2022 | Patterson et al. |

FOREIGN PATENT DOCUMENTS

| | | |
|---|---|---|
| CN | 1692348 A | 11/2005 |
| CN | 1723658 A | 1/2006 |
| CN | 101154104 A | 4/2008 |
| CN | 101253460 A | 8/2008 |
| CN | 101501757 A | 8/2009 |
| CN | 101510078 A | 8/2009 |
| CN | 102414601 A | 4/2012 |
| CN | 102598469 A | 7/2012 |
| CN | 202443309 U | 9/2012 |
| CN | 103051737 A | 4/2013 |
| CN | 203019761 U | 6/2013 |
| CN | 103238107 A | 8/2013 |
| CN | 103327126 A | 9/2013 |
| CN | 103345236 A | 10/2013 |
| CN | 103547965 A | 1/2014 |
| CN | 103649826 A | 3/2014 |
| CN | 103842735 A | 6/2014 |
| CN | 103987909 A | 8/2014 |
| CN | 104335595 A | 2/2015 |
| CN | 105143586 A | 12/2015 |
| CN | 106125444 A | 11/2016 |
| CN | 106462023 A | 2/2017 |
| CN | 106575064 A | 4/2017 |
| CN | 107850815 A | 3/2018 |
| EP | 0917667 A1 | 5/1999 |
| EP | 1929701 A2 | 6/2008 |
| EP | 2357544 | 8/2011 |
| EP | 2648086 A2 | 10/2013 |
| EP | 2764998 A1 | 8/2014 |
| EP | 2357544 B1 | 10/2014 |
| EP | 3015915 A1 | 5/2016 |
| EP | 2837205 B1 | 2/2017 |
| EP | 3293941 A1 | 3/2018 |
| EP | 3352053 A1 | 7/2018 |
| JP | H10215492 A | 8/1998 |
| JP | H11500838 A | 1/1999 |
| JP | 2003284160 A | 10/2003 |
| JP | 2006287729 A | 10/2006 |
| JP | 2007156909 A | 6/2007 |
| JP | 2012533060 A | 12/2012 |
| JP | 2018507337 A | 3/2018 |
| KR | 19990088613 A | 12/1999 |
| KR | 20030040361 A | 5/2003 |
| KR | 20030073121 A | 9/2003 |
| KR | 20090066107 A | 6/2009 |
| KR | 10-2012-0045915 | 5/2012 |
| KR | 20120117409 A | 10/2012 |
| KR | 20130023668 A | 3/2013 |
| KR | 101323668 B1 | 11/2013 |
| KR | 10-2014-0004175 A | 1/2014 |
| KR | 10-1346862 B | 1/2014 |
| KR | 10-1799323 B1 | 11/2017 |
| RU | 104808 U1 | 5/2011 |
| RU | 2012107324 A | 9/2013 |
| TW | 200532346 A | 10/2005 |
| TW | 201029838 A | 8/2010 |
| TW | 201635840 A | 10/2016 |
| TW | I607269 B | 12/2017 |
| WO | WO-03092309 A1 | 11/2003 |
| WO | WO2012/079159 | 6/2012 |
| WO | WO-2012125332 A2 | 9/2012 |
| WO | WO-2012125348 A2 | 9/2012 |
| WO | WO-2013046112 A1 | 4/2013 |
| WO | WO2013/155467 A1 | 10/2013 |

(56) References Cited

FOREIGN PATENT DOCUMENTS

| WO | WO-2013158464 A1 | 10/2013 |
| --- | --- | --- |
| WO | WO2013/177575 A1 | 11/2013 |
| WO | WO-2014059268 A2 | 4/2014 |
| WO | WO2014/082092 | 5/2014 |
| WO | WO2014/121809 | 8/2014 |
| WO | WO-2014130471 A1 | 8/2014 |
| WO | WO2015/051262 A1 | 4/2015 |
| WO | WO2015/134789 | 9/2015 |
| WO | WO2016/004109 | 1/2016 |
| WO | WO2016/085964 | 6/2016 |
| WO | WO2016/094445 | 6/2016 |
| WO | WO2016/183059 A1 | 11/2016 |
| WO | WO2017/007841 A1 | 1/2017 |
| WO | WO2017/075059 | 5/2017 |
| WO | WO2017/189618 A1 | 11/2017 |
| WO | WO-2018067377 A1 | 4/2018 |
| WO | WO2018/200702 A1 | 11/2018 |
| WO | WO2018/200740 A1 | 11/2018 |
| WO | WO2018/200752 A1 | 11/2018 |
| WO | WO-2019203931 A1 | 10/2019 |
| WO | WO-2020172187 A1 | 8/2020 |
| WO | WO-2020185941 A1 | 9/2020 |

OTHER PUBLICATIONS

U.S. Final Office Action dated Feb. 26, 2015 in U.S. Appl. No. 13/479,137.
U.S. Notice of Allowance dated May 14, 2015 in U.S. Appl. No. 13/479,137.
U.S. Notice of Allowance (supplemental) dated Jun. 12, 2015 in U.S. Appl. No. 13/479,137.
U.S. Office Action dated Sep. 23, 2013 in U.S. Appl. No. 13/479,137.
U.S. Office Action dated Jul. 3, 2014 in U.S. Appl. No. 13/479,137.
U.S. Final Office Action dated Sep. 19, 2016 in U.S. Appl. No. 14/887,178.
U.S. Final Office Action dated Mar. 17, 2017 in U.S. Appl. No. 14/887,178.
U.S. Notice of Allowance dated Mar. 9, 2018 in U.S. Appl. No. 14/887,178.
U.S. Office Action dated Mar. 25, 2016 in U.S. Appl. No. 14/887,178.
U.S. Office Action dated Oct. 23, 2017 in U.S. Appl. No. 14/887,178.
U.S. Notice of Allowance dated Dec. 13, 2018 in U.S. Appl. No. 15/978,029.
U.S. Office Action dated Jul. 24, 2018 in U.S. Appl. No. 15/978,029.
U.S. Office Action dated Aug. 22, 2019 in U.S. Appl. No. 16/298,776.
U.S. Office Action dated Aug. 21, 2019 in U.S. Appl. No. 16/508,099.
U.S. Final Office Action dated Mar. 15, 2018 in U.S. Appl. No. 14/951,410 1.
U.S. Notice of Allowance dated Oct. 22, 2018 in U.S. Appl. No. 14/951,410.
U.S. Office Action dated Sep. 11, 2017 in U.S. Appl. No. 14/951,410.
U.S. Office Action Jul. 25, 2019 in U.S. Appl. No. 16/253,971.
U.S. Notice of Allowance dated Nov. 28, 2018 in U.S. Appl. No. 15/123,069.
U.S. Notice of Allowance dated Jul. 17, 2019 in U.S. Appl. No. 15/123,069.
U.S. Office Action dated Apr. 27, 2018 in U.S. Appl. No. 15/123,069.
Preliminary Amendment dated Jan. 18, 2017 in U.S. Appl. No. 15/123,069.
U.S. Office Action dated Feb. 7, 2019 in U.S. Appl. No. 15/623,237.
U.S. Final Office Action dated Jul. 3, 2019 in U.S. Appl. No. 15/623,237.
U.S. Office Action dated Feb. 7, 2019 in U.S. Appl. No. 15/691,468.
U.S. Final Office Action dated Jul. 2, 2019 in U.S. Appl. No. 15/691,468.
U.S. Notice of Allowance dated Mar. 20, 2019 in U.S. Appl. No. 15/320,725.
U.S. Notice of Allowance (corrected) dated Apr. 18, 2019 in U.S. Appl. No. 15/350,725.
U.S. Office Action dated Sep. 4, 2018 in U.S. Appl. No. 15/320,725.
U.S. Notice of Allowance dated Jul. 17, 2019 in U.S. Appl. No. 15/320,725.
U.S. Final Office Action dated Jan. 31, 2019 in U.S. Appl. No. 15/534,175.
U.S. Notice of Allowance dated Apr. 17, 2019 in U.S. Appl. No. 15/534,175.
U.S. Notice of Allowance dated Jul. 25, 2019 in U.S. Appl. No. 15/534,175.
U.S. Office Action dated Jul. 6, 2018 in U.S. Appl. No. 15/534,175.
U.S. Office Action dated Feb. 4, 2019 in U.S. Appl. No. 15/623,235.
U.S. Notice of Allowance dated May 14, 2019 in U.S. Appl. No. 15/623,235.
U.S. Notice of Allowance dated Dec. 14, 2018 in U.S. Appl. No. 15/910,936.
U.S. Notice of Allowance dated Apr. 17, 2019 in U.S. Appl. No. 15/910,936.
U.S. Office Action dated Aug. 7, 2018 in U.S. Appl. No. 15/910,936.
Taiwanese Office Action dated Dec. 12, 2018 in TW Application No. 10712150.
CN Office Action dated Aug. 28, 2018 in CN Application No. 201580070776.3.
CN Office Action dated Mar. 19, 2019 in CN Application No. 201580070776.3.
EP Extended Search Report dated Nov. 8, 2018 in EP Application No. 15863112.7.
International Preliminary Report on Patentability dated Jun. 8, 2017 in PCT/US2015/062480.
International Search Report and Written Opinion dated Feb. 15, 2016 in PCT/US2015/062480.
CN Office Action dated Feb. 2, 2019 in CN Application No. 201580015979.2.
CN Office Action dated Aug. 16, 2019 in CN Application No. 201580015979.2.
EP Extended Report dated Jun. 19, 2017 in EP Application No. 15758538.1.
EP Office Action dated Aug. 21, 2018 in EP Application No. 15758538.1.
RU Office Action dated Sep. 24, 2018 in RU Application No. 2016139012.
International Preliminary Report on Patentability dated Sep. 15, 2016 in Application No. PCT/US2015/019031.
International Search Report and Written Opinion dated May 29, 2015 in Application No. PCT/US2015/019031.
EP Extended Search Report dated Feb. 15, 2018 in EP Application No. 15814233.1.
EP Examination Report dated Mar. 4, 2019 in EP Application No. 15814233.1.
International Preliminary Report on Patentability dated Jan. 12, 2017 in PCT Application No. PCT/US15/38667.
International Search Report and Written Opinion dated Oct. 16, 2015 in PCT Application No. PCT/US15/38667.
EP Extended Search Report dated Jun. 5, 2018 in EP Application No. 15868003.3.
International Preliminary Report on Patentability dated Jun. 22, 2017 in PCT Application No. PCT/US15/64555.
International Search Report and Written Opinion dated Oct. 16, 2015 in PCT Application No. PCT/US15/64555.
Russian Office Action dated Mar. 9, 2017 in RU Application No. 2014145565.
International Premliminary Report on Patentability dated Apr. 18, 2019 in PCT Application No. PCT/US17/54120.
International Search Report and Written Opinion (ISA/KR) dated Jan. 9, 2018 in PCT Application No. PCT/US17/54120.
International Search Report and Written Opinion dated Nov. 16, 2018 in PCT Application No. PCT/US2018/029460.
International Search Report and Written Opinion dated Oct. 15, 2018 in PCT Application No. PCT/US2018/029406.
Taiwanese Office Action dated May 13, 2019 in TW Application No. 104139217.
APC by Schneider Electric, Smart-UPS 120V Product Brochure, 2013, 8 pp.

(56) References Cited

OTHER PUBLICATIONS

National Aeronautics & Space Administration, "Cloud Remote Sensing and Modeling," (undated) [http://atmospheres.gsfc.nasa.gov/climate/index.php?section=134].
Kipp & Zonen, "Solar Radiation" (undated) [http://www.kippzonen.com/Knowledge-Center/Theoretical-info/Solar-Radiation].
Duchon, Claude E. et al., "Estimating Cloud Type from Pyranometer Observations," Journal of Applied Meteorology, vol. 38, Jan. 1999, pp. 132-141.
"SageGlass Unplugged™—wireless dynamic glass", 2014, 2 pages.
"Ossia Wireless Charging", screenshot and picture of Cota device, accessed Apr. 20, 2015, 1 page.
"SageGlass Mobile App" screenshot, accessed Aug. 28, 2015, 1 page.
"Sage Product Highlights" screenshot, accessed Aug. 28, 2015, 1 page.
"SageGlass Unplugged" screenshot, accessed Aug. 28, 2015, 1 page.
U.S. Appl. No. 16/338,403, filed Mar. 29, 2019, Shrivastava et al.
U.S. Appl. No. 16/508,099, filed Jul. 10, 2019, Shrivastava et al.
U.S. Appl. No. 16/523,624, filed Jul. 26, 2019, Shrivastava et al.
U.S. Appl. No. 16/555,377, filed Aug. 29, 2019, Shrivastava et al.
International Search Report and Written Opinion dated Jul. 11, 2019 in PCT Application No. PCT/US2019/030467.
AU Office Action dated Jan. 11, 2022, in Application No. AU2021201145.
AU Office action dated Apr. 4, 2022, in AU Application No. AU2020226999.
AU Office action dated Oct. 22, 2021, in AU Application No. AU2020226999.
Australian Examination Report dated Dec. 24, 2019 in AU Application No. 2015227056.
Australian Examination Report dated Mar. 2, 2020 in AU Application No. 2015353569.
Australian Office Action dated Aug. 10, 2020 in AU Application No. 2015360714.
Australian Office Action dated Aug. 9, 2021 in AU Application No. 2015360714.
Australian Office Action dated Dec. 4, 2020 in AU Application No. 2015360714.
Australian Office Action dated Jun. 4, 2021 in AU Application No. 2015360714.
Byun, J. et al., "Development of a Self-adapting Intelligent System for Building Energy Saving and Context-aware Smart Services", IEEE Transactions on Consumer Electronics, Feb. 2011, vol. 57, No. 1, pp. 90-98.
CA Office Action dated Dec. 13, 2021, in Application No. CA2970300.
CA Office Action dated Dec. 23, 2021, in Application No. CA2941526.
Cecilio, J., et al., "A configurable middleware for processing heterogenous industrial intelligent sensors," IEEE 16th International Conference on Intelligent Engineering Systems (INES), Jun. 15, 2012, pp. 145-149.
Chen, H. et al. "The Design and Implementation of a Smart Building Control System", 2009 IEEE International Conference on e-Business Engineering, pp. 255-262.
CN Office Action dated Dec. 29, 2021, in application No. 202010466929.9 with English translation.
CN Notice of Allowance with Supplemental Search Report (w/translation) dated Mar. 1, 2021 in CN Application No. 201580040461.4.
CN Office Action dated Dec. 1, 2021, in application No. CN201780069604 with English translation.
CN Office Action dated Feb. 3, 2020 in CN Application No. 201580072749.X.
CN Office Action dated Jan. 15, 2020 in CN Application No. 201580015979.2.
CN Office Action dated Jun. 29, 2021 in CN Application No. 202010466929.9.
CN Office Action dated Jun. 3, 2020 in CN Application No. 201580015979.2.
CN Office Action dated Jun. 3, 2021 in CN Application No. 201580072749.X.
CN Office Action dated Mar. 2, 2022, in Application No. CN201880037591.6 with English translation.
CN Office Action dated Mar. 8, 2021 in CN Application No. 201580072749.X.
CN Office Action dated Mar. 9, 2020 in CN Application No. 201580040461.4.
CN Office Action dated Nov. 12, 2021, in Application No. CN20158072749 with English translation.
CN Office Action dated Oct. 21, 2020 in CN Application No. 201580040461.4.
CN Office Action dated Oct. 9, 2019 in CN Application No. 201580070776.3.
CN Office Action dated Sep. 30, 2020 in CN Application No. 201580072749.X.
Co-pending U.S. Appl. No. 17/453,469, filed Nov. 3, 2021.
Co-pending U.S. Appl. No. 17/609,671, filed Nov. 8, 2021.
EP Extended European Search Report dated Sep. 14, 2021, in the application EP21182449.7.
EP Extended Search Report dated Dec. 17, 2019 in EP Application No. 19202054.
EP Extended Search Report dated Nov. 11, 2020 in EP Application No. 18791117.7.
EP Extended Search Report dated Nov. 28, 2019 in EP Application No. 19188907.0.
EP Extended Search Report dated Oct. 1, 2020 in EP Application No. 17858928.9.
EP Office Action dated Jan. 17, 2022, in Application No. 17858928.9.
EP office action dated Aug. 25, 2021, in EP Application No. EP19202054.3.
EP Office Action dated Feb. 15, 2022, in Application No. EP19188907.0.
EP Office Action dated Jan. 29, 2021 in EP Application No. 15868003.3.
EP Office Action dated May 14, 2020 in EP Application No. 15868003.3.
EP Office Action dated Nov. 19, 2020 in EP Application No. 15758538.1.
EP Search Report dated Dec. 10, 2021, in Application No. EP19787808.5.
European Office Action dated Feb. 25, 2021 in EP Application No. 15863112.7.
IN Office Action dated Jan. 13, 2022, in Application No. 201937044701.
IN Office Action dated Aug. 2, 2021 in IN Application No. 201637028587.
IN Office Action dated Nov. 24, 2020 in IN Application No. 201737020192.
Indian Office Action dated Feb. 24, 2021 in IN Application No. 201737021981.
International Preliminary Report on Patentability dated Nov. 12, 2020 in PCT Application No. PCT/US2019/030467.
International Preliminary Report on Patentability dated Nov. 7, 2019 in PCT Application No. PCT/US2018/029406.
International Preliminary Report on Patentability dated Nov. 7, 2019 in PCT Application No. PCT/US2018/029460.
International Preliminary Report on Patentability dated Oct. 29, 2020 in PCT/US2019/019455.
International Search Report and Written Opinion dated Apr. 28, 2020 in PCT Application No. PCT/US2020/018677.
International Search Report and Written Opinion (ISA/KR) dated Jun. 14, 2019 in PCT/US2019/019455.
JP Examination Report dated Nov. 26, 2020 in JP Application No. 2017-549175.
JP Office Action dated Dec. 7, 2021, in Application No. JP20170549175 with English translation.
JP Office Action dated Jul. 20, 2021 in JP Application No. 2017-549175.
JP Office Action dated Jun. 16, 2020 in JP Application No. 2017-549175.
JP Office Action dated Mar. 1, 2022, in Application No. JP2020-175033.

(56) References Cited

OTHER PUBLICATIONS

JP Office Action dated Nov. 19, 2019 in JP Application No. 2017-549175.
JP office action dated Sep. 7, 2021, in JP Application No. 2020-175033.
KR Office Action dated Dec. 22, 2021, in Application No. KR1020177018491 with English translation.
KR Office Action dated Jan. 22, 2021 in KR Application No. 10-2016-7025862.
KR Office Action dated Jul. 31, 2021 in KR Application No. 10-2016-7025862.
KR Office Action dated Oct. 26, 2021, in KR Application No. KR1020217028044 with English translation.
Sim, S., "Next generation data interchange: tool-to-tool application programming interfaces," IEEE Working Conference on Reverse Engineering, Nov. 25, 2000, pp. 278-280.
Taiwanese Office Action dated Feb. 27, 2020 in TW Application No. 108126548.
TW Notice of Allowance & Search Report (translated) dated Jul. 30, 2021 in TW Application No. 106133985.
TW Office Action dated Jan. 28, 2022, in Application No. TW110109128 with English translation.
TW Office Action dated Mar. 15, 2022, in Application No. TW109112242.
U.S. Corrected Notice of Allowability dated Jun. 4, 2020 in U.S. Appl. No. 16/298,776.
U.S. Corrected Notice of Allowability dated May 3, 2021 in U.S. Appl. No. 16/253,971.
U.S. Corrected Notice of Allowability dated Sep. 23, 2021, in U.S. Appl. No. 16/338,403.
U.S. Final Office Action dated Dec. 23, 2020 in U.S. Appl. No. 16/338,403.
U.S. Final Office Action dated Mar. 18, 2020 in U.S. Appl. No. 16/253,971.
U.S. Final Office Action dated Mar. 3, 2020 in U.S. Appl. No. 16/508,099.
U.S. Non-Final Office Action dated Oct. 28, 2021 in U.S. Appl. No. 15/733,765.
U.S. Notice of Allowability (supplemental) dated Sep. 30, 2020 in U.S. Appl. No. 15/123,069.
U.S. Notice of Allowance dated Apr. 6, 2020 in U.S. Appl. No. 16/298,776.
U.S. Notice of Allowance dated Apr. 6, 2022, in U.S. Appl. No. 15/733,765.
U.S. Notice of Allowance dated Apr. 9, 2020 in U.S. Appl. No. 15/123,069.
U.S. Notice of Allowance dated Dec. 31, 2020 in U.S. Appl. No. 16/523,624.
U.S. Notice of Allowance dated Dec. 31, 2020 in U.S. Appl. No. 16/555,377.
U.S. Notice of Allowance dated Dec. 7, 2020 in U.S. Appl. No. 16/508,099.
U.S. Notice of Allowance dated Feb. 16, 2022 in U.S. Appl. No. 16/664,089.
U.S. Notice of Allowance dated Feb. 4, 2021 in U.S. Appl. No. 16/253,971.
U.S. Notice of Allowance dated Jul. 1, 2020 in U.S. Appl. No. 15/623,237.
U.S. Notice of Allowance dated Jun. 14, 2021 in U.S. Appl. No. 16/338,403.
U.S. Notice of Allowance dated Mar. 10, 2021 in U.S. Appl. No. 15/691,468.
U.S. Notice of Allowance dated Mar. 26, 2021 in U.S. Appl. No. 16/254,434.
U.S. Notice of Allowance dated May 6, 2020 in U.S. Appl. No. 15/623,237.
U.S. Notice of Allowance dated Nov. 3, 2020 in U.S. Appl. No. 15/691,468.
U.S. Notice of Allowance dated Oct. 7, 2021 in U.S. Appl. No. 16/664,089.
U.S. Notice of Allowance dated Oct. 14, 2021 in U.S. Appl. No. 16/664,089.
U.S. Office Action dated Aug. 7, 2020 in U.S. Appl. No. 16/338,403.
U.S. Office Action dated Jul. 21, 2020 in U.S. Appl. No. 16/523,624.
U.S. Office Action dated Jul. 21, 2020 in U.S. Appl. No. 16/555,377.
U.S. Office Action dated Jul. 23, 2020 in U.S. Appl. No. 16/508,099.
U.S. Office Action dated Jul. 29, 2020 in U.S. Appl. No. 16/253,971.
U.S. Office Action dated May 6, 2020 in U.S. Appl. No. 15/691,468.
U.S. Office Action dated Sep. 30, 2020 in U.S. Appl. No. 16/254,434.
U.S. Appl. No. 17/634,150, inventors Shrivastava et al., filed Feb. 9, 2022.
U.S. Appl. No. 17/679,027, inventors Patterson et al., filed Feb. 23, 2022.
U.S. Appl. No. 63/124,673, inventors Tai et al., filed Dec. 11, 2020.
U.S. Appl. No. 63/146,365, inventors Brown et al., filed Feb. 5, 2021.
U.S. Appl. No. 63/163,305, inventors Trikha et al., filed Mar. 19, 2021.
U.S. Appl. No. 63/181,648, inventors Makker et al., filed Apr. 29, 2021.
U.S. Appl. No. 63/187,632, inventors Hur et al., filed May 12, 2021.
U.S. Appl. No. 63/226,127, inventors Lee et al., filed Jul. 21, 2021.
U.S. Preliminary Amendment dated Dec. 31, 2019 in U.S. Appl. No. 16/608,159.
CN Office Action dated Apr. 18, 2022, in Application No. CN202011547257.0 with English translation.
International Preliminary Report on Patentability dated Mar. 3, 2022, in Application No. PCT/US2020/070427.
JP Office Action dated Mar. 1, 2022, in Application No. JP2020-175033 with translation.
KR Office Action dated Apr. 13, 2022, in KR Application No. KR1020217028044 with English translation.
TW Office Action dated Apr. 29, 2022, in Application No. TW110140314 with English translation.
TW Office Action dated Mar. 15, 2022, in Application No. TW109112242 with English translation.
U.S. Notice of Allowance dated May 12, 2022, in U.S. Appl. No. 17/171,667.
U.S. Corrected Notice of Allowance dated Apr. 28, 2022, in U.S. Appl. No. 15/733,765.
U.S Notice of Allowance dated Jun. 8, 2022 in U.S. Appl. No. 15/733,765.

APPLICATIONS FOR CONTROLLING OPTICALLY SWITCHABLE DEVICES

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

Copyright Notice

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This application relates to software applications for controlling optically switchable devices, particularly optically switchable windows.

BACKGROUND

A switchable optical device such as an electrochromic device reversibly cycles between two or more optical states such as a clear state and a colored state. Switching between these states is controlled by applying predefined current and/or voltage to the device. The device controller typically includes a low voltage electrical source and may be configured to operate in conjunction with radiant and other environmental sensors, although these are not required. The controller may also be configured to interface with an energy management system, such as a computer system that controls the switchable optical device according to factors such as the time of year, time of day, security conditions, and measured environmental conditions. Such an energy management system can dramatically lower the energy consumption of a building, reduce glare, and maximize day lighting.

While electrochromic devices and related optically switchable devices were invented decades ago, they have not begun to realize their full commercial potential. Part of the difficulty is a lack of versatility in the operating modes of electrochromic devices. Additionally, known control systems for electrochromic devices have limited functionality and fail to account for some of the unique features of electrochromic devices, as well as user preferences.

SUMMARY

Disclosed herein are software applications for controlling the optical state of one or more optically switchable windows or other optical products installed in a structure such as building. The applications are designed to permit users to send and/or receive data and/or commands for controlling the switchable optical products. In some embodiments, the applications provide an interface with a window network controller, which directly or indirectly controls windows in a structure. In such embodiments, the network controller serves as a receiver and a transmitter of data and commands for controlling the switchable optical products. The network controller may process certain data and commands used by the application. The processing may involve user authentication, commissioning, adaptive control, and decisions on whether to permit an action or change requested by a user. In some embodiments, the application allows users to directly control the optical state of one or more optically switchable windows. In some embodiments, the application allows users to change a rule or property associated with controlling a switchable optical product.

One aspect of the invention relates to a network controller for optically switchable devices. In some embodiments, the network optical device controller comprises: (a) a network interface for communicating with a network comprising a plurality of optically switchable devices and a plurality of monitors in one or more structures; (b) a remote device interface configured to receive communications from a remote wireless device, which communications contain user instructions for changing the optical state of at least one of the plurality of optically switchable devices; and (c) logic for providing instructions for controlling optical states of the plurality of optically switchable devices in the one or more structures. In some embodiments, the remote device interface in (b) is a wireless interface. In some embodiments, the optically switchable devices include one or more optically switchable windows. In some embodiments, the optically switchable windows include at least one electrochromic window.

In some embodiments, the logic described herein is implemented using one or more programmable logic devices, software routines and/or digital electronic devices. In some embodiments, the network optical device controller also includes logic for determining whether to implement the user instructions. In some embodiments, the network optical device controller further includes logic for receiving signals from the plurality of monitors within the one or more structures, and using the signals from the one or more monitors to determine whether to change the state of at least one of the plurality of optically switchable devices in the one or more structures. In some embodiments, the controller further includes logic for communicating with a building management system on the network. In some embodiments, the controller also includes logic for communicating with a security system on the network.

In some embodiments, the network optical device controller also includes logic for receiving user instructions provided from the remote wireless device for commissioning the plurality of optically switchable devices, and executing network operations to commission the devices. In some embodiments, the controller also includes logic for receiving user instructions provided from the remote wireless device for grouping the plurality of optically switchable devices, and organizing said devices into groups. All devices in a group have a common group attribute allowing common treatment and/or monitoring of the devices in the group. In some embodiments, the controller also includes logic for defining one or more roles for a user of said remote wireless device, wherein the roles specify permissible actions for the user. In some embodiments, the controller further includes logic for defining one or more devices that the user can control.

In some embodiments, the monitors in one or more structures include sensors. In some embodiments, the sensors include a power consumption monitor for at least a portion of the structure.

A second aspect of the invention relates to a computer program product comprising a computer readable medium storing non-transitory instructions for interfacing with a user and with a network. The network includes a plurality of optically switchable devices and a plurality of monitors. The instructions include: (a) presenting a user interface on a wireless device remote from the network, wherein the user interface presents features for receiving user input concerning monitoring and/or controlling at least some of the plurality of optically switchable devices; (b) receiving user instructions for changing the optical state of at least one of the plurality of optically switchable devices; and (c) transmitting the user instructions to the network.

In some embodiments, the computer program product further includes instructions for presenting rule-type user interface features for allowing the user to create, modify, and/or delete rules for controlling optical state of one or more windows. In some embodiments, the rule-type user interface features allow the user to input schedule information to the rules for controlling optical state of one or more windows. In some embodiments, the rule-type user interface features allow the user to input sensor output information to the rules for controlling optical state of one or more windows.

In some embodiments, the computer program product further includes instructions for presenting commissioning user interface features, which allow the user to commission at least some of the plurality of optically switchable devices on the network. In some embodiments, the user can group, through the user interface, two or more of the plurality of optically switchable devices on the network.

In some embodiments, the computer program product further includes instructions for determining the role of a user attempting to control or monitor a device on the network, and preventing the user from controlling or monitoring the device because the user's role does not permit the attempted control or monitoring.

Another aspect of the invention relates to a computational method of determining whether to modify an algorithm for controlling an optically switchable device having two or more optical states operating under at least partial control of an application having a user interface. The method involves: (a) monitoring a user's control over the optically switchable device's optical states, wherein the user's control is implemented via the application presenting the user interface on a device remote from a network on which the optically switchable device is connected; (b) inferring a new rule based on a monitored history of the user control via the application; and (c) providing an alert through the application, which alert suggests via the user interface that the new rule be adopted. In some embodiments, the method further involves determining through the user interface that the user has accepted the proposed new rule and instructing the network to implement the new rule.

In some embodiments, the monitored history of user control comprises a monitored time in which the user controls optical states of the optically switchable device, and the new rule comprises a schedule based algorithm. In some embodiments, the monitored history of user control comprises a monitored sensor state in which the user controls optical states of the optically switchable device, and the new rule comprises a sensor feedback based algorithm.

Yet another aspect of the invention relates to a computational method of determining whether to modify an algorithm for controlling an optically switchable device having two or more optical states operating under at least partial control of an application having a user interface. The optically switchable device is disposed in a structure and connected to a network. The method involves: (a) monitoring the response of the structure to changes in the heat, cooling or lighting provided to the structure; (b) inferring a new rule based on a monitored history of the response of the structure; and (c) providing an alert through the application, which alert suggests via the user interface that the user adopt the new rule. In some embodiments, the method further involves determining through the user interface that the user has accepted the proposed new rule, and instructing the network to implement the new rule. In some embodiments, the response monitored in (a) is affected by the thermal mass of the building.

These and other features and advantages of the disclosed embodiments will be presented below in greater detail with reference to the associated drawings.

DETAILED DESCRIPTION

Introduction

Figure 1A:
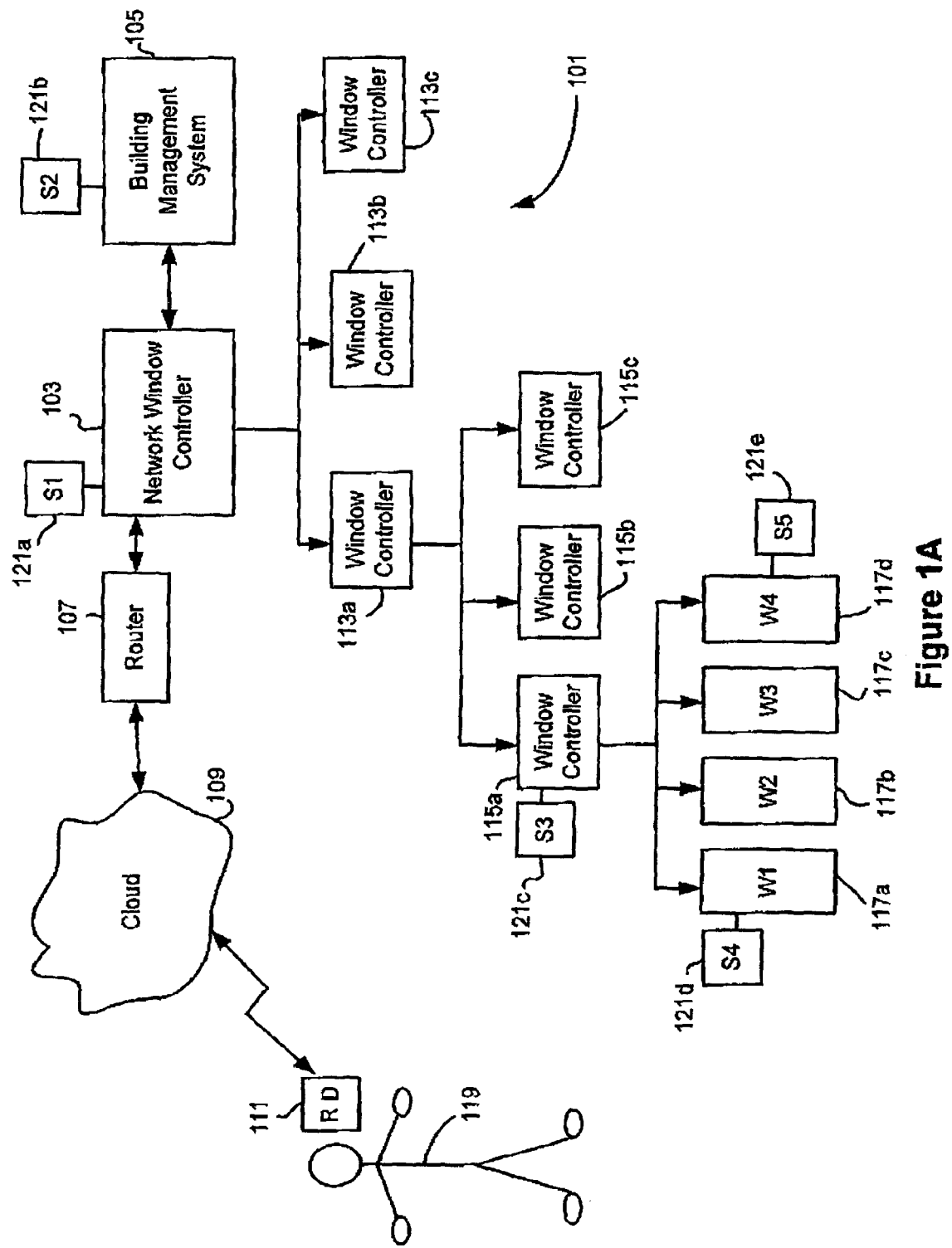
FIG. 1A is a schematic illustration of a system for a remote device presenting a user interface for an application that controls an optically switchable device on a network.

The following disclosure concerns the use of software applications to control and/or monitor one or more switchable optical products in a structure such as a building. While the disclosure emphasizes certain types of applications running on certain types of computing devices (e.g., wireless, handheld devices), it should be understood that other types of applications and computing devices may be employed. Similarly, while the disclosure emphasizes certain types of optically switchable devices in certain types of structures, the disclosure is not so limited.

In various embodiments discussed herein, a software application will be described as controlling one or more devices such as optically switchable products, particularly optically switchable windows. However, the embodiments disclosed herein are not limited to switchable windows. Examples of other types of optically switchable products include mirrors, displays, and the like. In the context of this disclosure, these products are typically provided in a non-pixelated format.

An optically switchable product includes a switchable optical device such as an electrochromic device disposed on a surface, within a substrate or between substrates. The substrate permits the optical device to provide an observable optical response. In certain embodiments, the substrate is solid and transparent, such as a transparent glass or plastic sheet. A glass substrate may be processed in a way that makes it suitable for a particular end use. For example, glass substrates may be strengthened or unstrengthened. Examples of strengthened glass substrates are those that are tempered or laminated. Examples of types of suitable substrates and methods of producing optical devices utilizing such substrates are described in U.S. patent application Ser. No. 12/941,882, filed Nov. 8, 2010, and titled "ELECTROCHROMIC WINDOW FABRICATION METHODS," which is incorporated herein by reference in its entirety.

It should be understood that while the disclosed embodiments focus on apparatus and methods for controlling electrochromic (EC) windows, the concepts disclosed herein may apply to other types of optically switchable devices. Examples of other optically switches devices include liquid crystal devices and suspended particle devices. The optically switchable devices may absorb, reflect, and/or scatter light. Such devices have controllable optical absorbance, color, reflectivity, and/or scattering characteristics. These characteristics may vary with spectral location; i.e., they may vary with the wavelength of impinging radiation.

In various embodiments, an optically switchable device is a thin device that changes optical state in response to electrical input. The device may reversibly cycle between two or more optical states. Switching between these states is controlled by applying predefined current and/or voltage to the device. The device typically includes two thin conductive sheets that straddle at least one optically active layer. The electrical input driving the change in optical state is applied to the thin conductive sheets. In certain implementations, the input is provided by bus bars in electrical communication with the conductive sheets.

Electrochromic devices are described in various references including U.S. patent application Ser. No. 12/645,111, filed Dec. 22, 2009, U.S. patent application Ser. No. 12/645,159, filed Dec. 22, 2009, U.S. patent application Ser. No. 12/772,055, filed Apr. 30, 2010, U.S. patent application Ser. No. 12/772,075, filed Apr. 30, 2010, U.S. patent application Ser. No. 12/814,277, filed Jun. 11, 2010, and U.S. patent application Ser. No. 12/814,279, filed Jun. 11, 2010, each incorporated herein by reference in its entirety.

Structures which may house optically switchable products controlled by applications disclosed herein include rooms, buildings (including multi-room buildings), vehicles, large displays, including collections of displays, and the like. Whenever reference is made to a building, structure, or the like, it is intended that the reference includes residential buildings, commercial buildings, greenhouses, etc., and extends to vehicles, displays, and the like. In various embodiments, the structure includes one or more controllers for controlling the switching of the optically switchable products contained therein.

Application software, sometime simply referred to as an "application" or an "app", is computer software designed to help the user to perform specific tasks such as controlling the tint state in a switchable window. Many applications provide an interface for remotely controlling one or more devices such as optically switchable products. Applications may be bundled with the computer and its system software, or may be published separately. Application software is contrasted with system software and middleware, which manage and integrate a computer's capabilities, but typically do not directly apply them in the performance of tasks that benefit the user. The system software serves the application, which in turn serves the user. Application software applies the power of a particular computing platform or system software (e.g., a network server such as a window controller) to a particular purpose. Some applications are available in versions for several different platforms such as Apple iOS, MacOS, Android, Linux, etc. In various embodiments, an application is made available to a user through a graphical user interface presented on a device that is removed from one or more switchable optical products that are directly or indirectly controlled from the application.

The applications described herein monitor and/or control one or more "devices." Optically switchable products are one class of device. Examples of other classes of device include controllers for controlling the optically switchable products, sensors for supporting control decisions for the switchable products, lighting controllers, etc.

In certain embodiments, the application is presented to a user on a "remote device" that can communicate with a controller for a switchable optical product. The remote devices may communicate with the controller via a wireless or wired connection. Many of the examples presented herein depict the remote device using wireless communication. In all cases, a wired link can be substituted.

The remote device can be, for example, a portable device or a non-portable device such as a desktop computer or terminal. In some implementations, the remote device is a smart phone, tablet computer, personal digital assistant (PDA), or any other wireless device. The remote device may communicate directly with the controller or, as described below, indirectly via a network controller.

The remote device provides an interactive user interface for allowing a user to control or monitor one or switchable optical products. In certain embodiments, the remote device displays a graphical representation, as part of a graphical user interface or "GUI," of the switchable optical product(s) that are monitored or controlled.

In certain embodiments, a remote device includes a CPU with a cache. The device also includes a communications interface such a wireless interface allowing the CPU to communicate with a network and/or controller in a structure containing one or switchable optical products. In some implementations, an application is implemented in software that runs on the CPU. The code for the application may be resident on the remote device or stored elsewhere. A user interface and associated application are displayed on a display of the remote device. The remote device may also include other features such as a large memory, a location indicator (e.g., a GPS device), and/or a digital camera. As indicated, the wireless device may in various examples be a cell phone, a tablet computer, a PDA, or a personal computer.

FIGS. 1A through 1F present examples of systems in which a mobile or remote device displays a user interface allowing a user to interface with a network of controllers, sensors, and switchable windows. In this description the terms "mobile device" and "remote device" may be used interchangeably, although "remote device" is generic to devices requiring a hard wire connection and mobile devices, i.e., wireless devices.

FIG. 1A schematically depicts a network 101 which interacts with a remote device 111 to give a user 119 control over the optical state of one or more switchable windows or other optical products under the control of network 101. An application facilitates the interaction between user 119 and network 101. Instructions for executing the software application may be stored on the remote device 111, or a network window controller 103, or elsewhere. The application may run on (or be executed on) various devices including the remote device 111, the network window controller 103, and the building management system 105, and/or other hardware, including shared hardware such as hardware employed in the cloud.

The network 101 may be implemented in a building, a collection of buildings, a vehicle, or other structure having one or a plurality of optically switchable windows. For convenience, it will be assumed that network 101 is implemented in a building. However, as explained above, it should be understood that the network may be implemented on other types of structures. In the depicted embodiment, the network has a hierarchy of window controllers, implying that the building has many different windows, which may experience various environmental conditions and provide solar radiation to many different types of rooms or regions.

At the highest level in the depicted hierarchy, a network controller 103 provides network-wide control and instructions for intermediate level window controllers 113a, 113b, and 113c. Of course, depending upon the size and complexity of the building, additional window controllers in parallel with 113a through 113c may be provided. In some embodiments, the network controller implements algorithms for controlling one or more optically switchable devices or other devices. Examples of such algorithms are presented in U.S. patent application Ser. No. 13/772,969, filed Feb. 21, 2013 [VIEWP049], which is incorporated herein by reference in its entirety.

In the depicted embodiment, the window controller 113a in turn controls three low level window controllers 115a, 115b, and 115c. While not shown in FIG. 1A, intermediate window controllers 113b and 113c may themselves also control one or more low level window controllers. Alternatively, intermediate level window controllers 113b and 113c may directly control one or more windows each. In the depicted embodiment, low level window controller 115a directly controls windows 117a, 117b, 117c, and 117d. These four windows may be, for example, the windows in a particular room of an office building, the windows on one side of an office building, the windows that face the same direction in a given room of a building, the windows on one or more sides of a vehicle, or essentially any other collection of windows that can benefit from being directly controlled by a single window controller.

The network-level window controller 103 may interact with other control systems installed in the building. Examples of such other control systems include security systems, building management systems, and the like. A building management system, which is shown by example as building management system (BMS) 105 in the network 101, conventionally controls a wide number of the functions in a large commercial or residential building or building complex. Typically, building management systems control heating, ventilation, multi-media, and air-conditioning in these buildings. In some cases, the building management system will include the functionality of other systems such as security systems and window control systems. In the depicted embodiment, the network window controller 103 is a separate entity that interfaces with building management system 105. This interface gives network window controller 103 access to many types of information that might normally be collected or determined for the building management system. Examples of such information include building sensor information (e.g., the current temperature in one or more rooms), the current energy consumption of one or more environmental devices acting under the control of the BMS, etc. The interaction between network window controller 103 and building management system 105 also permits the building management system to direct the network window controller to take certain actions as may be appropriate. In certain embodiments, the network window controller functionality is integrated in a BMS or other building control system. Examples of a master network controller and a building network including a BMS and a hierarchical arrangement of window controllers is presented in U.S. patent application Ser. No. 13/049,756, filed Mar. 16, 2011, which is incorporated herein by reference in its entirety. For a description of certain aspects of suitable master window controllers, see U.S. patent application Ser. No. 13/772,969, filed Feb. 21, 2013 [VIEWP049], previously incorporated herein by reference. In one example, the window controller 103 is an appropriately programmed controller such as a controller from CAN2GO (now owned by Schneider Electric of Rueil-Malmaison, France).

The individual controllers used in a network of controllers and switchable devices can have many different logical or structural arrangements. Typically, a controller for a switchable optical device is designed or configured (e.g., programmed) to implement a control algorithm of the types described above. In various embodiments, the controller determines an appropriate level of current or voltage to apply and goes about applying such voltage or current to the switchable device. The controller may also detect current or voltage levels to ensure that the optical device operates correctly. Further, the controller may have various additional features such as timers, charge detectors (e.g., coulomb counters), oscillators, and the like. Various designs and components of controllers are presented in U.S. patent application Ser. No. 13/049,756, filed Mar. 16, 2011, U.S. patent application Ser. No. 13/049,750, filed Mar. 16, 2011, U.S. patent application Ser. No. 13/449,248, filed Apr. 17, 2012 [SLDMP041], and in U.S. patent application Ser. No. 13/449,251, filed Apr. 17, 2012 [SLDMP042], each of which is incorporated herein by reference in its entirety.

In some embodiment the controller (e.g., controller 115a) is integrated with the optical device or housing. In a specific embodiment, the controller is integrated in the housing or a seal of an insulated glass unit (IGU) containing a switchable optical device. Various arrangements of integrated controllers are presented in U.S. patent application Ser. No. 13/049,750, and U.S. patent application Ser. No. 13/326,168, naming Brown as inventor, titled "CONNECTORS FOR SMART WINDOWS" and filed Dec. 14, 2011, which is incorporated herein by reference in its entirety.

The controller typically includes a microprocessor for making switching decisions based on available input, sending commands, and receiving commands. In some embodiments, a controller includes a power converter configured to convert a low voltage to the power requirements of an optically switchable device. This power may be fed to the switchable device via a driver circuit (power driver). In one embodiment, a controller has a redundant power driver so that in the event one fails, there is a back-up and the controller need not be replaced or repaired.

A controller may also include one more communication ports and associated communication circuits for receiving and sending commands and/or data to other network entities such as a master controller. In one embodiment, power lines are also used to send and receive communications, for example, via protocols such as Ethernet.

In one embodiment, the power and communication functionality of an optical device controller may be combined in a single chip, for example, a programmable logic device (PLD) chip, field programmable gate array (FPGA) and the like. Such integrated circuits can combine logic, control and power functions in a single programmable chip. In one embodiment, the logic is configured to independently control each of the two or more switchable optical devices.

A controller may have wireless capabilities for communication and/or powering functions. Wireless communication transmission frequencies such as RF and/or IR can be used. Wireless protocols such as Bluetooth, WiFi, Zigbee, EnOcean and the like may be used to send instructions to the microprocessor and for the microprocessor to send data out to, for example, other window controllers and/or a building management system.

In various embodiments, the remote device 111 communicates with the network window controller 103 through a wireless link. In other embodiments, the remote device communicates with controller 103 via a wired link. In either case, the remote device may communicate directly or indirectly with the window controller 103. In some embodiments, the remote device communicates directly or indirectly with the building management system 105, which in turn communicates with the network window controller 103 during operation of the window control application. In such embodiments, the building management system 105 may itself play a role in the application or in providing information needed by the application. In the depicted embodiment, the remote device 111 communicates with network-wide window controller 103 via a wireless link through the Internet (cloud 109) and a router 107, which is part of the hardware of network 101. Many other configurations for implementing the communication between the remote device 111 and the network window controller 103 are possible and will be apparent to those of skill in the art.

In certain embodiments, the window controller application acts on information collected by one or more sensors in the building. For example, the application may use a sensor output to make a decision on whether to tint a particular window. Additionally, information from the sensors may also be presented to user 119 through remote device 111. For example, the temperature, solar irradiation at a window, etc. may be displayed on device 111 via the application. In some embodiments, one or more sensors wirelessly communicate with a window controller or controllers.

In certain embodiments, the sensors are distributed throughout the building and are associated with various physical or structural features on the building. In alternate embodiments, only one or a few sensors are employed. See for example, certain embodiments disclosed in U.S. patent application Ser. No. 13/772,969, filed Feb. 21, 2013, [VIEWP049], previously incorporated herein by reference. In the depicted embodiment, sensors 121d and 121e are associated with windows 117a and 117d, respectively. In the depicted embodiment, a sensor 121c is provided with window controller 115a. Additionally, a sensor 121a is associated with network window controller 103 and a sensor 121b is associated with the building management system 105. Typically, though not necessarily, the sensors are affixed to or positioned in close proximity to the network entity with which they are associated. Examples of sensors that may be associated with a window controller include light sensors, temperature sensors, and occupancy sensors.

As examples, the sensors may be temperature sensors, photo sensors, occupancy sensors, etc. Solar or artificial light can be measured using various types of sensors, with one example being a photometric sensor such as a silicon photodiode. Another type of sensor is a pyranometer which measures solar irradiance across a larger spectrum of solar radiation. The temperature of a device or any location can be inferred algorithmically or measured directly using a sensor (e.g. a thermocouple, thermister, or RTD (resistive thermal device)).

The applications that facilitate user interaction with the network window controller provide various functions associated with controlling the optical properties of one or more windows controlled by the network window controller. Examples of these various activities are presented in FIGS. 1B through 1F.

Figure 1B:
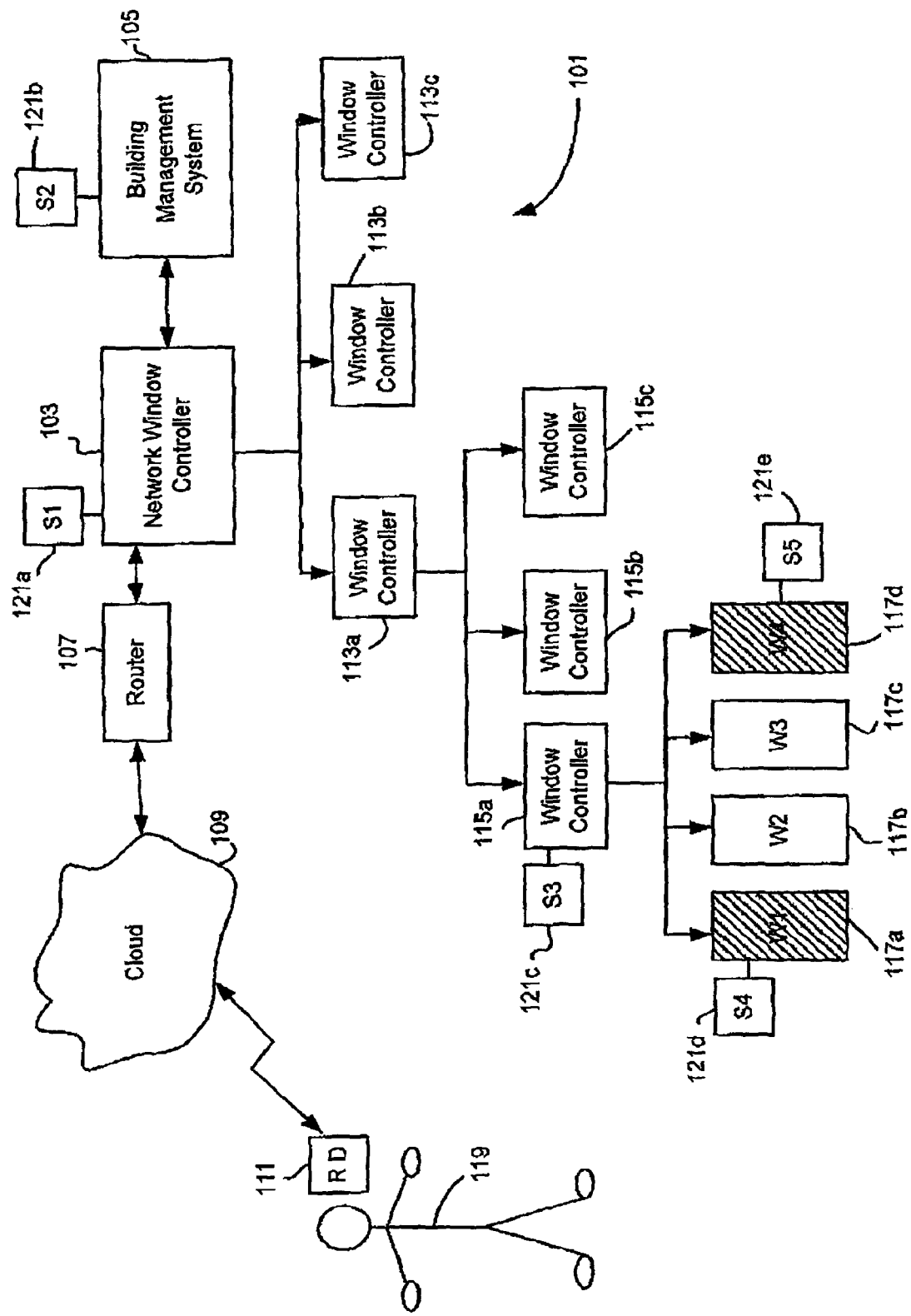
FIGS. 1B-1F are schematic illustrations of the network, remote device, and application performing various device control functions.

FIG. 1B depicts a situation where user 119 interacts with remote device 111 and elects to directly tint windows 117a and 117d. The remote device presents an application function that allows a user to manually adjust the optical properties of one or more windows. For example, if the windows are electrochromic windows, the user may manually set the tint states of one or more windows that he or she selects using the application. As explained more fully below, the application may provide one or more user interface features that allow the user to select one or more windows and/or the tint state of one or more windows. An example of a user interface allowing such manual control is shown in FIGS. 4A, 4B, 5A, and 5B.

In certain embodiments, the available tint states that a user can select are limited to clear or tinted. In other words, there are only two options available to the user. At the opposite extreme, a window may have a continuously variable level of tinting available for control. Applications for controlling such windows may permit the user to select any desired tint level between the maximum and minimum tints available with the window. For this purpose, the application includes, for example, a user interface slider bar representing all available tint states. In between the extremes of a binary option for selecting tints and a continuously variable option for selecting tint, a window may provide one or more intermediate discrete tint states. In various embodiments, the total number of available tint states for manual control may be 3, 4, 5, 6, 7, 8, 9, 10, or more such discrete states. In a specific embodiment, the window contains two or more lites, as is the case with an insulated glass unit (IGU). Each lite may contain its own electrochromic device configured to provide the IGU with 4 or more discrete tint states. See U.S. patent application Ser. No. 12/851,514, filed Aug. 5, 2010, which is incorporated herein by reference in its entirety.

Another example of a type of user control that may be afforded by a window control application is the ability to define and/or modify rules or properties for automatically controlling window tinting. As explained more fully below, examples of rules include schedule-based rules and sensor-based rules. In certain embodiments, the application permits the user to define such rules through selection of various scheduling parameters, environmental parameters, etc. An example of a user interface suitable for adding or editing such rules is presented in FIGS. 7, 8A and 8B.

The "manual" functions afforded the user by the window control application sometimes override existing tinting rules or routines programmed or otherwise configured in the network window controller 103. In some embodiments, user manual overrides are permitted only for a limited period of time such as about 1-3 hours. Such hard limits on overrides can have the benefit of preventing an energy inefficient setting (or other potentially undesirable setting) from remaining in place long after the user responsible for the override leaves an impacted area. The limit on manual overrides can be programmed into the window control application and/or the network window controller for example.

Figure 1C:
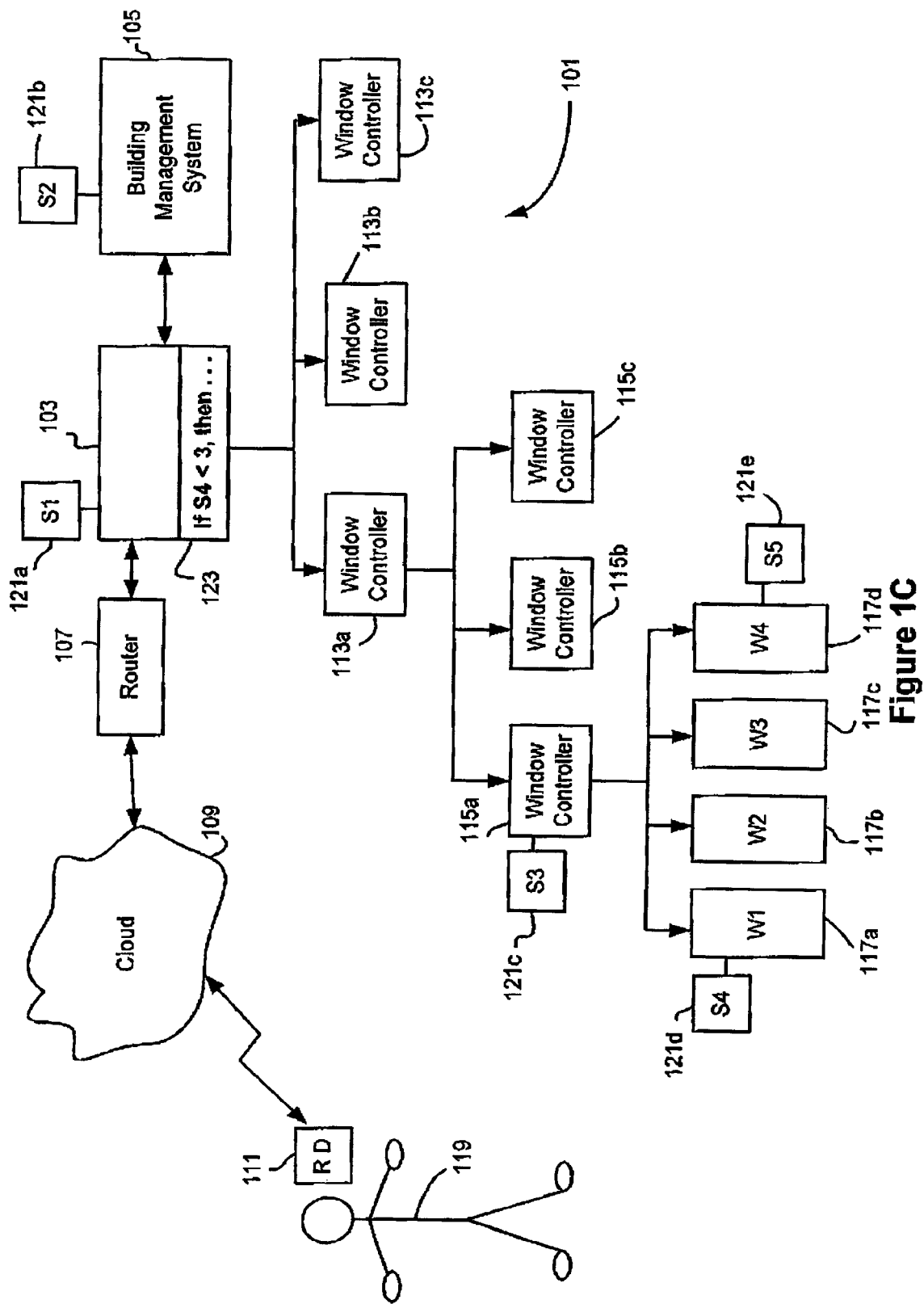

FIG. 1C schematically depicts a situation in which user 119 using remote device 111 enters a new rule based upon a comparison of the output value of sensor 121d as compared against the threshold value. When the user enters this rule through the user interface provided by the application displayed on remote device 111, the new rule is stored on network window controller 103 where it is executed to affect control of particular windows in response to output values from sensor 121d. The rule as stored on controller 103 is depicted by a reference number 123.

Another feature afforded by some window control applications is the grouping of various devices under the control of a network controller into groups that are treated in accordance with certain rules or other logical constructs. As explained below, such grouping may be conducted during part of a commissioning process.

Among the devices that may typically be grouped for purposes of similar treatment are window controllers, sensors, windows, and optionally switches for controlling lights or windows. Any one, two, or three of these types of elements may be included in a single group. There are various reasons why one would wish to group such devices for similar treatment. Frequently a group of devices will be similarly treated because they are subject to similar environmental conditions such as exposure to the sun at certain times of day. Another reason to group devices is that the various devices are shared by a particular group of workers or residents who require similar environmental conditions. Still other reasons for grouping devices include ease of control with, e.g., a single button, and lower infrastructure costs through sharing sensors/switches across multiple controllers. The similar treatment applied to the devices in a user-defined group includes, for example, rules or properties for controlling windows, as well as the identity of particular users who are given control over these devices (typically through a window control application), and the roles of these individuals able to exert influence over the grouped devices.

Figure 1D:
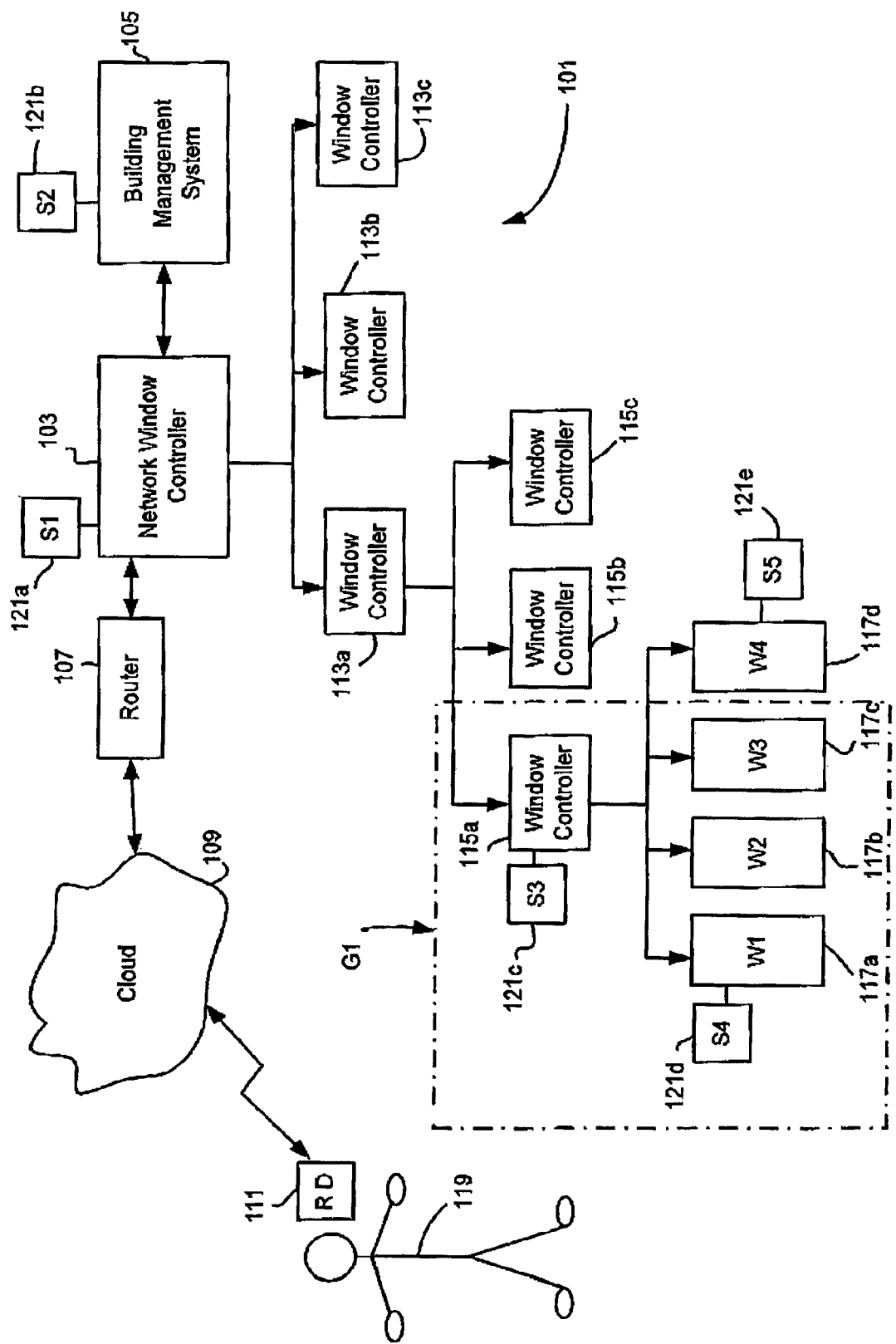

FIG. 1D schematically depicts a situation in which user 119 defines a group through a user interface provided on remote device 111. The user selects sensors 1201c and 121d, as well as window controller 115a, and windows 117a through 117c, as the devices within a new group identified as "G1." In a specific example, these devices are all associated with a north facing side of a building under the control of network window controller 103.

At times, a user may attempt to exert control over network 101 through the use of the window control application and find that the network window controller does not permit the user to execute a request. There may be various policy reasons why a user's ability to group, program, and/or manually control elements of network 101 is limited. One example is that the user's proposed actions may be inconsistent with a policy to limit the amount of energy consumed during peak load periods to not more than some threshold level. Another example may be that the user's input is inconsistent with the programmed input from another user having higher authority over the device that is influenced by the user's request.

Figure 1E:
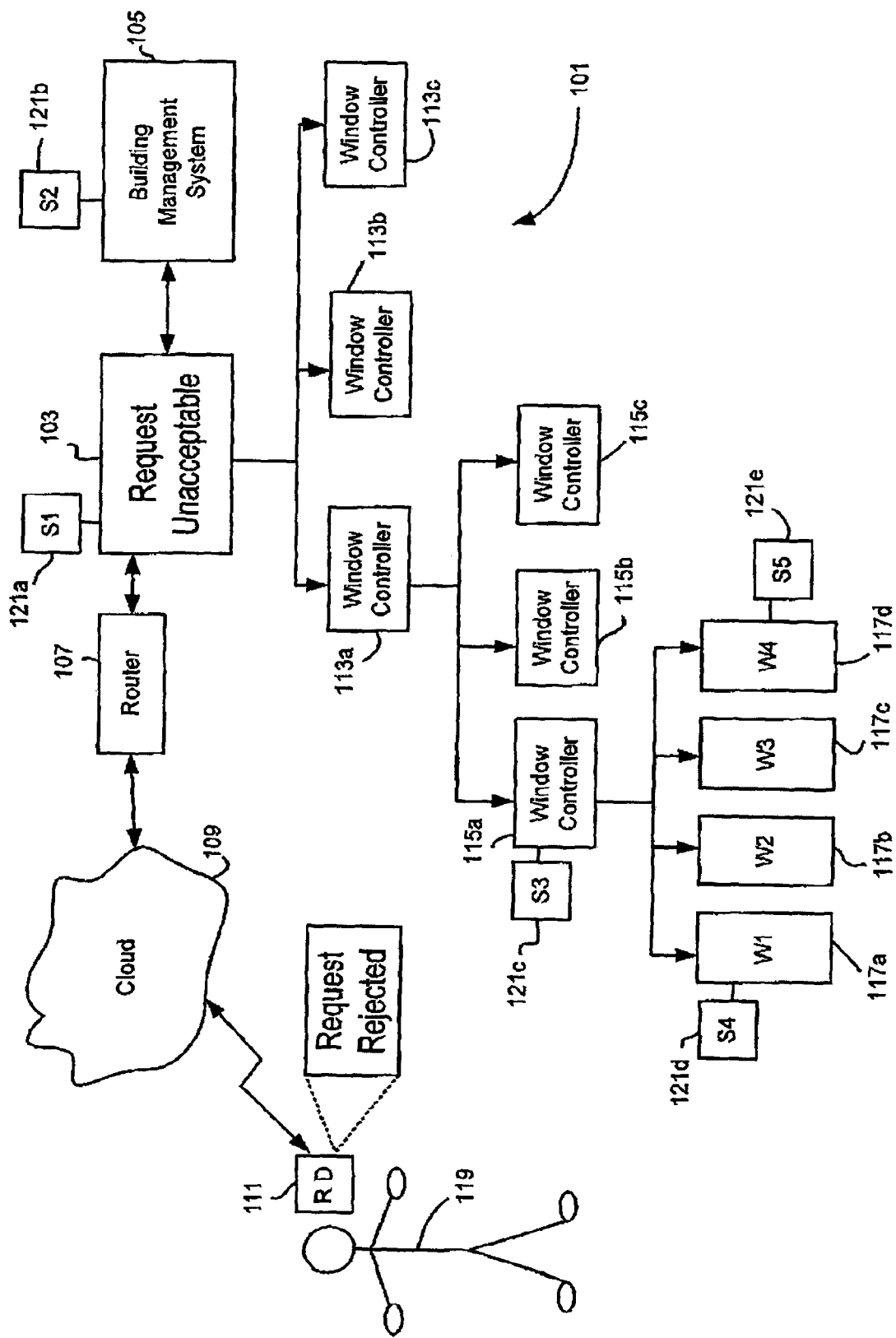

FIG. 1E depicts a situation in which the user 119 makes a request to control one or more features of network 101 and that request is analyzed by the network window controller 103 and found to be unacceptable. In the depicted embodiment, when the window controller 103 makes this determination, the application sends a notification back to user 119 that his or her request was rejected. This notification may take the form of a message displayed on the remote device 111.

Figure 1F:
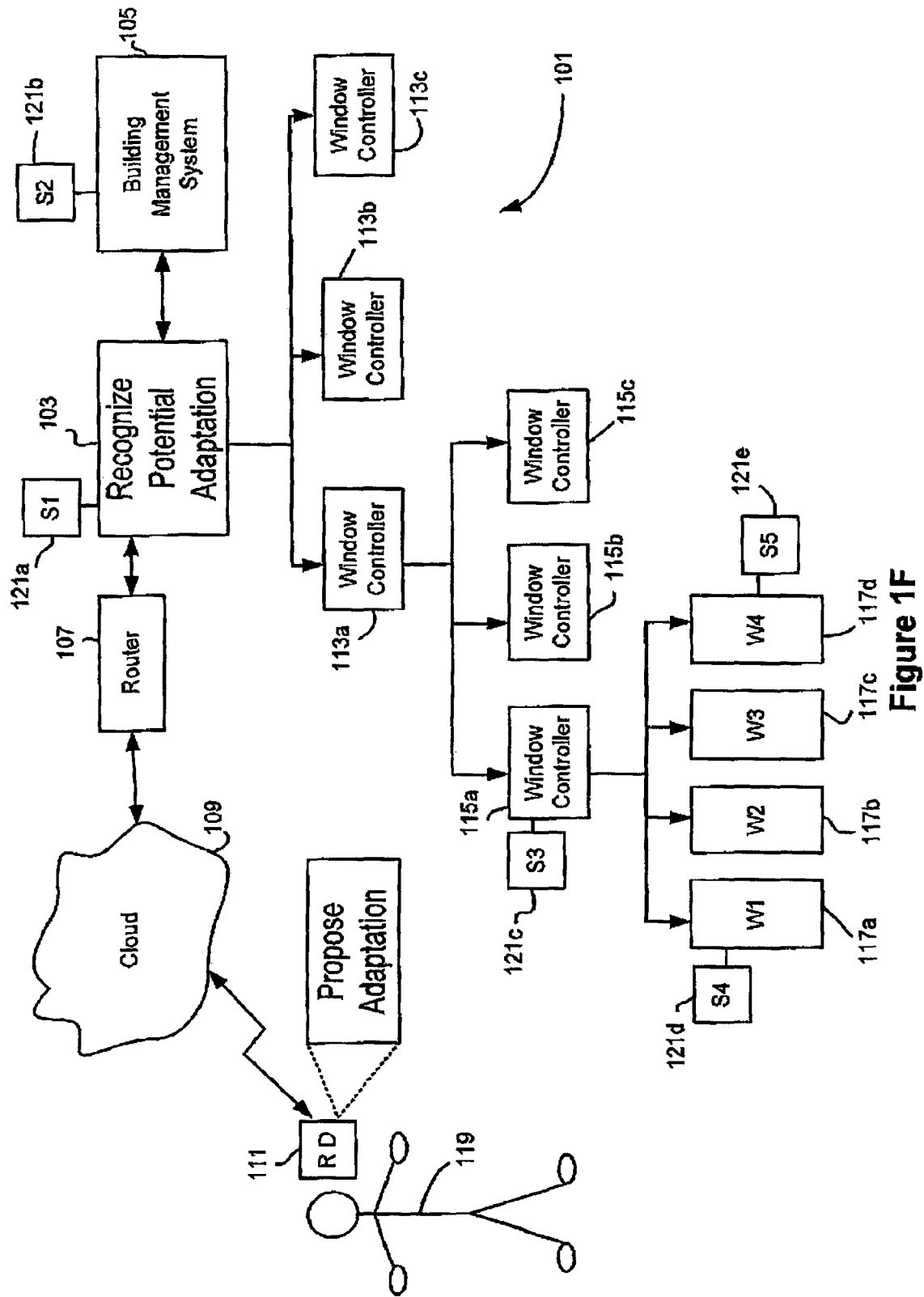

Another example of a type of interaction between a user and a network window controller is through a concept referred to herein as "adaptive control." With adaptive control, the window control application (or another application acting in concert with the window control application) is sufficiently intelligent to recognize when a particular change in the rules or program for controlling one or more windows needs to be made. When a controller comes to this recognition, it may use the window control application to notify the user of the proposed adaptation. The user can then elect to approve or reject the proposed adaptation. Note that in alternative embodiments, the user is not given this choice and the system will automatically make the change. Such automatic change may be accompanied by notification to the user via the application with changes being made. In an example of adaptive control, the application infers that the windows in a room should tint between noon and 1 PM on weekdays based on a user's history of manually tinting the windows during this time period. FIG. 1F schematically depicts the network controller 103 recognizing that an adaptation is appropriate and notifying the user 119 via remote device 111. In certain embodiments, the window control application has a "demo" mode that allows users to through GUI screens in a simulation, without the need for connecting to a system such as the system shown in FIGS. 1A-F. This may be useful for marketing and/or training purposes. The window control application can be installed on remote devices using many different types of installation mechanisms. In one example, the application is directly downloadable to user devices from iTunes™ or oher publically available store of applications or other software.

Figure 1G:
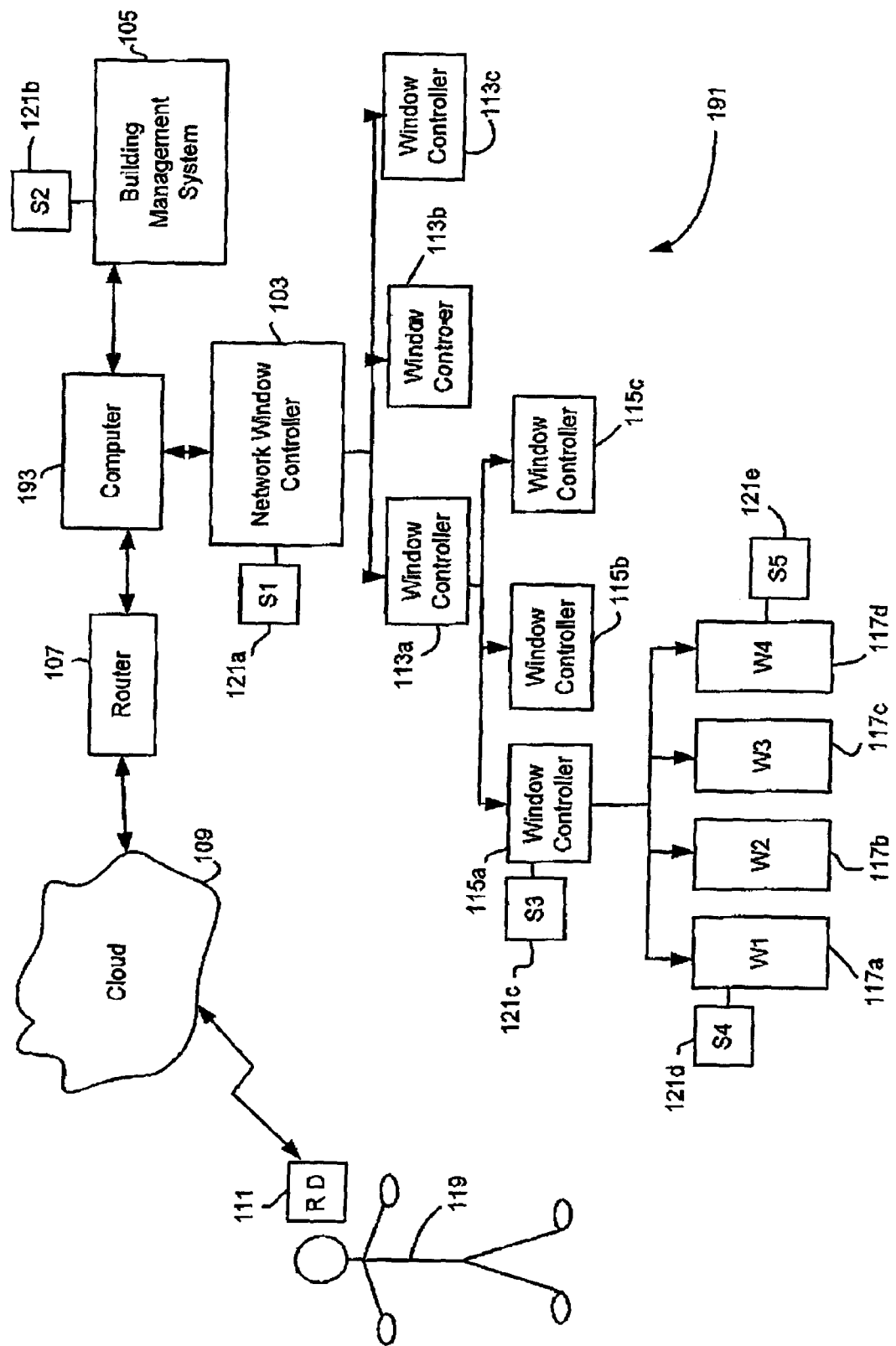
FIG. 1G is a schematic illustration of an alternative logical or hardware architecture for the network, remote device, and application.

Many variations on the system depicted in FIGS. 1A-F may be employed with a mobile application as described herein. One variation is a system 191 depicted in FIG. 1G. System 191 employs a computer 193 to conduct one or more functions of master network controller 103 from FIG. 1A. Examples of such functions include remote access, user management, system diagnostics, database services, and scalability. Some or all of the functions of network window controller 103 may be offloaded to computer 193 in system 191. Examples of these functions include one or more of rule logic, adaptive programming, commissioning, device configuration, and device grouping. In the depicted embodiment, computer 193 connects to router 107, building management system 105, and network window controller 103'. In certain embodiments, computer 193 is a "plug computer". A plug computer is known to those of skill in the art. It is generally a compact yet powerful computer server, which may be implemented in an AC power plug or an AC adaptor. In various embodiments, a plug computer is configured to provide a bridge to cloud based services. The system depicted in FIG. 1G may be employed with any of the methods or functions disclosed herein for window networks that can be controlled with mobile applications.

Flow Chart of Application Features

Figure 2:
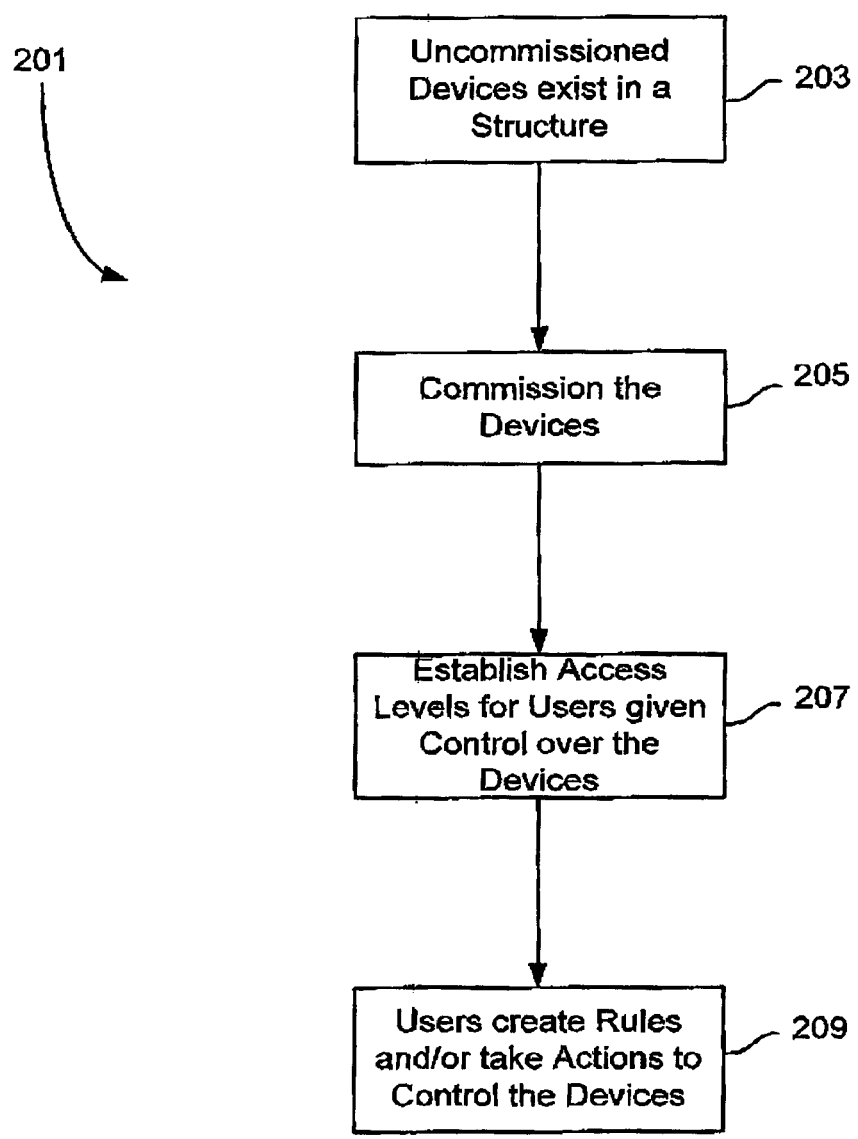
FIG. 2 is a flow chart depicting a series of operations that may be implemented using a window control application providing an interface on a remote device.

In some embodiments, a window control application is used in a set up process for installed windows and other devices to be controlled using the application. FIG. 2 provides an example of such set process, followed by a deployment and use phase.

FIG. 2 presents a flowchart showing the handling of uncommissioned devices in a structure such as a building. See block 203. Among the processes that may be accomplished or facilitated using a window control application are (i) a step of commissioning devices (205), followed by (ii) a step of creating user profiles for application users who can control the commissioned devices (207), followed by (iii) a step of creating rules and responding to user requests by interacting with the application during normal operation after commissioning and creating the user profiles (209).

Commissioning

Commissioning is a way to inventory, group, and validate devices available to a window control application. Commissioning is normally triggered by a new installation of optically switchable products and/or associated controllers in a structure. In some cases, the installation would occur at the same time the structure is constructed. In other embodiments, the installation will occur at a later date, e.g. a retrofit application. In some embodiments, the commissioning may be implemented in stages, with each stage occurring after a new set of devices is installed in the structure. For example, in a first phase, some electrochromic windows may be installed on a south facing side of an existing building. These windows and their associated controllers would be commissioned soon after installation. At a later time, additional electrochromic windows and associated controllers are installed on east and west facing sides of the building. These new, later installed windows are then commissioned. Even later, the windows on the north facing side of the building are replaced with electrochromic windows and associated controllers. At this point, a further phase of the commissioning is performed. Perhaps, even later, more sensors, controllers, and or other devices are installed in the building and these are thereafter commissioned as appropriate. In some embodiments, at any event triggering possible commissioning, the application presents a notification through its user interface. The notification may be followed by receipt of user instructions to initiate the commissioning process.

Figure 3:
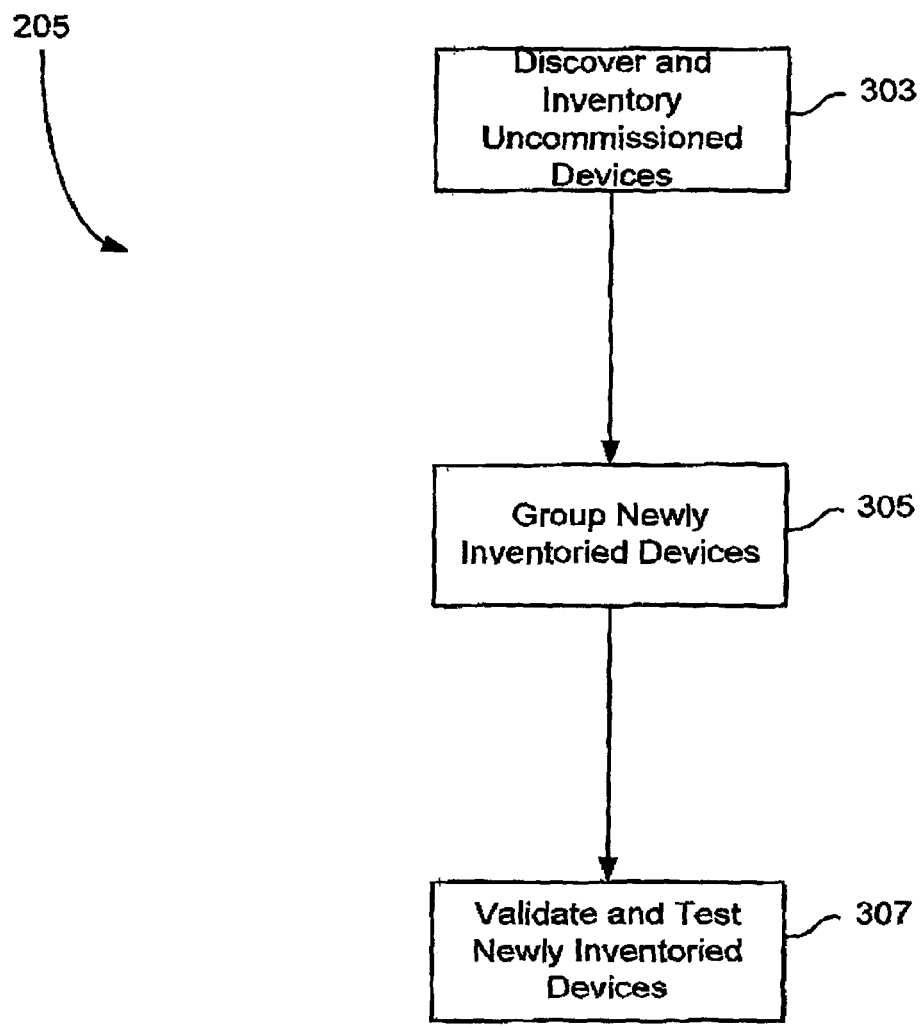
FIG. 3 is a flow chart depicting a commissioning process that may be implemented using a window control application providing an interface on a remote device.

A simple commissioning process 205 is depicted in FIG. 3. An initial phase of the commissioning involves inventorying (sometimes called "discovering") the un-commissioned devices in a structure. This is depicted in block 303 of FIG. 3. It typical embodiments, the inventorying of devices involves executing a discovery routine of an application that discovers networked devices that have not yet been commissioned. The program used to discover the un-commissioned devices may run on a network server, a remote device, the cloud or some combination of these. Such program may broadcast a discovery request over the network to which, the un-commissioned devices are programmed to respond with certain information about themselves. For example, the devices may respond with their class and identification. The identification should uniquely identify each device within a given class. Examples of classes include a window or insulated glass unit class, a window controller class, a network controller class, a temperature sensor class, a photosensor class, an occupancy sensor class, a manual override switch class, etc.

In another embodiment, the discovery routine receives a prepared list of the devices to be commissioned. The list may be provided in the form of a table, spreadsheet, database view, etc. Upon receipt of such list, the routine updates an internal list of the available devices under its control.

Examples of ways commissioning can be done include the following:

Method 1 (On-Site Group Creation):

(a) connect all devices and power up; each device identifies itself by device type/id etc. and is then added to the list of that specific device type and can be seen on user interface.

(b) the user then creates groups via the user interface and adds members by selecting them from the lists created in (a) using drawings/graphics and/or document containing the grouping information. If needed, the user working with the user interface can confirm that member is physically present in the group's domain by sending a signal and observing response.

Method 2 (Off-Site Group Creation):

(a) Import a list of all devices as well as groups and possibly other information from a design document or file.

(b) After power up, the presence of all elements is confirmed (similar to Method 1 for example) and any missing or additional elements are flagged on the application's user interface and subsequently added or deleted by the user.

(c) If needed, the user can confirm that member is physically present in the group's domain by sending a signal and observing response Each of the classes will have certain attributes associative therewith. For example, a class for a photosensor, may specify that photosensor provides output in particular increments of foot candle illuminance. The class may also specify other attributes of the device such as its dynamic range, its manufacturer, its model type, etc. The class may additional information such as a URL or contact for maintenance and replacement details provided by vendors, etc. Further information about classes is presented below in a sample API for a window control application.

The inventorying process may also discover the location of each device within the building. This may involve, for example, uploading installation data specifying the location of each the devices from the most recent installation. As an example, such information may be provided in a spreadsheet, a table, or other arrangement of text. As with the class and ID, the location information may be stored at a location on the window network, on the cloud, on remote devices, or any combination of these. Such configuration information may be created or modified remotely from the location where the devices are located. At an appropriate time, the configuration information is downloaded or otherwise transferred to the window network controller and/or window application for the affected building. This allows the configuration to be performed by an entity, such as a vendor of the optically switchable windows, who does not have access to the network of the building where the windows are installed.

Next, in process 205 of FIG. 3, the inventoried devices are grouped as indicated in a block 305. The grouping may be facilitated using the user interface in a remote user application, an application running on a network server, etc. Using the graphical user interface of the window control application, a user may add a new group, modify an existing group, delete a group, coalesce two or more groups, create a hierarchy of groups, etc. The user interface makes available through a display or other mechanism all the inventoried devices available for grouping. With this interface, the user identifies one or more devices for inclusion in a defined group. An example user interface screen shots for facilitating grouping is provided in FIGS. 6A and 6B. See also FIG. 1D and the associated discussion.

Device groups may be created for various reasons. Often the devices in a group have one or more attributes in common. In some embodiments, a common attribute is a common location of the devices in the group. In some embodiments, a common attribute is control by a user or a group of users given access to the devices in the group.

In many cases, grouping lowers implementation costs. For example, all floors on the same side of the building may be able to leverage a single photo sensor across one or multiple groups. Additionally, grouping may reduce the burden (and reducing complexities) on any upstream BMS system or manual override switch since such entities need to only send commands for groups and not all or some devices in the group.

Further, the grouping may be done in a hierarchical fashion. In other words, a group may belong to higher level group; that is, a low level group may be a subset of the higher level group. As an example, one group may be limited to optically switchable windows on a north facing side of a building. This "north facing" group is containing within a higher level group that includes optically switchable windows from all sides of the building, but does not include windows from other any other buildings. The "building" is in turn contained within an even higher level group that includes multiple building groups, which each may be part of a building complex, for example. This design has the benefit of allowing the user of a mobile application to quickly identify a problem with a device and only after identifying that a problem exists, spending the effort to determine exactly where the problem resides. For example, a window network administrator for an entire complex of buildings may be able view the device status for the entire super group of devices within the complex.

Grouping is a logical abstraction of the physical network in a window management strategy. It may be n-tier hierarchical, with command-and-control information propagating top-down, and state-and-status information propagating bottom-up.

It should be understood that grouping and modifying groups may be performed outside the context of commissioning. Thus, while a group or groups may be established during commissioning, such group or groups may be modified, deleted, etc. long after commissioning has been completed.

Finally, the commissioning process 205 is concluded with a testing and validation phase 307. In this process, all of the inventoried and grouped devices are tested to ensure that they are working and that they are the devices they are shown to be in the inventorying process. In one embodiment, testing and validation is accomplished via a handheld remote device which receives inputs from a user moving around a building from device to device to check the functioning of the devices, which are individually identified on the user application. As part of the testing process, the application may test individual windows or other devices to determine whether they respond to manual commands issued through the application. The application may also test to determine whether particular sensors are operating as expected. For example, a temperature sensor may be exposed to a heat source and its output as presented in the application is used to establish that the sensor correctly shows an increasing temperature. If any devices are found to be malfunctioning or to be misrepresented during the testing and validation phase, such devices can be fixed, replaced, and/or re-identified as appropriate.

User Roles in the Application

In various implementations, window control applications define and apply roles specific for users of the applications. This may be part of the step of creating user profiles (207) illustrated in FIG. 2. Individual roles may permit certain realms of control that users having such roles may possess. In certain embodiments, roles define windows or other devices that a user may control via a window control application. The devices controllable by users in a given role may have certain attributes in common. For example, they may be in certain geographic location (e.g., a building or a portion of a building such as the north facing windows and sensors of a building, a room, or a group of buildings in a compound), they may be of defined class or type (e.g., they are all photosensors such as photosensors provided a particular vendor), or they may be a defined group of devices as specified during commissioning.

In certain embodiments, roles define a level of priority in the ability to control devices. For example, the roles may be arranged in a hierarchy, with the actions of some users being given higher priority than the actions of other users, who have lower priority roles. In such cases, the roles may be used to resolve conflicting instructions between two users. In a specific example, a building owner role is given a higher priority than a tenant or room occupant role. Also, roles may specify the ability of a user to override a control policy defined in network controller or other automated system for controlling switchable optical devices. For example, a building policy may require that all windows in the building tint when the outside temperature exceeds 100° F. Most user roles provide no authority to override this policy and render one or more windows transparent at such temperatures. However, users with the role "superuser" or "network administrator" may be permitted to selectively override this policy. To the extent that a role permits an override, the override may be limited to a defined period of time, e.g. a few minutes to a few hours.

In some implementations, there are both qualitative and quantitative elements to a security model. The "role" is qualitative insofar as it defines the operations that can be performed, and, in some cases, the object classes that can be controlled (e.g., particular types of devices). There is also a "resource" element (more quantitative in nature) that defines the individual object instances that can be controlled. In general, roles and resources may be delineated as follows: a user may do A, B, and C (roles) on X, Y, and Z (resources). In a particular example, the role of "building tenant" is only permitted to change the tint state of windows under the building tenant's control. The building tenant cannot modify or create rules and cannot accept or reject adaptive proposals. Particular individuals having the building tenant role are permitted to act in that role only for particular resources assigned to them—e.g., window resources in in a room where a particular individual works. In contrast an individual given the role of network administrator may be permitted to generate and modify rules, including rules automatically presented using adaptive control, override actions requested by individuals having lower roles, etc. The resources available to such individual may include all devices in one or more buildings, or alternatively to a particular floor or other region of a building.

In certain embodiments, creating the roles for users is accomplished by an on-site visit and speaking with the building owner or manager and, at that time, appropriately programming the application on a network server. Alternatively, the building owner or manager can provide a file listing all the users who will be given access to the application and the roles of each user. In various embodiments, the user roles are applied after device commissioning.

Here is an example of a hierarchy of user roles appropriate for a window control application:

1. Building manager
2. Floor 1 administrator; floor 2 administrator; . . . floor N administrator
3. Room 1 occupant, room 2 occupant, . . . room M occupant Here are examples of permissions that may be provided as a function of user role in a window control application:

Re-commissioning devices (reorganize groups, change the ID or other attributes of a device)

Commissioning devices (create groups, inventory device, validate and/or test devices)

Setting rules and/or programs (change a rule or a condition—e.g., replace a threshold of 300 Lux with a threshold of 500 Lux).

Manual or direct control over devices (e.g., as described with respect to the screen shots of FIGS. 4A, 4B, 5A, and 5B, as well as described with respect to the schematic diagram of FIG. 1B.).

Defining Rules and Programs Using the Application

Device control software applications as described herein may afford users with the ability to select, create, and/or modify rules. In certain embodiments, an application providing access to windows or other devices provides a user interface through which user inputs are interpreted to create, modify, and/or delete rules and programs for controlling such devices. Application functions and actions provided in accordance with this permission may be part of operation 209 shown in the flowchart of FIG. 2. FIGS. 7 and 8A-B present screen shots depicting a user interface allowing remote users to interact with and/or create rules.

In some cases, at least two types of rules are provided via an application: schedule based rules and sensor based rules. More generally, these types of rules can be characterized as temporal and environmental. Some environmental rules may not come directly from a local sensor. As an example, a weather condition determined from a source of weather information for the locale of the window may be used as a source for an environmental rule. In some cases, a rule contains both temporal and environmental conditions used together in a rule. In schedule based rules, certain control or monitoring events take place on a defined schedule which is set forth in the rule. In senor based rules, output from sensors serves as independent variables and the device states (e.g., level of tint in a window) are the dependent variables. Further information about and examples of sensor and schedule based rules are set forth in U.S. patent application Ser. No. 13/449,235, filed on Apr. 17, 2012, and naming S. Brown et al. as inventors, which is incorporated herein by reference in its entirety. Any rule (schedule based, sensor based, or otherwise) may be comprised of two or more conditions, which may be coupled in a Boolean expression, for example. Other rules comprise only a single condition.

In accordance with various embodiments provided herein, device control rules may be part of a hierarchy in which "programs" are comprised of "rules" and rules have one or more "conditions" and "control states". A rule's conditions (which act as independent variables) may employ schedule information and/or sensor information, for example. In other words, a rule takes schedule and/or sensor information as independent variables and determines a control state, which is a dependent variable.

Conditions are components of rules. If one or more conditions a rule are met, a "control state" of the rule is applied to one or more devices associated with the condition.

Conditions in rules are met or unmet based on a comparison of an input with a threshold, a trigger, etc. that is built into the condition. The comparison may be a simple relationship (e.g., a direct equality, a <, or a > check of an input independent variable) or more complex evaluation of the input (e.g., a linear or non-linear expression, a graph, a look up table, etc.). In some cases, a condition may provide multiple thresholds, as with a bracket range (e.g., a room temperature must be between 64 and 72° F. for a condition to be met).

The input to the conditions may be temporal, environmental, user driven, etc. Temporal inputs may be a time or year (e.g., seasonal), a time of month, a time of week (e.g., weekdays and weekends), time of day (e.g., noon hour, sunrise, sunset). See FIG. 7 and its associated description. Environmental inputs may be based on external information and/or any of various sensors installed in or near the structure operating under control of the application. Such sensors include photosensors for monitoring irradiance inside or outside the structure under control of the application, temperature sensors for monitoring temperature inside or outside the structure under control of the application, occupancy sensors located rooms or other locations in structure under control, etc. Environment inputs may also include inputs from content generated inside or outside the structure. Such content may include weather information from commercial and/or governmental sources, power consumption/availability information provided from a local utility or governmental sources (or from within the structure itself (as determined by a building management system, for example)), etc. User inputs for conditions include manual control inputs provided via user interfaces for the device control applications, new user-defined conditions received by the applications from user interfaces.

Some rules are comprised is a single condition. If that condition is met, the rule control state is applied. Some rules are comprised of two or more conditions. Such multi-condition rules have their control states triggered only if some combination of its constituent conditions are met. In some embodiments, the constituent conditions are linked by a Boolean operator such as 'AND', 'OR', 'AND NOT', 'XOR', or another operator. In the case of an 'AND' operator, each of two conditions linked by the operator must be met in order for the control state to be applied. In the case of an 'OR' operator, any one of the two more linked conditions must be met in order for the control state to be triggered. In some embodiments, the rule weights two or more constituent conditions to determine whether the control state applies. For example, a 'condition 1' may be given a weight of 75% and a 'condition 2' may be given a weight of 25%. The weights may be applied as coefficients, strengths of connections (as in neural networks), etc.

The control states applied by a rule may drive an optical transition of an optically switchable device or maintain an optical condition in such device. For example, the level of tint in an electrochromic window may be maintained in existing state or transitioned to a different state depending on the control state determined by a rule for controlling the tint level. Other optical states that can be maintained or adjusted as a control state of rule evaluation include the level of opacity, reflectivity, color, etc. Other control states of rules include power consumption of one or more devices controlled by the rule, sensor monitoring of devices under control of the rule, etc. In some embodiments, the control state may force power consumption to drop to particular level. This may require a reduction in air conditioning a structure, which may in turn require electrochromic windows to tint to a particular level and/or require lights to dim to a particular level. In some embodiments, the control state may require that power consumption information be transmitted to a utility. In some embodiments, a rule control state may trigger monitoring of one or more sensors under control of the rule. The rule may require that sensor information be provided as input to an algorithm or algorithms running on a building management system or security system. In some cases, the sensor information (or a conclusion drawn from the sensor information) is conveyed off site to an entity not associated with the structure having the sensors. Such entity may be a private or governmental emergency response organization such as the local policed department or fire department.

Some applications and/or their associated network servers may provide 'programs' comprised of one or more rules. Within a program, the constituent rules may have different priorities or applicability under different ranges of conditions. For example, a Rule 1 may apply in the winter, and a Rule 2 may apply in all other seasons. In another example, a Rule 1 will apply when its conditions are met and Rule 2 will apply when its conditions are met and rule 1's conditions are not met. In other words, Rule 1 has a higher priority than Rule 2. See FIGS. 8A and 8B and their associated discussion below.

In certain embodiments, the application applies one or more maintenance rules. In such cases, the application is programmed to alert the user through the user interface when a maintenance issue arises. For example, it may be noted that a window is taking too long to tint. In certain embodiments, windows or other devices are depicted on a dashboard presented on user interface.

Description of Example Screen Shots

As explained, a window control application permits users to interact with devices via a user interface. A "graphical user interface" (GUI) or "user interface" allows users to interact with electronic devices via images or text commands. As used herein, a user interface is part of an application or provided via an application. User interfaces can be used in computers, hand-held devices, such as smart phones or tablets, portable media players or gaming devices, household appliances and office equipment. A graphical user interface represents the information and actions available to a user through graphical icons and visual, auditory, or other sensory indicators or secondary notation such as position, indentation, color, symmetry, audible pitch and patterns, and the like. Any user interface, graphical or otherwise, may employ textual elements, typed command labels or text or keyboard navigation. In a graphical user interface, user actions may be performed through direct manipulation of the graphical elements. In some embodiments, the interface also permits voice activated interaction. This may be appropriate for handicapped users and/or users who cannot conveniently interact tactilely with a GUI (e.g., users driving vehicles). A voice recognition tool such as the Dragon Naturally Speaking product from Nuance Communications may be employed for this purpose.

A graphical user interface uses a combination of technologies and devices to provide a platform that the user can interact with, for the tasks of gathering and producing information. Various graphical and/or textual features may be employed to assist user interaction with an application deploying a user interface. Examples of such features include windows, icons, menus (including drop down menus), pick lists, pointing devices, and the like. Icons such as slider bars, radio buttons, toggle switches, and the like may provide graphical control mechanisms.

Certain modes of interaction employ a touch screen or other physical input device to control the position of a pointer and presents information organized in windows and represented with icons. Available commands are compiled together in menus, and actions are performed making gestures with the pointing device. A window manager may facilitate the interactions between windows, an application, and a windowing system. The windowing system handles hardware devices such as touch screens, pointing devices and graphics hardware, as well as the positioning of the pointer.

In computational devices, these elements may be modeled through a desktop metaphor, to produce a simulation sometimes called a desktop environment in which the display represents a desktop, upon which documents and folders of documents can be placed and removed. Window managers and other software combine to simulate the desktop environment with varying degrees of realism.

In the examples of user interfaces described below, the user interface comprises a group of screens and associated control and functionality that can receive user input and respond to that input by taking certain actions. Some of the actions whether triggered by the user input, or otherwise, result in changes in the information displayed on the display screen. Such changes may involve accentuation of different features, movement of slider bars, transition to different windows, etc.

The concept of a user interface, as used herein, not only incorporates the information displayed on a screen at any given instant in time but the associated logic and algorithms underlying that displayed information. Such logic and algorithms received as input, user inputs, parameter values from sensors or other monitoring devices used by the network window controller, external source feeds, schedule information, etc. In the relevant embodiments, the information displayed by the user interface may include textual information, graphical information, audio information, tactile information, olfactory information, video information, etc.

FIGS. 4A-G, 5A-H, 6A-E, 7A-E, and 8A-B present screenshots of various user interfaces that may be employed with certain window controller applications. The user interface is shown from a display of a tablet device or a smart phone. As mentioned, other types of remote devices may be substituted. Further, while the screenshots show the user interface implemented via touchscreens, other interface selection mechanisms such as pointer-based interfaces may also be employed. Still further, the interface features depicted in the screenshots are for illustration only and various other user interface implementations may be appropriate.

Figure 4A:
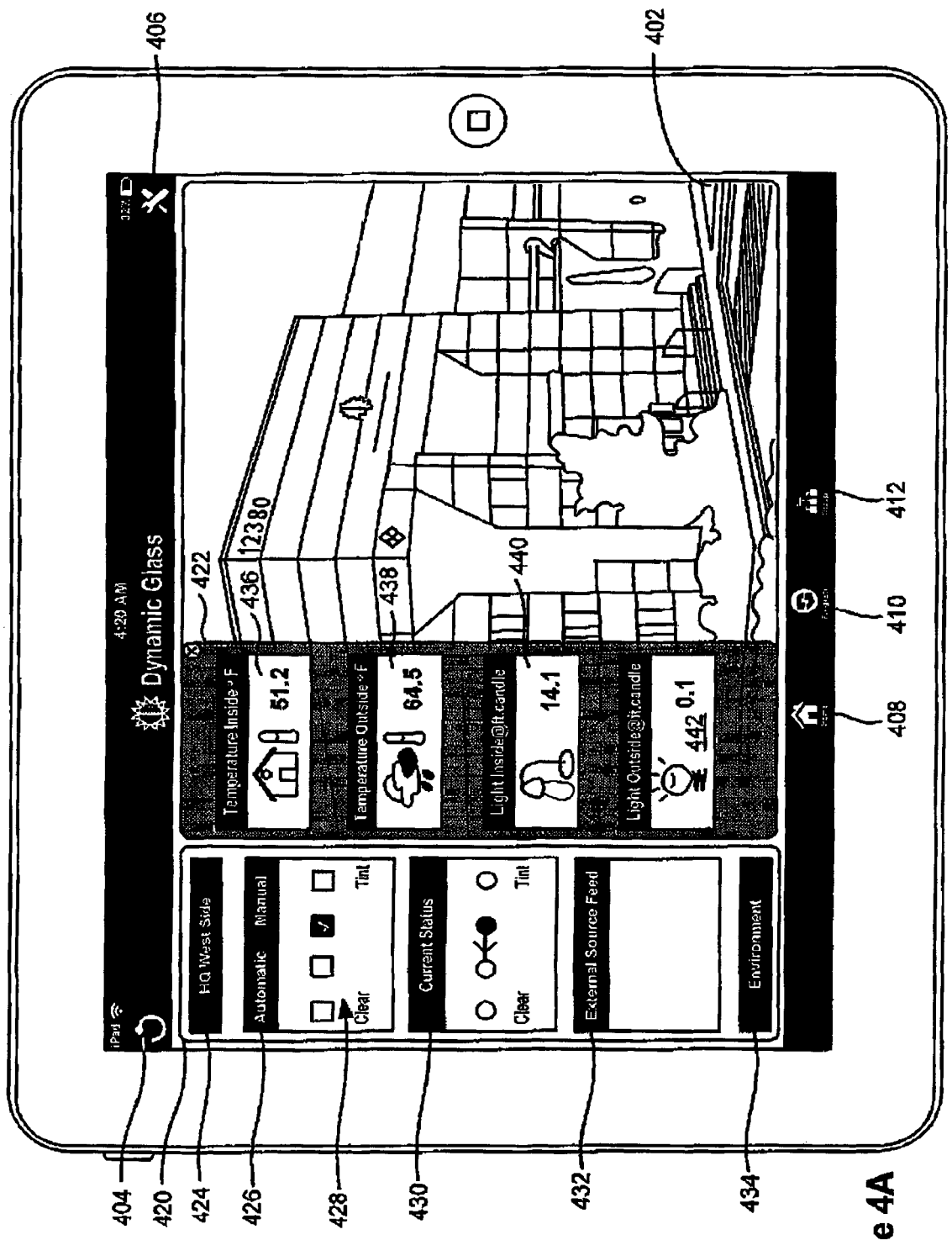
FIGS. 4A-4G are screenshots depicting home screens and a configuration screen for window control applications as displayed on a computational tablet.

FIGS. 4A through 4G depict "home screens" for applications running on a tablet type mobile device and displayed on display device 402. FIG. 4A presents a specific embodiment of the home screen. FIGS. 4B through 4G depict certain variations on the home screen depicted in FIG. 4A.

The display shown in FIG. 4A has certain buttons located around the periphery of the home screen. These buttons enable navigation to other screens in the user interface and/or activation of certain functions permitted by the application. In the top left corner of the display screen, a button 404 containing a partial circle with an arrowhead enables the user to return to a previous screen. In the top right-hand corner of the home screen 402, a button 406 containing a wrench and screwdriver icon permits activation of a configuration function. The configuration function allows, for example, input of an IP address for an associated window controller, commissioning of various windows, sensors, window controllers, etc. A screenshot depicting some features of a user interface for the configuration function are depicted in FIG. 4G as described below. At the bottom of the home screen 402, three additional buttons with icons are displayed. The left most of these is a home button 408, which when activated causes the application to return to a home screen such as that depict in FIGS. 4A through 4F. Typically, this home button will be visible in all other screens of the application. Such other screens may include, for example, a configuration screen, a group options screen, a schedule program screen, etc. To the right of home button 408 is a "program" icon and associated button 410. Selection of this button takes the user to a screen providing functionality for creating, reviewing, editing, and/or deleting particular window control programs, such as programs based on sensor input (see, FIGS. 8A and 8B) and programs based on scheduling (see, FIGS. 7A-E). To the right of the program button 410 is a group button 412, which when selected by the user displays a screen allowing users to commission devices and/or define groups containing one or more devices. Examples of such group screens are depicted in FIGS. 6A-E.

Within the interior of the home display screen, an appropriate background image may be depicted. In the illustrated example, a building belonging to Soladigm Corporation (now View, Inc.) is depicted. In various embodiments, the user is permitted to customize the background image presented in the home screen. For example, the user may enter a geographic location specified by an address, a zip code, latitude and longitude coordinates, etc. Many other possibilities will be apparent to those of skill in the art. For example, the background may be a video feed from a security camera or other remote monitoring tool.

On the left side of the interior region of the home screen shown in FIG. 4A are two panels, a control and status panel 420 to the far left and an environment panel 422 to the immediate right of the control and status panel. The control and status panel provides status and control functionality for a "group," which group is identified by the name of the group as presented at a location in a "group subpanel" 424. In certain embodiments, multiple available groups are made visible in the application. These may be selected, in certain embodiments, via a pick list or other interface function, as depicted in FIG. 5G below.

Below the group identifier 424 is a control subpanel 426 containing buttons allowing the user to select either an automatic mode or a manual mode. Automatic mode provides control via one or more preset algorithms, programs, or rules resident on (or available to) the network window controller. Examples of such programs include schedule-based programs and sensor-based programs. In certain embodiments, the automatic button of the control subpanel 426 is implemented as a drop-down menu or pick list of available automatic programs the user can select, such as in the embodiment shown in FIG. 5H.

In the subpanel 426, a "manual" mode button is displayed as an alternative to the "automatic" mode button. That is, only one of these two buttons is selected at any instance in time. In the screenshot depicted in FIG. 4A, the manual mode button is selected. When the manual mode is selected, the user is presented with options for controlling the appropriate optical property of the windows in the currently selected group. In the depicted example, four checkboxes 428 are presented to permit the user to select any one of these. Each selection checkbox specifies a level of tint for the windows in the currently selected group. The leftmost one of these boxes, when selected, places the window or windows from the group in a clear state. The rightmost button, when selected, places the window or windows in the most tinted state. The intermediate buttons, permit the user to select intermediate states between the most clear and most tinted states. Other manual control features are presented in some embodiments. In one example, a lighting dimmer function is presented for manual control in the application's user interface.

Continuing downward in control the status panel 420, there is a status subpanel 430 which depicts the current status of the window or windows under the currently selected group. In this example, each available level of tint, and there are four of them in this example, has its own icon. Typically, only one of these will be accentuated at any given time, and this indicates in which of the available levels of tint the window currently resides. When the window is transitioning from one level of tint to another level of tint, there may be in arrow, as shown in the depicted embodiment, illustrating the transition from one state to another state. When the window(s) reaches the selected level of tint, the arrow disappears.

Continuing down the control and status subpanel 420, an external source feed subpanel 432 is shown. In the depicted embodiment, a selection of this button permits the user to identify an external source of content that may be displayed or otherwise provided to the application. For example, a source of local weather information such as the Weather Channel™ may be selected by the user to provide input to the application. Such input could be displayed in a window associated with subpanel 432 and/or used to provide weather information that might be an input parameter for one or more programs or rules that automatically control the optical state of the one or more windows in the selected group. The user may enter the external feed by keying in a URL associated with the source. In some embodiments, multiple sources are provided as predefined options through the user interface. In some implementations, the external feed is triggered by a user input that is interpreted as a request for a particular type of external feed. For example, a user may enter his/her geographic information (e.g., a postal zip code) or current location (through GPS for example) and the application will automatically provide content tailored for the location. Such content may be weather information for the user's location or zip code.

Finally, in the control and status subpanel 420, there is an environment button 434. When a user activates this button, the home screen displays an environment panel 422. In FIG. 4A this panel appears to the immediate right of the control and status panel 420. In the depicted embodiment, environment panel 422 shows the current status of for sensors associated with the currently selected group identified in group panel 424. In the depicted example, the inside and outside temperatures associated with a selected group are displayed at sub panels 436 and 438, respectively. Additionally, current values of the inside and outside light intensities are presented in subpanels 440 and 442 respectively. Each of the values depicted in environment panel 422 is provided from one or more associated sensors belonging to the group under consideration.

Figure 4B:
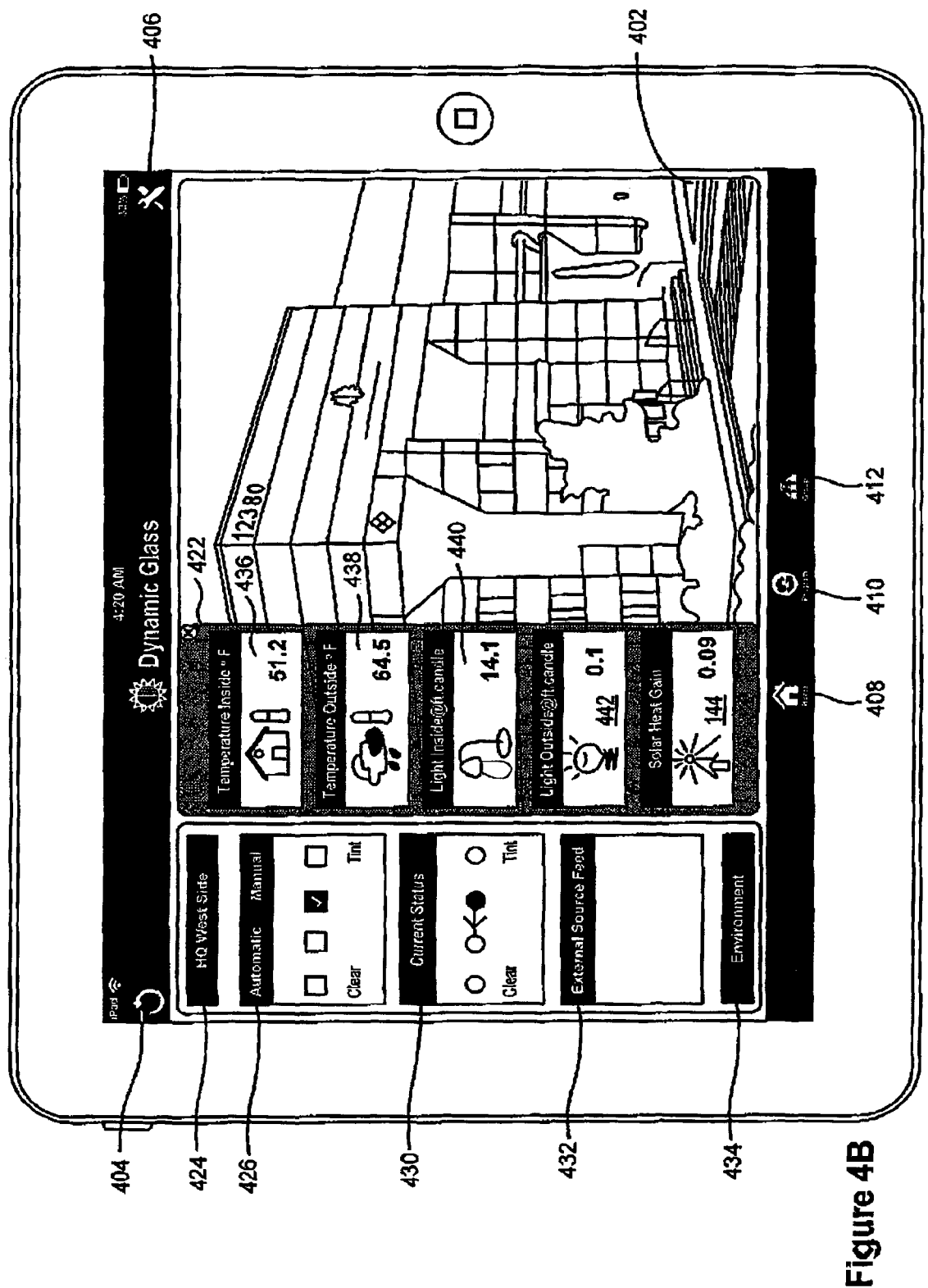

FIG. 4B presents a variation of home screen 402 in accordance with a slightly modified embodiment. In most regards, the home screen and displayed information is similar to or identical to that depicted in FIG. 4A. However, subpanels 426 and 430 of the control and status panel 420 contain additional information about the tinting levels of states that can be manually selected by users. More specifically, the level of transmissivity associated with each of these states is numerically depicted in subpanels 426 and 430.

Additionally in FIG. 4B, the environment panel 422 includes a further subpanel 444 which provides the solar heat gain for the selected group. The solar heat gain represents the amount of solar radiation contributing to the lighting in the room or group under consideration. Similar types of subpanels may provide other types of beneficial or generic environmental information such as, for example, the associated reduction in heating or air-conditioning load due to the current window state, a carbon dioxide savings value associated with the window state, etc.

Figure 4C:
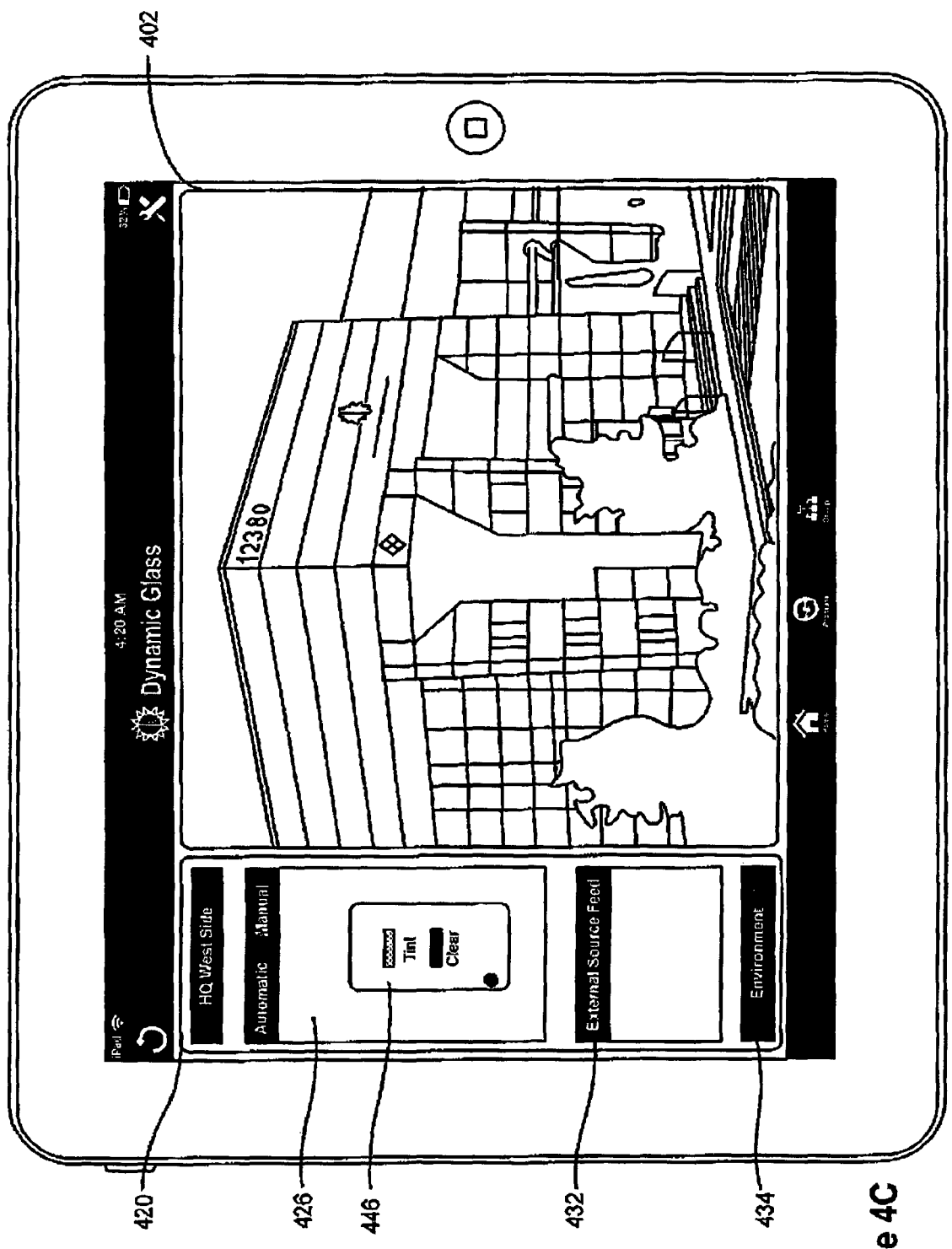
Figure 4D:
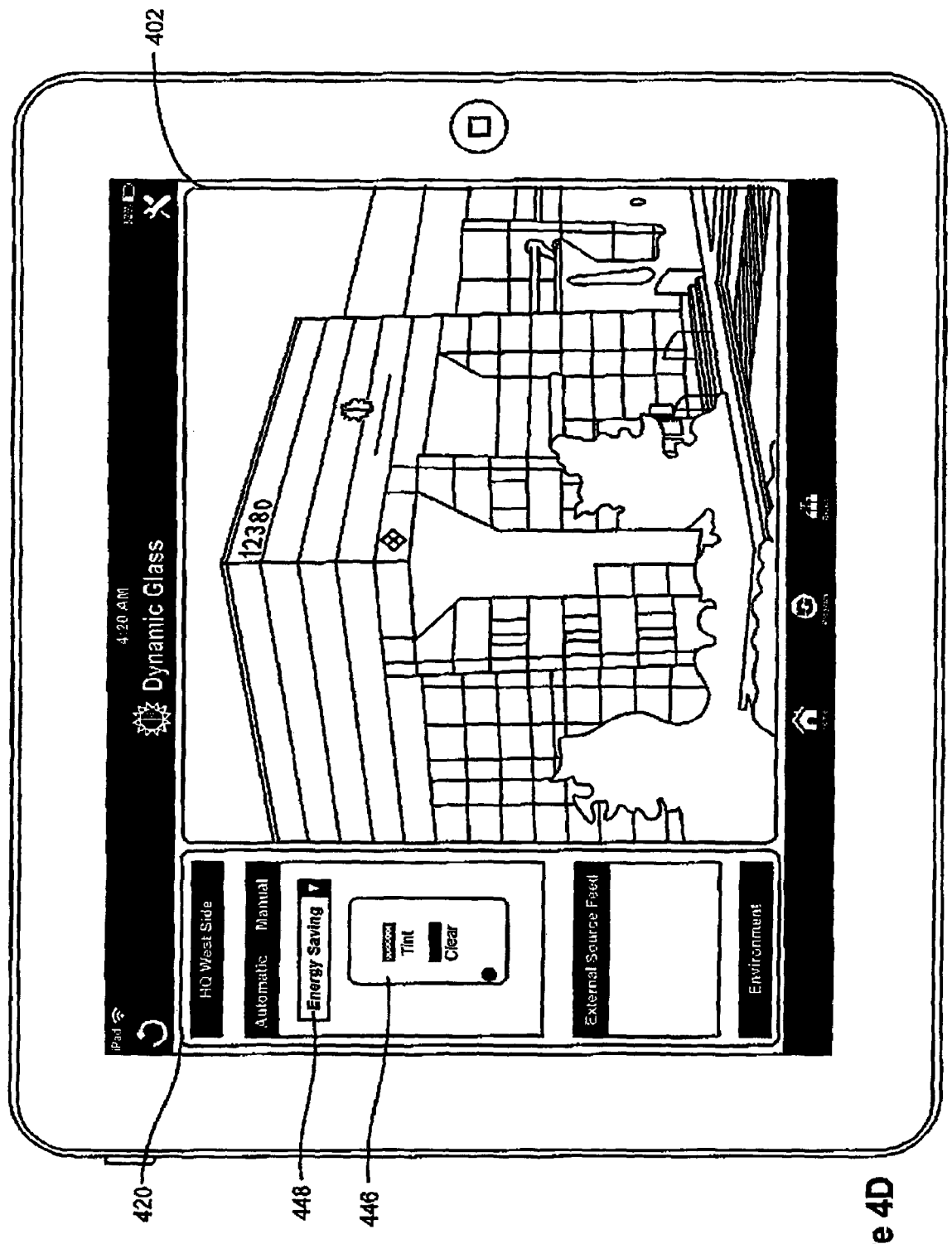
Figure 4E:
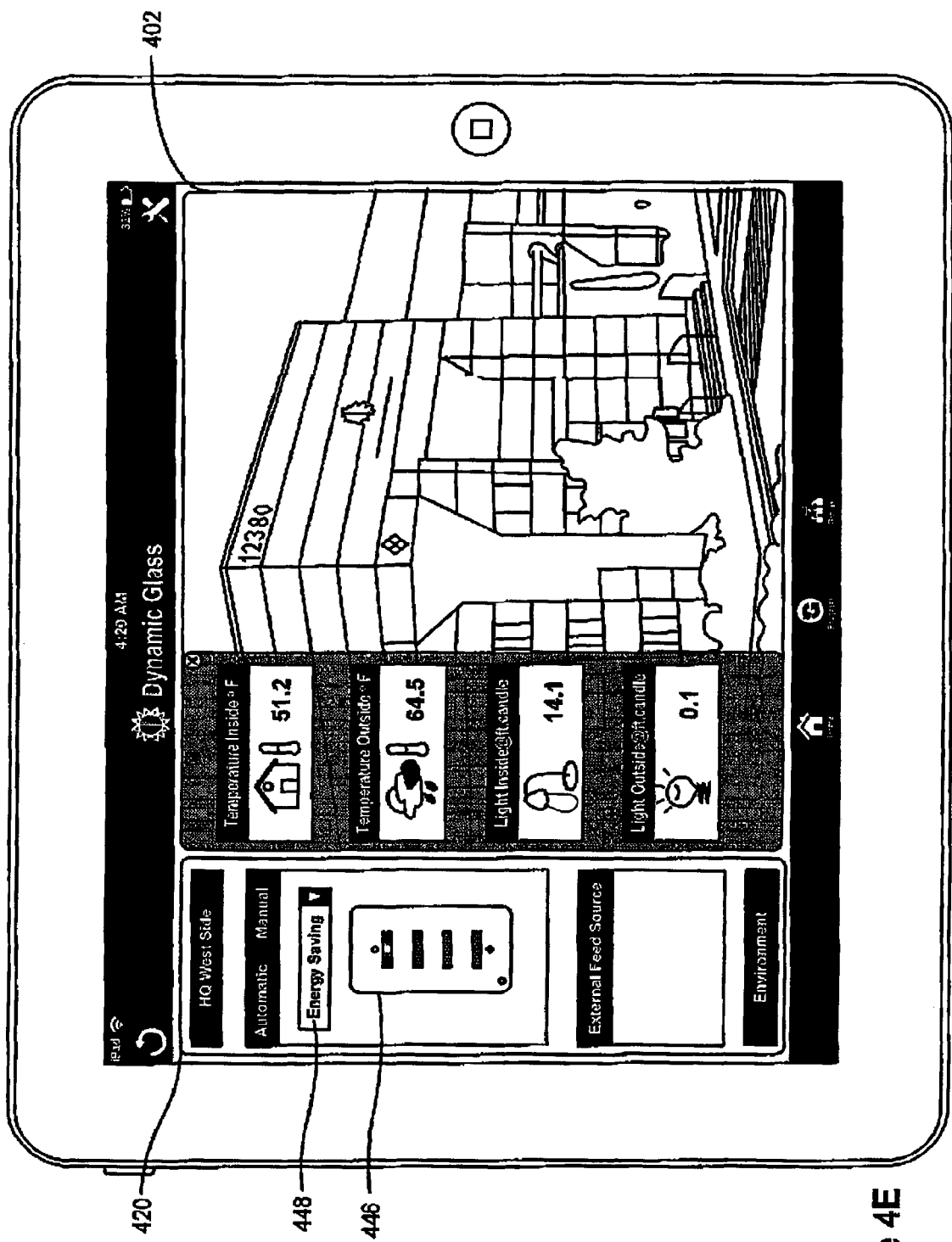

While FIGS. 4A and 4B depict cases where the user application controlling the network window controller is in a manual mode, FIGS. 4C through 4E show the same application operating the network window controller in automatic mode. FIG. 4C provides another view of the home page 402. As shown there, the environment panel 422 has been removed from the display of home screen. That is, panel 422 has been deselected. Additionally, the control and status panel 420, and more specifically, the manual/automatic subpanel 426 has been toggled to the automatic mode. In this mode, the current state of the window tinting is depicted via an icon or graphical representation of a controller 446. Many other depictions of the current state could be substituted. In the depicted embodiment, the controller graphical feature 446 has clear and tint "lights" that are highlighted depending upon which of two available states is currently selected. In one embodiment, when the system is transitioning from one state to another, the target state "light" in feature 446 blinks. Note also that subpanels 426 and 430 are merged, as the current status is effectively depicted by graphical feature 446.

FIG. 4D shows home screen 402 operating in a mode where there are multiple available automatic programs that a user can select. As with the screenshot shown in FIG. 4C, the current status of the windows in the selected group is depicted by way of a controller icon 446. However, because the network window controller has multiple available programs for controlling the windows in the selected group, an additional menu or pick list 448 is displayed, to allow the user to select one of the available programs.

FIG. 4E presents a home screen 402 that is very similar to the one depicted in FIG. 4D. One difference is that the selected automatic program has four available states rather than two available states. These four available states are depicted in the controller icon 446. Another difference from FIG. 4D is that the environment panel 422 is activated here, similar to that in FIG. 4A.

Figure 4F:
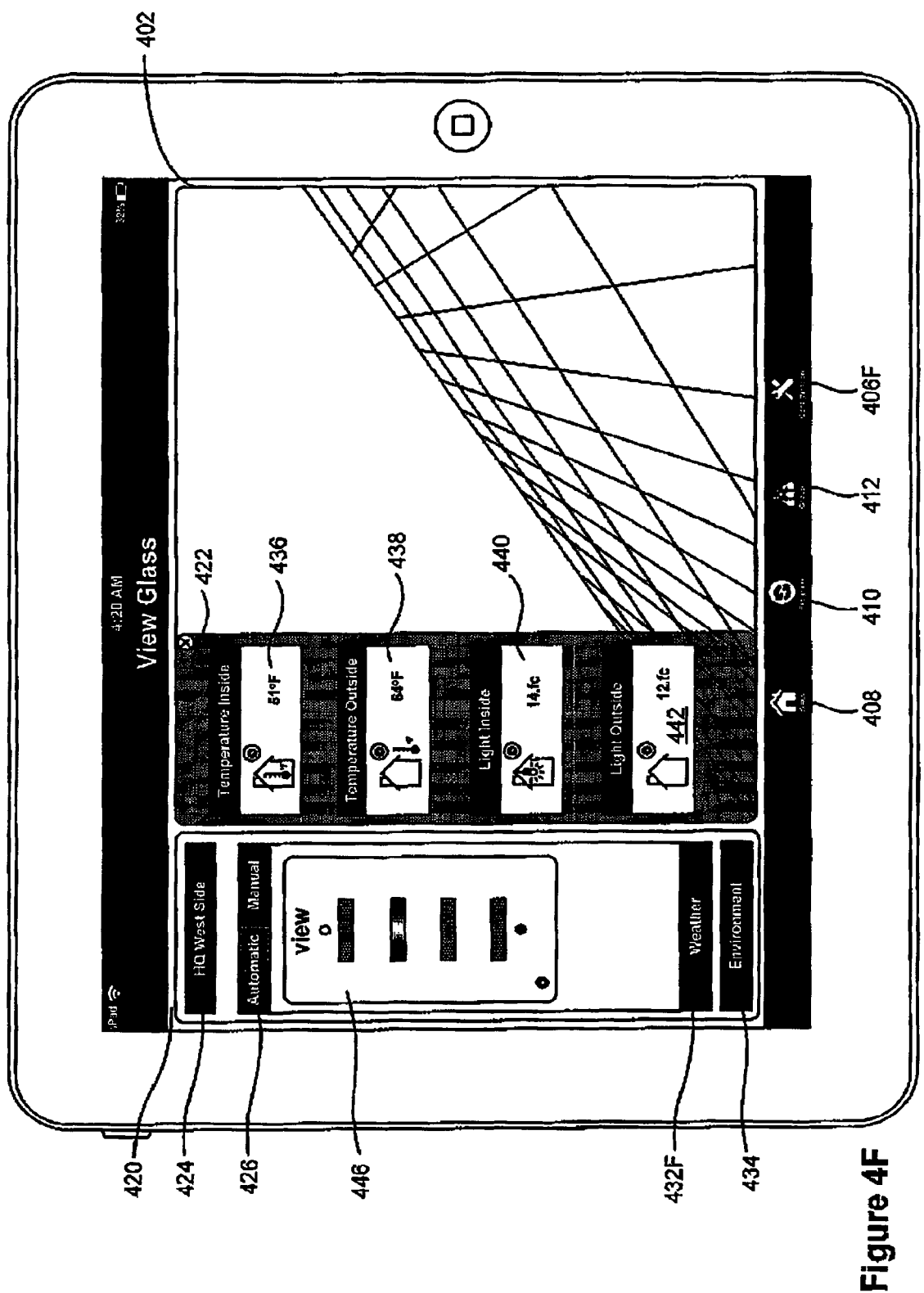
Figure 4G:
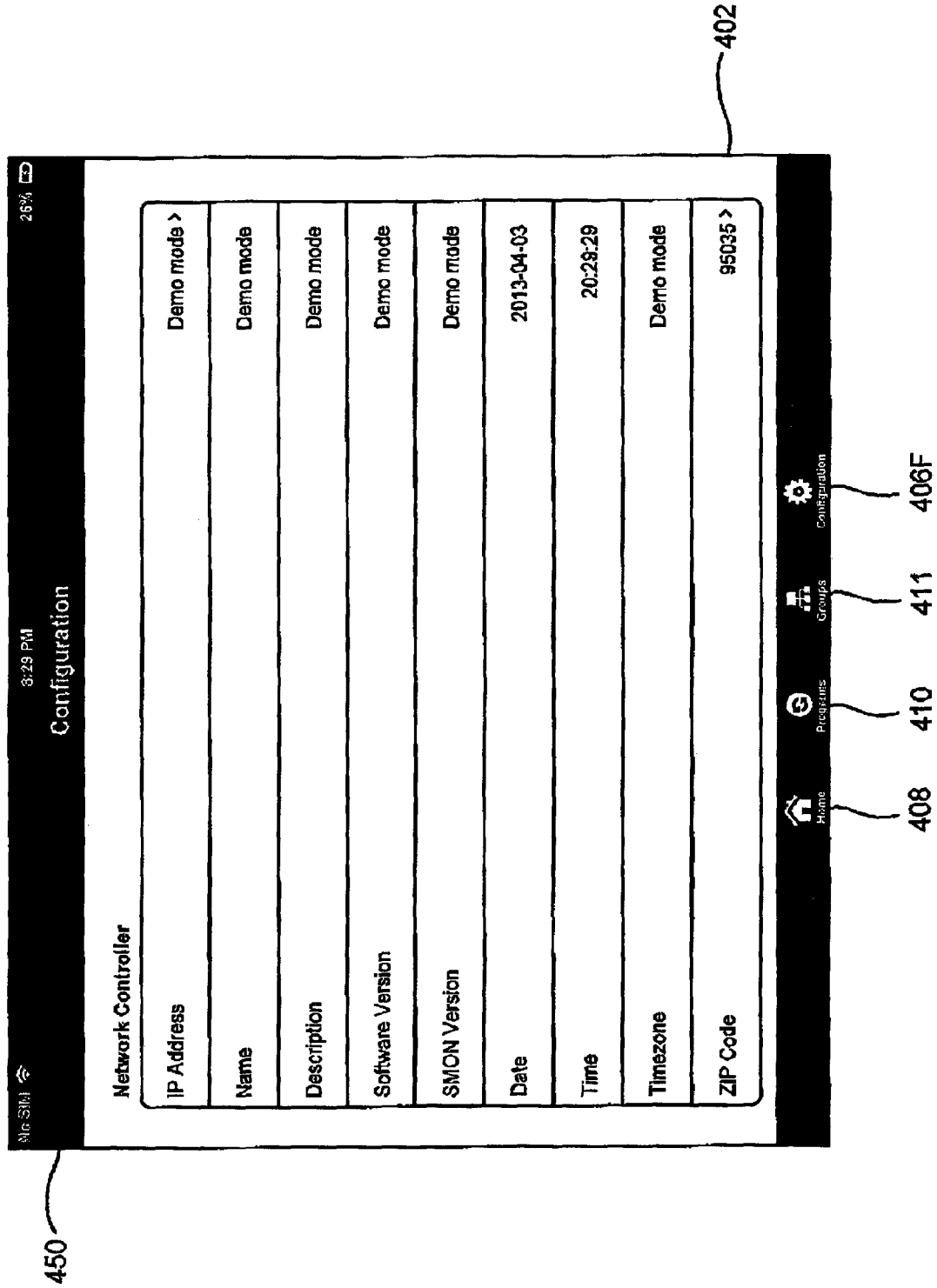

FIG. 4F presents a home screen 402 that is similar to the one depicted in FIG. 4E. The first difference is the background display of this home screen having a different image. The second difference between this home screen from that of FIG. 4E is the location of the configuration button 406F being at the bottom of the screen instead of the upper right-hand corner. Pressing the configuration button activates a configuration screen as depicted in FIG. 4G. Another difference is that the manual/automatic subpanel 426 has been toggled to the manual mode. As in FIG. 4C-E, the current tinted level is indicated by a lit indicator in 446, and the transitional interim period is indicated by a flashing indicator. Furthermore, the external source feed subpanel 432 in FIG. 4A-E has been replaced by the weather subpanel 432F.

FIG. 4G shows a configuration screen 450 activated by the configuration button 406F. The configuration screen allows a user to view and edit relevant information for devices of a window system such as IP address, name and description of a profile, software and hardware version, current date and time, time zone, zip code, etc.

FIGS. 5A through 5H depict control, status, and environment panels similar to those depicted in the home page display 402 of FIGS. 4A through 4E. However, these panels are implemented on a smartphone having a relatively small display screen. While tablets typically provided display screen having a size of about 5 inches to 10 inches diagonal, smart phones have display screens of about 2 inches to 5 inches diagonal. Thus, it is not convenient to display as much information on a single screen of a smartphone as can be displayed on a single screen of a tablet.

Figure 5A:
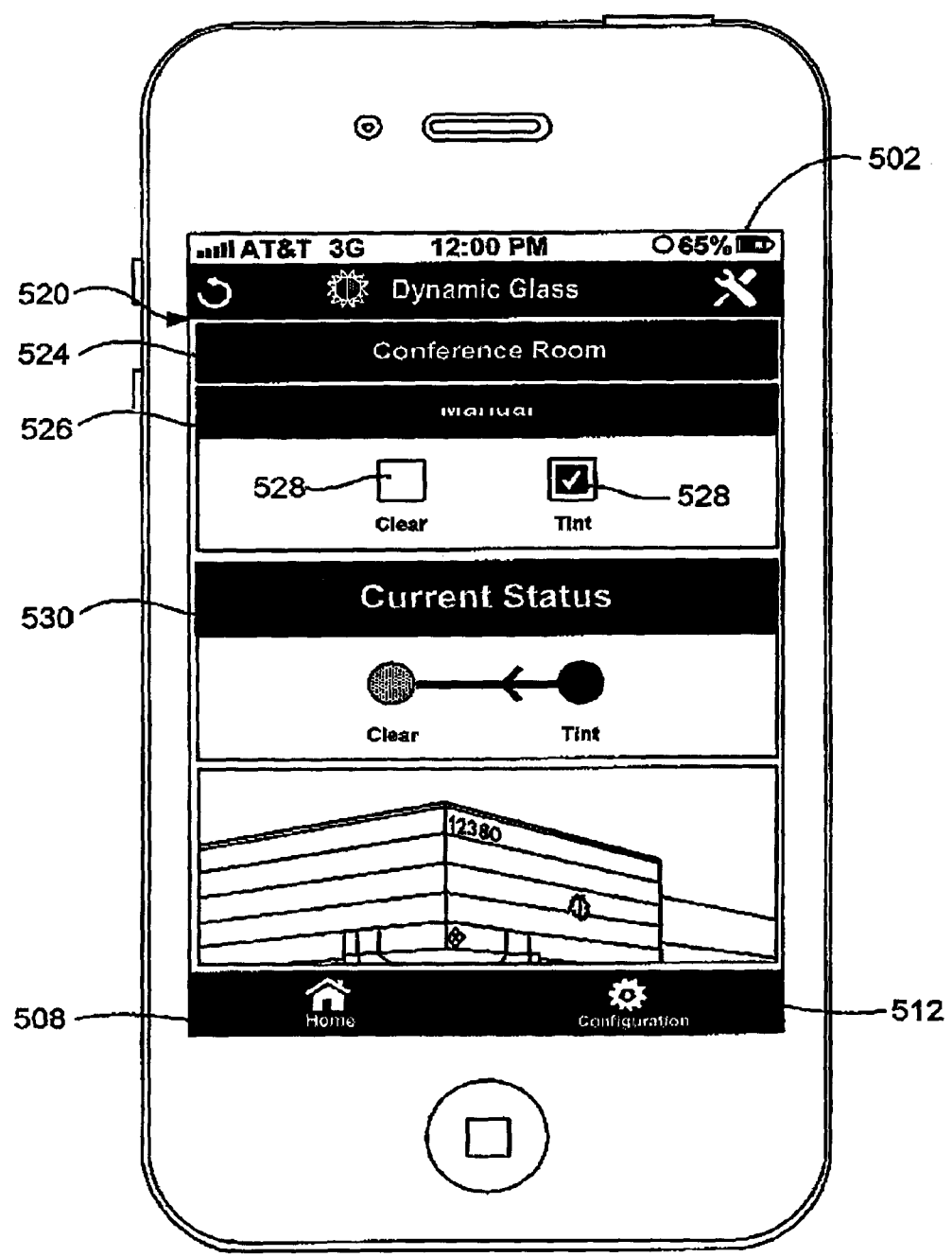
FIGS. 5A-5H are screenshots of home screens for window control applications displayed on a smart phone.

In FIG. 5A, a smartphone display screen 502 displays a status and control panel 520. This panel effectively occupies most or all the smartphone's display screen. In a "group" subpanel 524, the device group is identified. In this case, the group is identified as "Conference Room." Below the group subpanel is a control subpanel 526 that includes checkboxes 528 that allow the user to specify a clear or tint state for the window or windows in the Conference Room group. In the depicted implementation, the control subpanel 526 indicates that the application is currently operating in manual mode. Immediately below the control subpanel 526 is a status subpanel 530. In the depicted screenshot, the status subpanel shows that the window or windows in the Conference Room group are currently transitioning from tinted to clear. At the bottom of display screen 502 of the application's user interface are a home page button 508 and a configuration button 512.

Figure 5B:
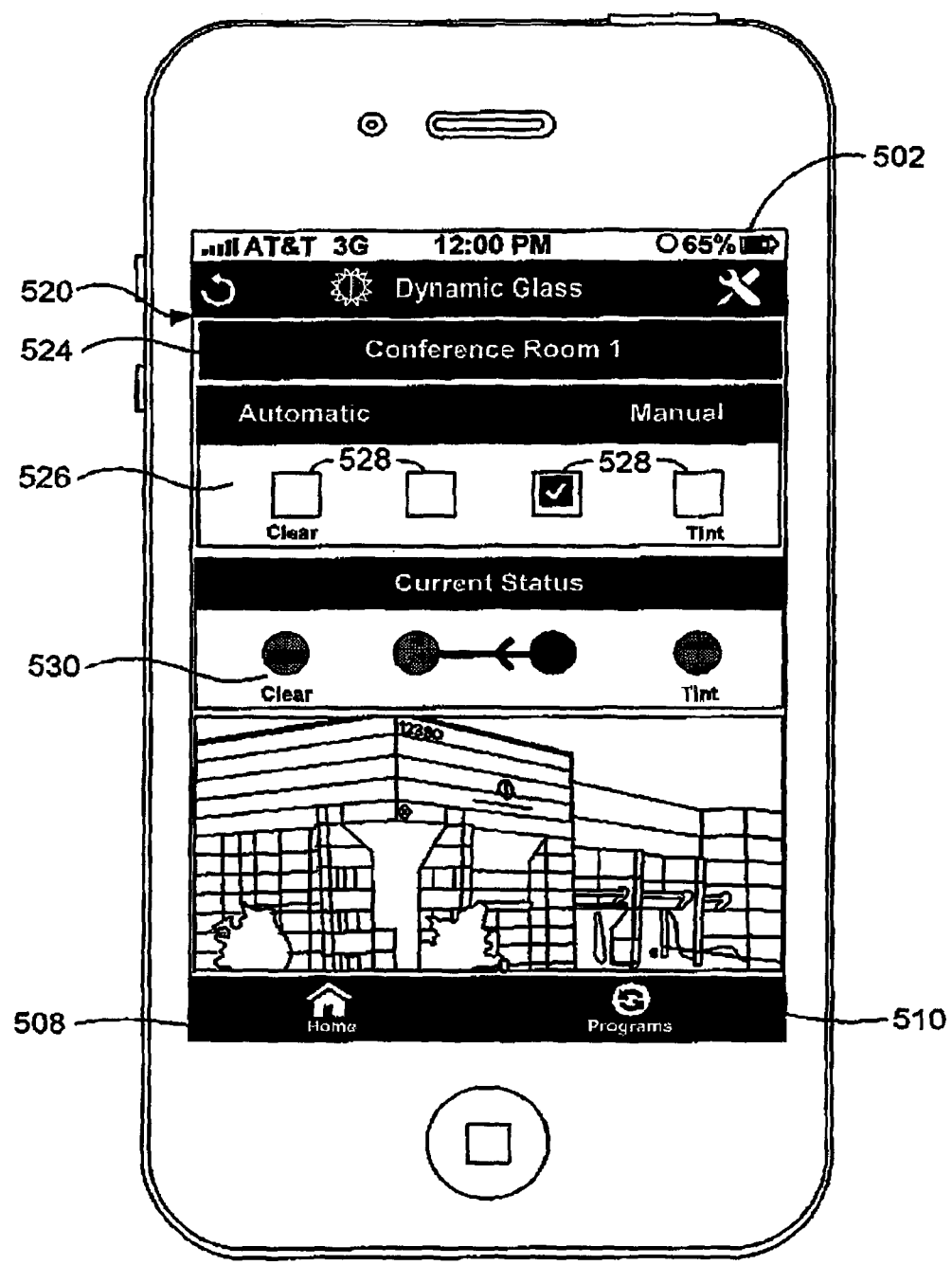

Turning now to FIG. 5B, a similar user interface screen is displayed on a display screen 502 of the smartphone. In this depiction, the control and status panel 520 includes the group subpanel 524, the control subpanel 526, and the status subpanel 530. The control subpanel 526 depicted in FIG. 5B shows that the group "Conference Room 1" has both automatic and manual modes available. The manual mode is currently selected. In this mode, the user is given four options for setting a level of tint. These options are provided by four checkboxes 528 in the control subpanel 526. As depicted, the user has selected an intermediate state of tint. Accordingly, the status subpanel 530 indicates that the window or windows in Conference Room 1 are currently transitioning from one intermediate state to a different intermediate state, which was selected by the user. Screen 502 also presents a program button 510.

Figure 5C:
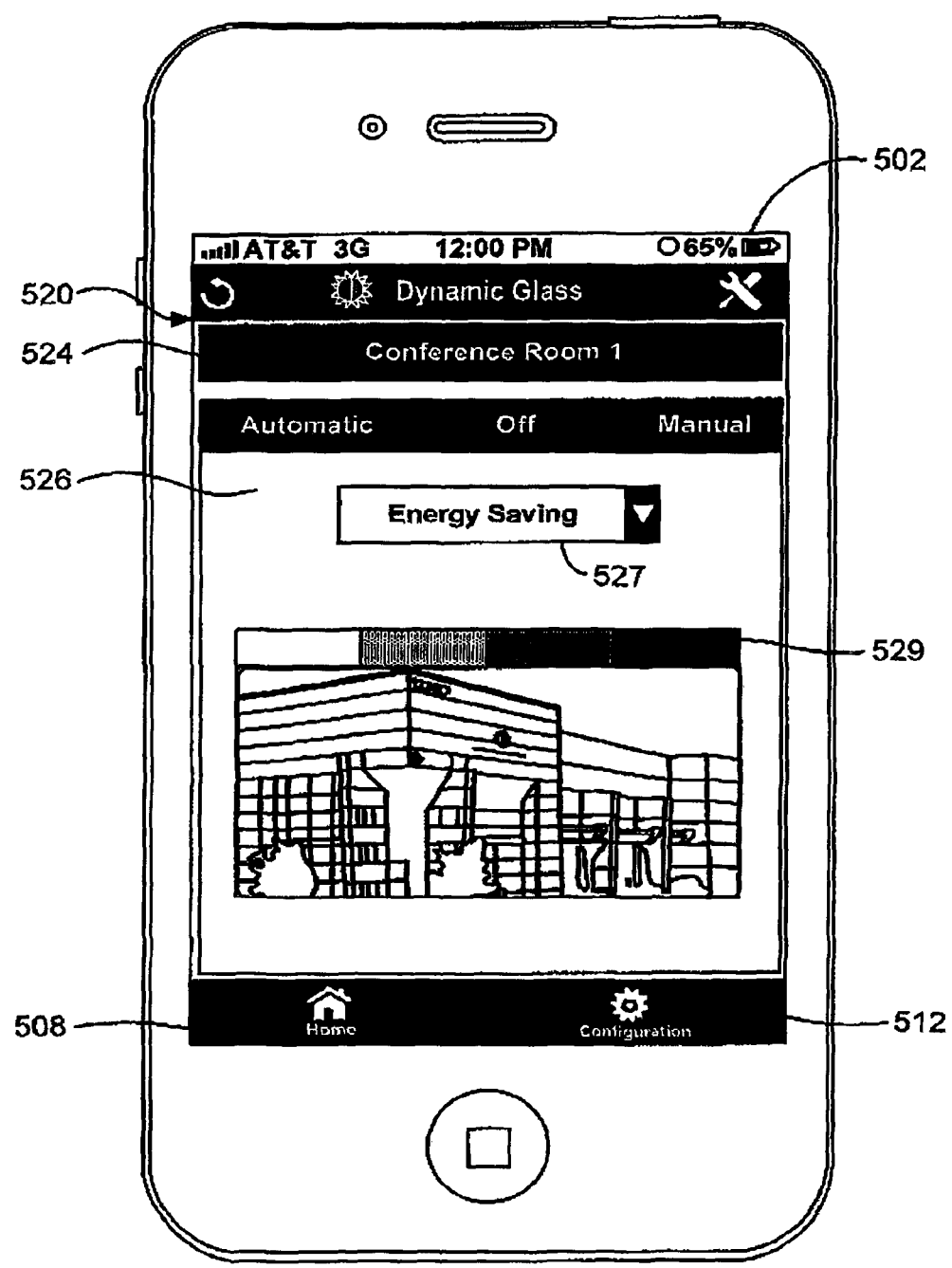

FIG. 5C depicts another version of control and status panel 520. In this embodiment, the control subpanel 526 is merged with the status subpanel 530 when the selected group (Conference Room 1) is operating in automatic mode. In this mode, the application's user interface presents a menu or pick list 527 of multiple programs available for automatic control of the window or windows in Conference Room 1. In the depicted screenshot, a program named "Energy Saving" is in operation. The current tint status of the windows in Conference Room 1 is depicted by a bar-shaped indicator 529 which identifies each level of tint as a separate rectangle within the bar. The rectangle second from left on the bar indicator 529 is currently highlighted, indicating that a second level of tint is currently applied to the window or windows in Conference Room 1.

Figure 5D:
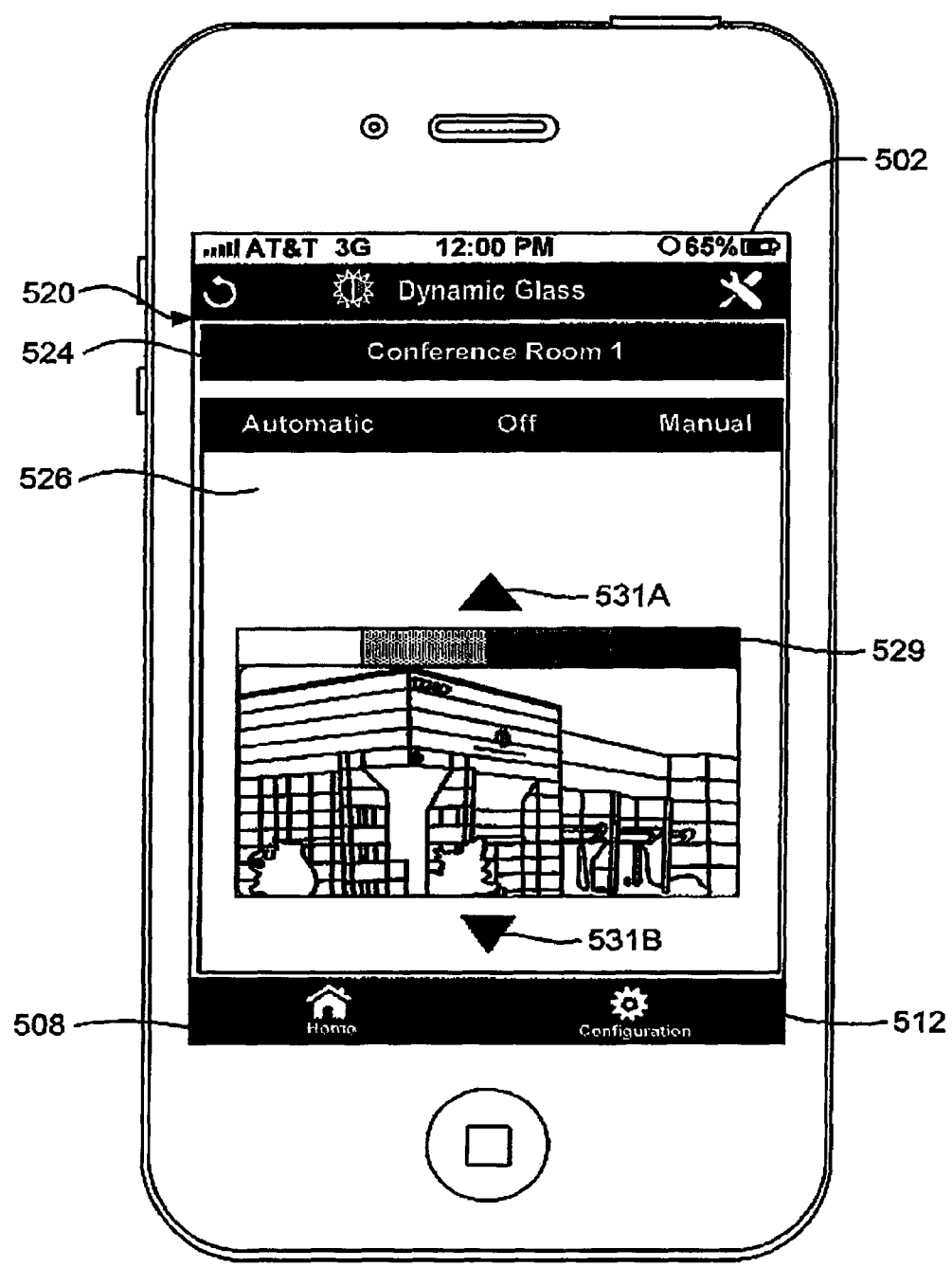

FIG. 5D depicts the control and status panel of FIG. 5C operating in a manual mode. In manual mode, the panel screen is provided with up and down arrows 531A and 531B which allow the user to adjust the tint of the window or windows in Conference Room 1 to a clearer or more tinted state.

Figure 5E:
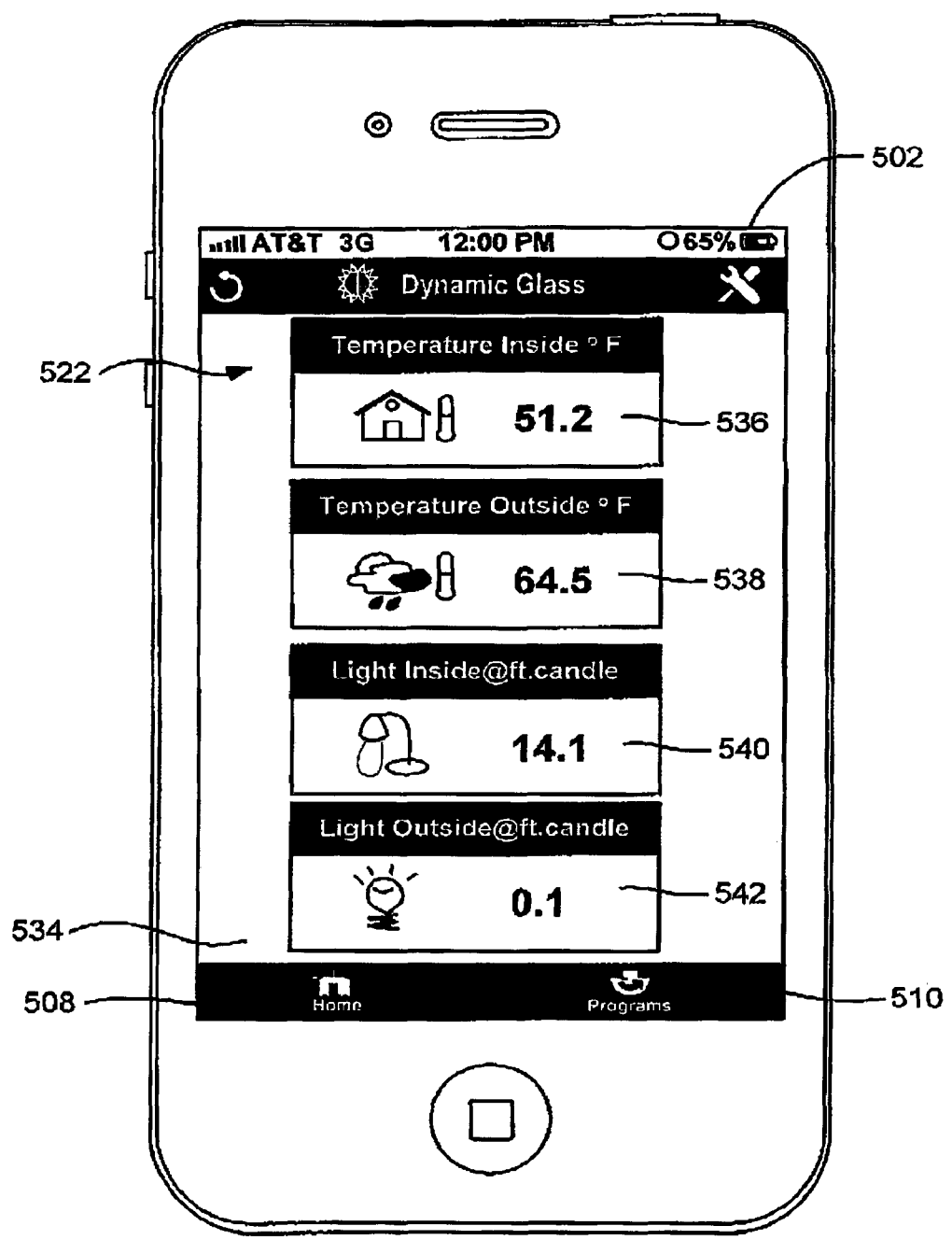

FIG. 5E depicts an environment panel 522 analogous to environment panel 422 shown in FIG. 4A. Panel 522 contains subpanels for depicting the inside and outside temperature (subpanels 536 and 538, respectively), as well as subpanels for depicting the light irradiance inside and the light irradiance outside (subpanels 540 and 542, respectively).

Figure 5F:
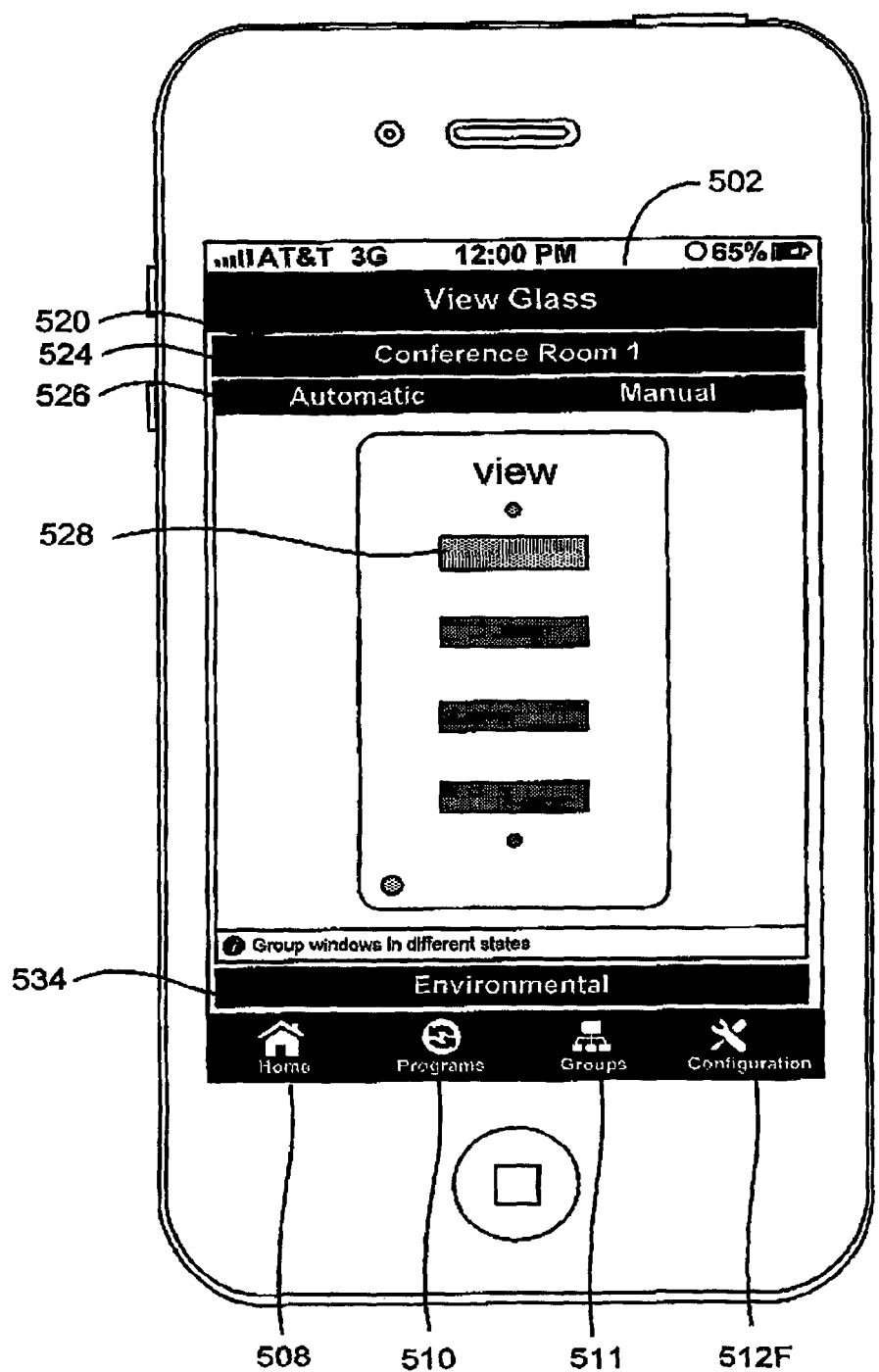
Figure 5G:
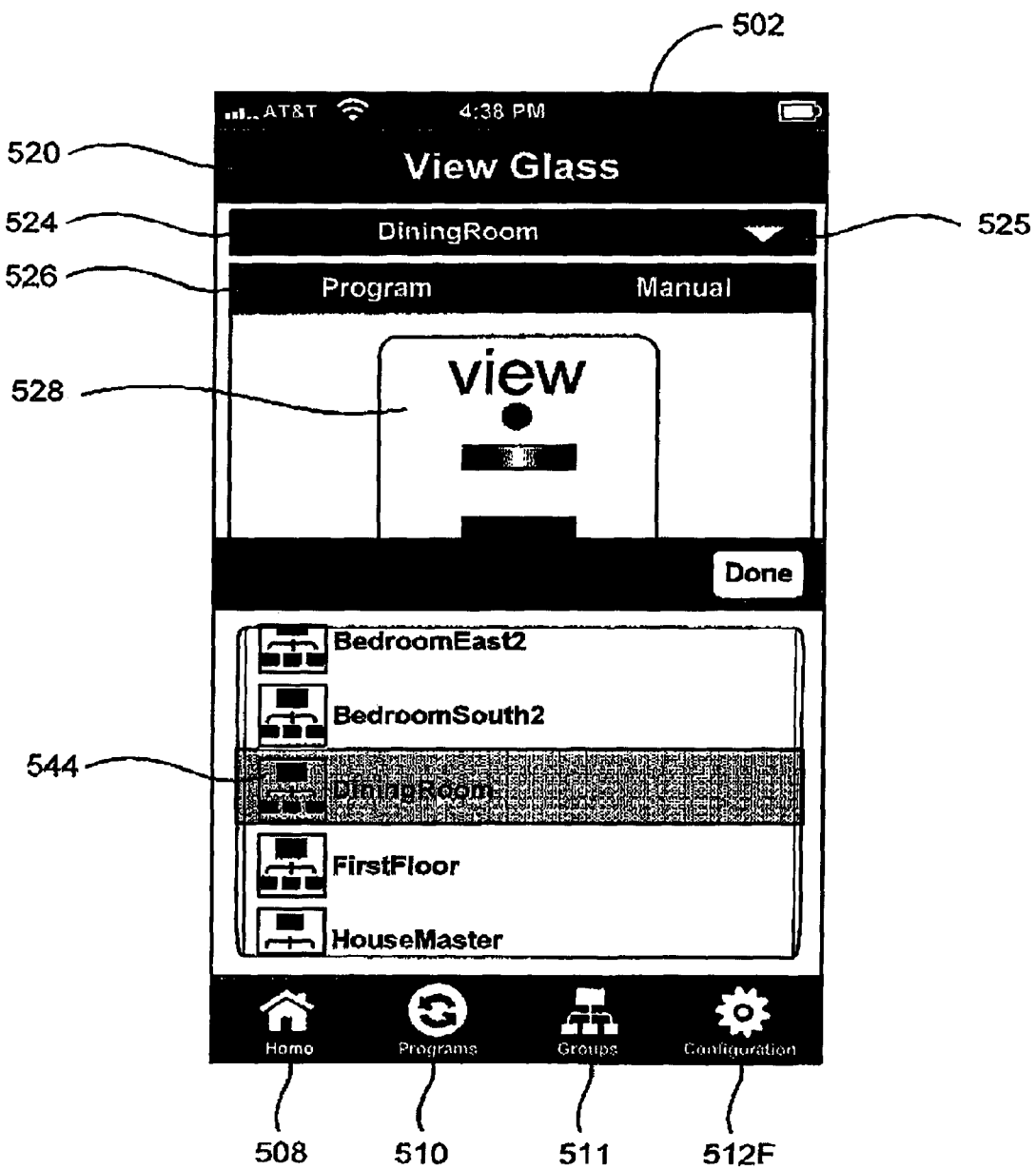

FIG. 5F depicts another version of control and status panel 520. In this embodiment, the home screen has four icons and buttons at the bottom of the screen, including the home button 508, the program button 510, the group button 511, and the configuration button 512F. The group subpanel 524 is set for "Conference Room 1" group, and it allows selection of different groups as shown in FIG. 5G. The control subpanel 526 is set at the manual mode, which can be toggled between automatic (or program) mode and manual mode. The control subpanel includes four selectable indicators 528 for the tint levels of windows belonging to the "Conference Room 1" group, with the top indicator representing the clearest level and the bottom one indicating the darkest tint level. The intermediate indicators represent intermediate tint levels. The first indicator from the top is currently highlighted, indicating that the clearest level is currently applied to the window or windows in Conference Room 1. In this embodiment, each indicator of 528 flashes during transition to the corresponding level of tint. At the bottom of the home screen is an environmental subpanel 534, which allows the activation of an environmental panel 522 similar to that shown in FIG. 5E.

FIG. 5G depicts a group pop-up screen 544 for selecting one of multiple defined windows or groups, which is activated by an drop-down button 525 in the home screen. In this example, by selecting the "DiningRoom" group in a spin wheel list, a user can simultaneously control multiple devices that belong to the defined DiningRoom group through the control subpanel 526 and the selectable indicators 528. FIGS. 6A-E below further illustrate a feature that permits defining and using groups.

Figure 5H:
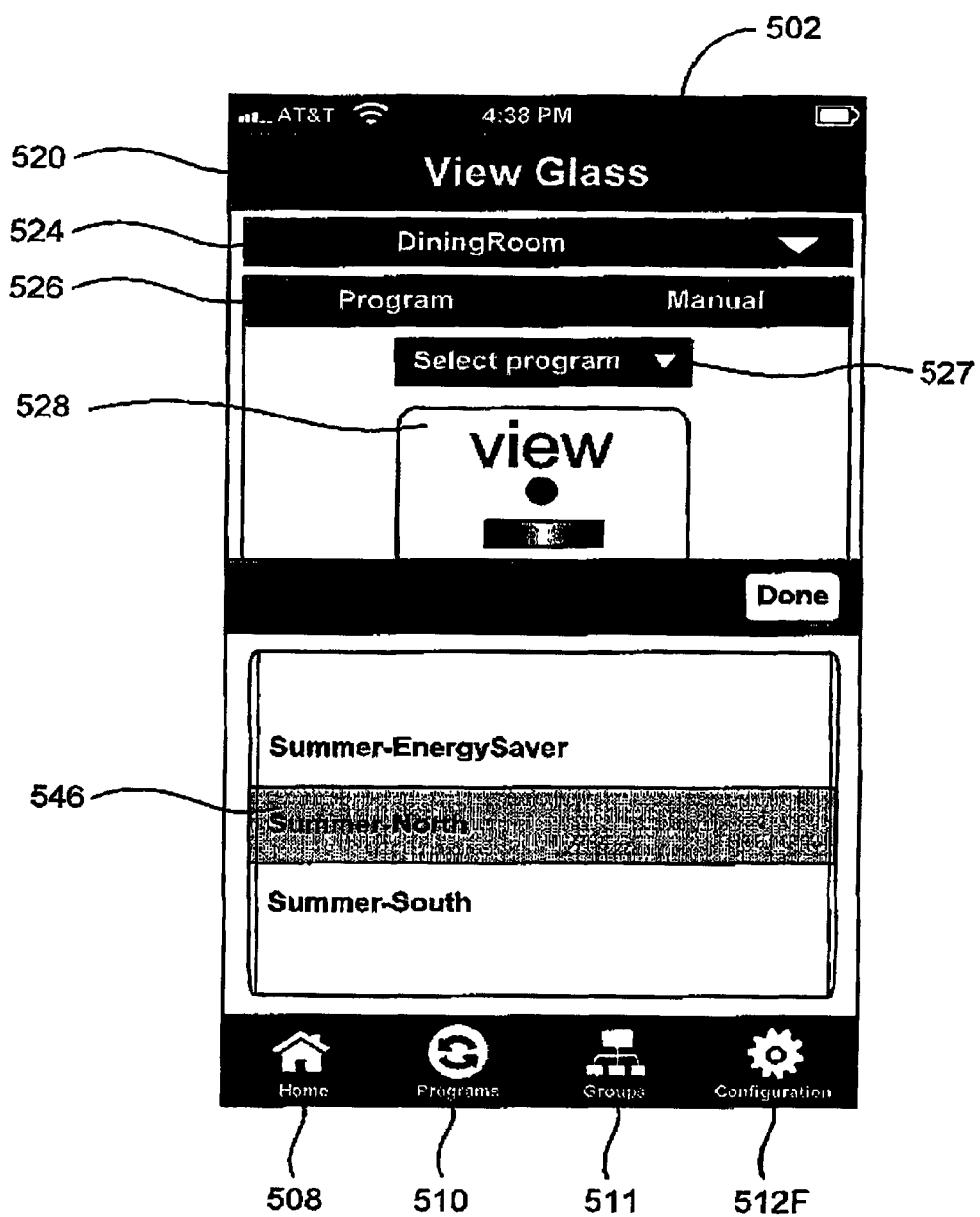

FIG. 5H depicts a program pop-up screen 546 for executing an automatic program to control all devices belonging to the "DiningRoom" group (or any other selected window or group) when the program mode is selected in the control subpanel 526. The program pop-up screen 546 is activated by the drop-down button 527. By selecting a program in the pop-up window 546, e.g. "Summer-North" program in this example, a user can apply one of predefined programs to devices that belong to a group. FIGS. 7 and 8 below further illustrate the feature to define and use programs.

Figure 6A:
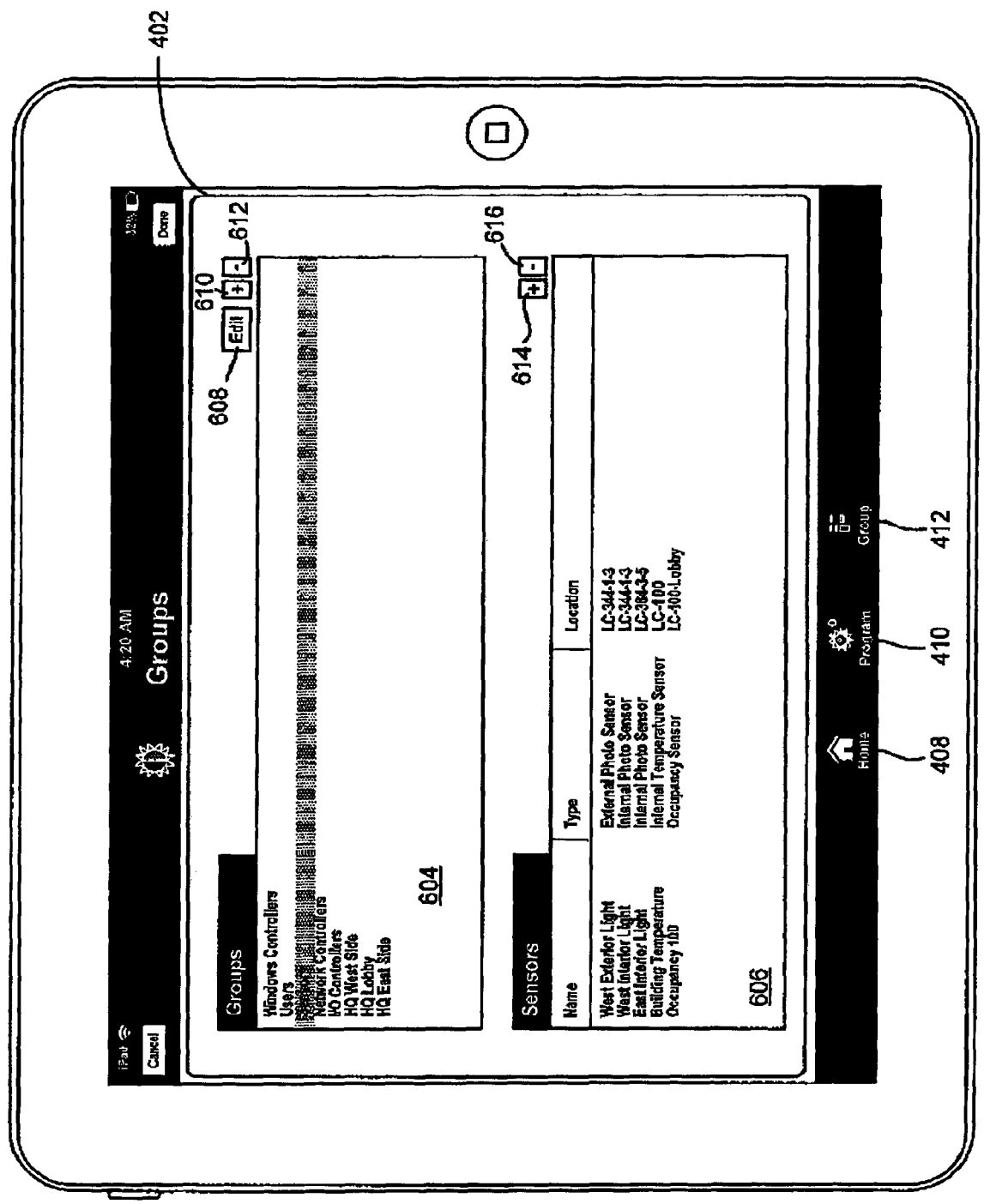
FIGS. 6A-6E are screen shots of an application user interface for grouping of devices on a network during commissioning, for example.
Figure 6B:
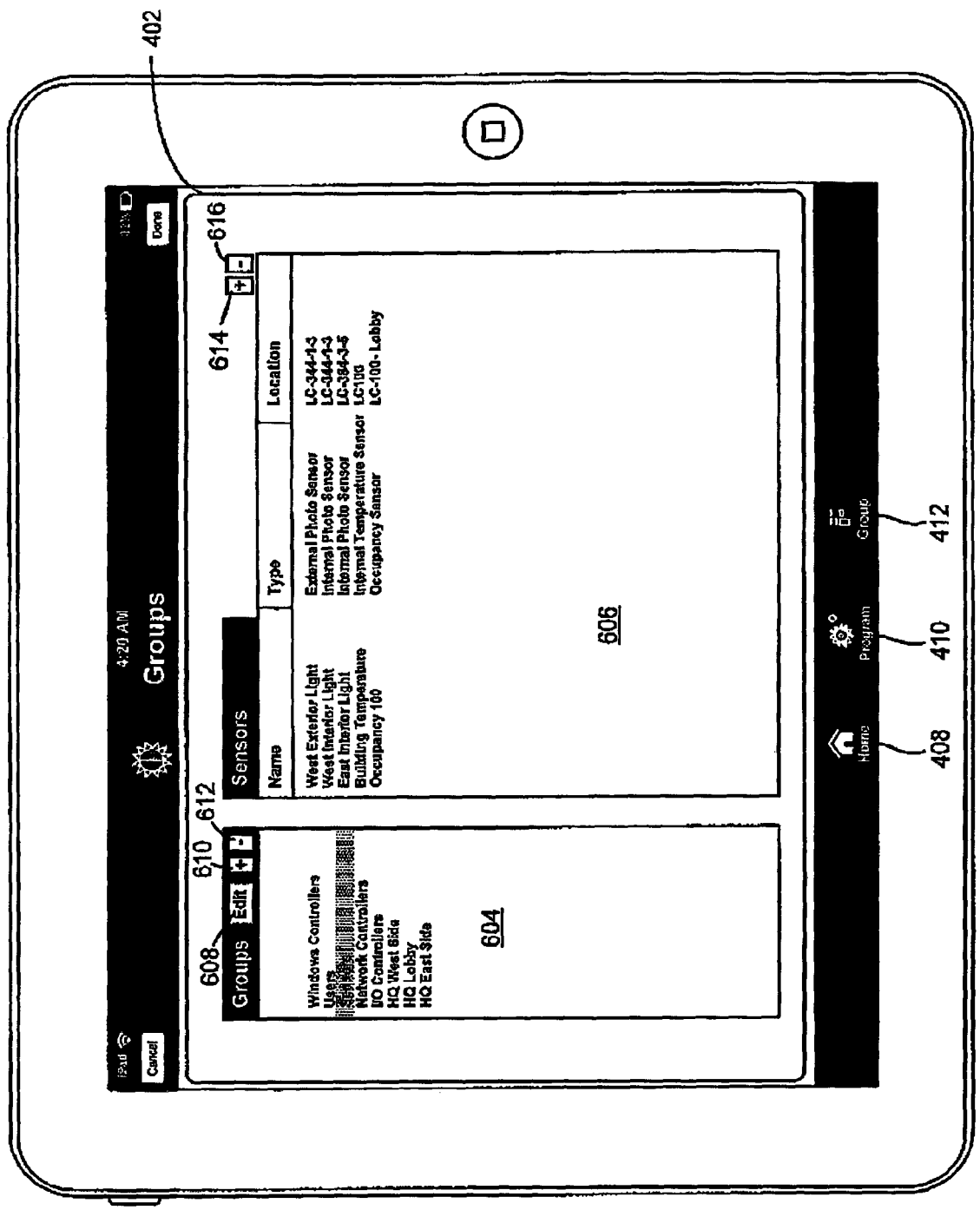

FIGS. 6A and 6B depict two tablet screen views for presenting the same information concerning available groups and devices contained within those available groups. As explained, "groups" are typically collections of devices under the control of a network window controller which interfaces with the application running on the remote device. In some cases, grouping is conducted as part of the device commissioning process. In the examples of FIGS. 6A and 6B, the remote device is a portable tablet having a display screen 402. The application is currently displaying a group screen that is reached by selecting the group button 412. The user can navigate to other screens including the home screen and the program screen by selecting buttons 408 and 410 respectively.

The group screen is shown with two panels, a list of groups panel 604 and a list of group devices panel 606. In the list of groups panel 604, all available groups accessible by the application are depicted. At any instant in time, only one of these groups is highlighted. In the screenshot of FIG. 6A, a "sensors" group is currently selected. The user can edit the selected group by actuating an edit button 608 and taking associated actions thereafter. For example, the user may rename the group, add or delete devices from the group, etc. The user may also add and delete groups by selecting buttons 610 and 612, respectively. When the user chooses to add a new group, after activating button 610, he or she will be required to name that group and define the devices contained within that group.

Panel 606 depicts a list of devices contained within the group currently selected in panel 604. The user can add or delete members of this device list by activating buttons 614 and 616, respectively. When the user selects button 614, the user interface presents a menu or other feature identifying the types and locations of devices that can be available for inclusion in the selected group. The available devices are normally limited to devices that have been previously inventoried as part of the commissioning process.

Note that FIGS. 6A and 6B present the same information, but in different orientations. In FIG. 6A, the list of groups panel 604 and the group devices panel 606 are arranged vertically. In FIG. 6B, they are arranged horizontally.

Figure 6C:
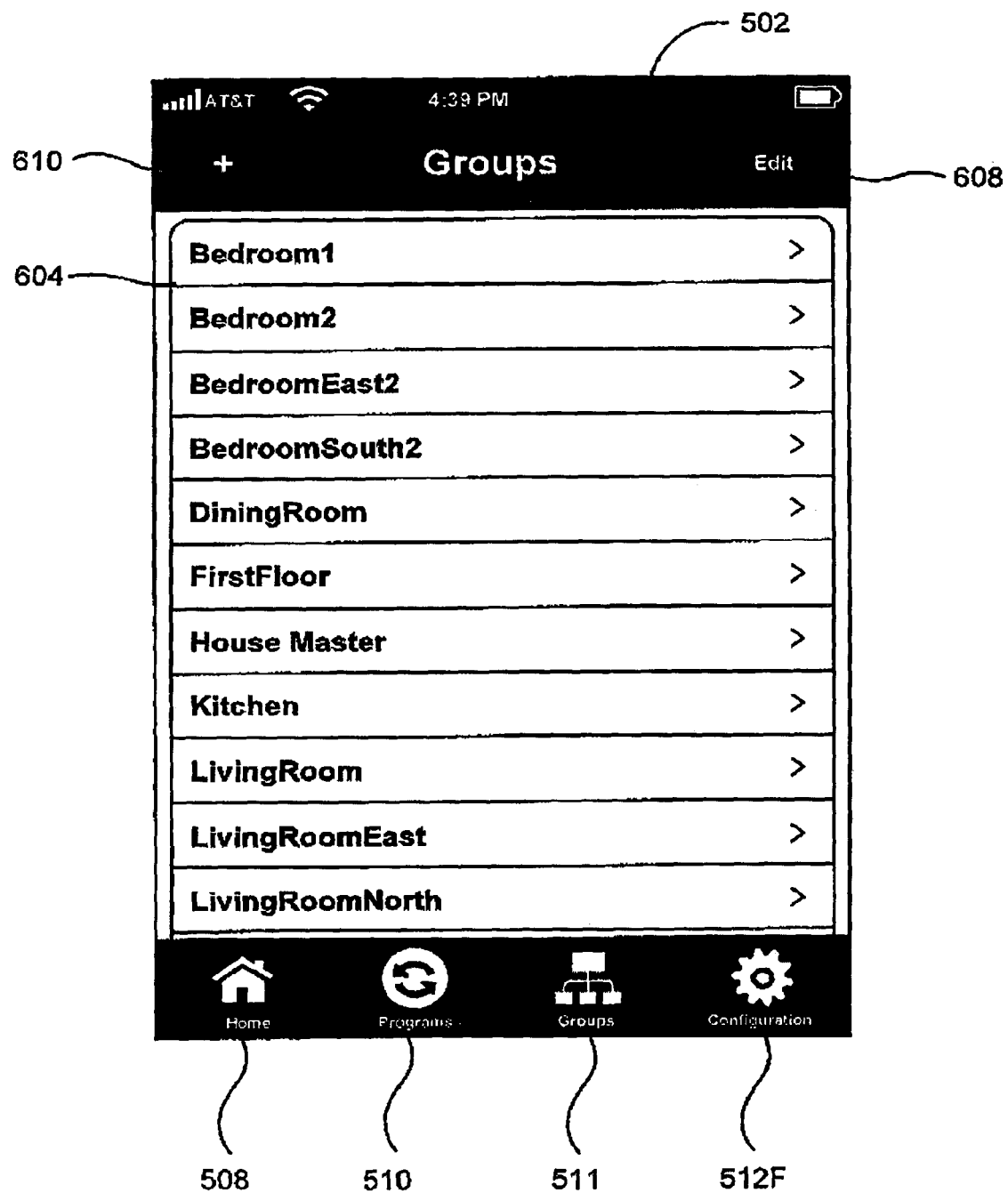
Figure 6D:
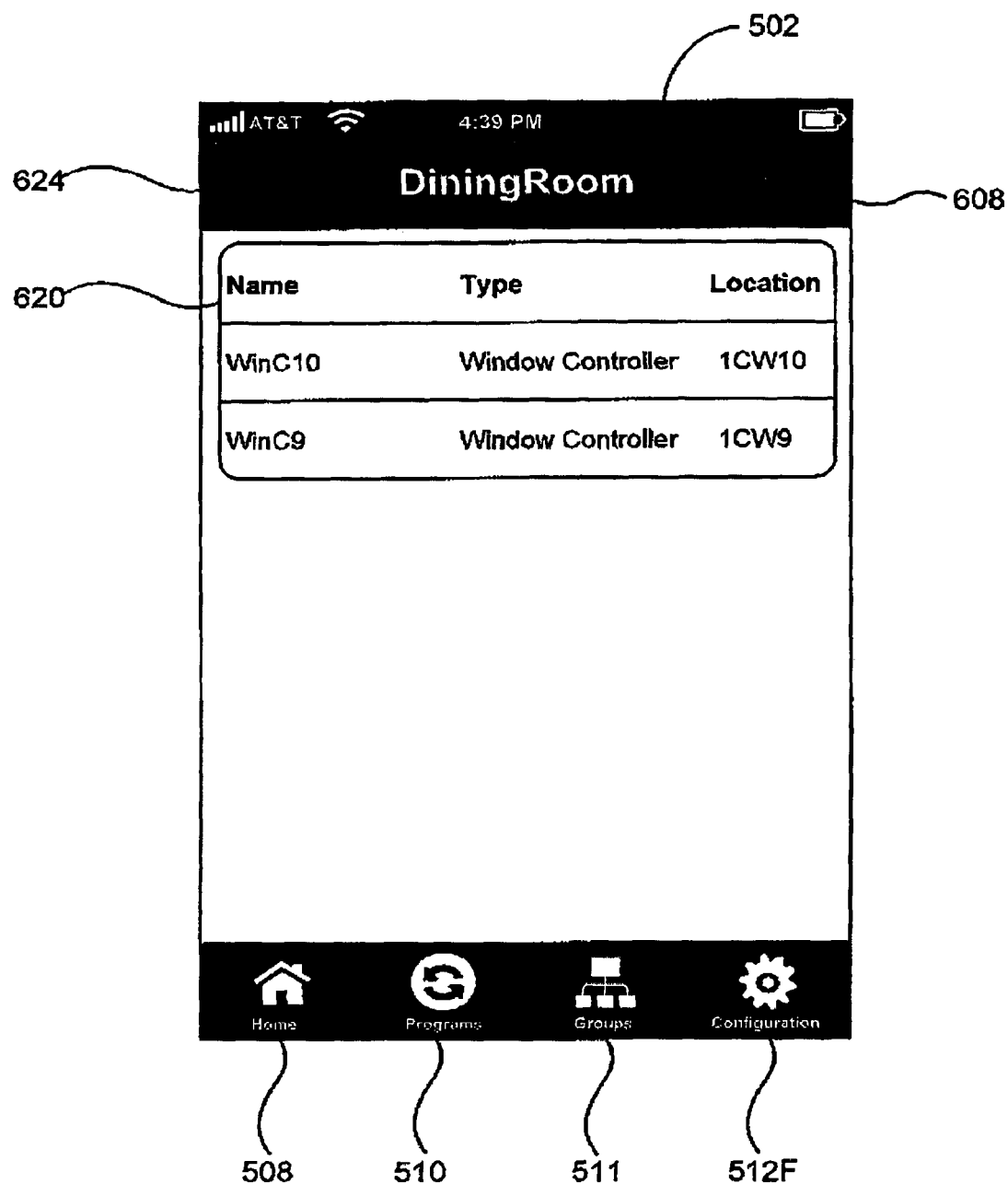
Figure 6E:
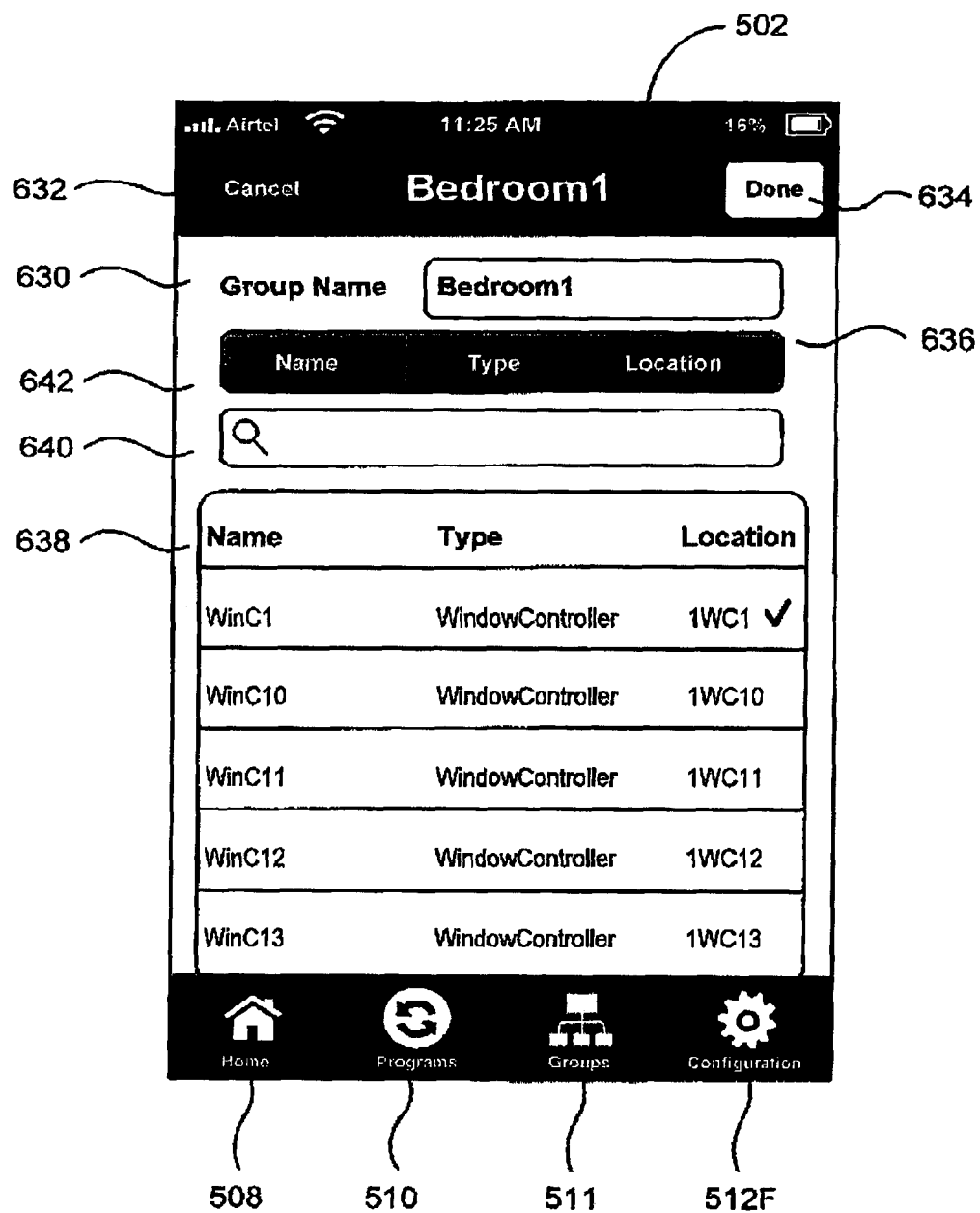

FIGS. 6C-E depict three views of a list of groups panel 604 on a smart phone display 502, as alternative embodiments to the interface of FIG. 6A-B, for displaying, defining, and editing groups. The list of groups panel 604 in FIG. 6C is activated through the "Groups" button 511, and the list in FIG. 6C includes various available groups. Selection of a specific group provides further information and editing function for that group as illustrated in FIG. 6D. An "Edit" button 608 is located on the upper right corner of the screen, which allows a user to access a screen for editing the list of groups. An "add" button 610 located at the upper left corner of the screen allows a user to activate a window to add a new group as shown in FIG. 6E.

FIG. 6D is a screen view of group information panel 620 about the "DiningRoom" group, which can be accessed by choosing the specific group in the list of groups panel 604 in FIG. 6C. The group information panel 620 displays the name, type, and location of various devices belonging to the selected group. By activating the "Edit" button 608 located at the upper right-hand corner of the screen, the user can add new devices to or remove existing devices from the group. The user can also return to the group information panel 604 by clicking the cancel button 624.

FIG. 6E is a screen view of a new group panel 630, which can be activated by clicking the "add" button 610 in the group screen in FIG. 6C. The new group panel 630 allows the user to name a new group and select various devices in the window system. In this example, a new group "Bedroom 1" is named by entering the group name in an indicated group name space 636. The new group panel 630 includes a device subpanel 638 providing a complete list of devices in the windows system, each of which can be selected on the selected by clicking the item corresponding to the device. As shown here, the "winC1" device is selected for the group. The device subpanel 638 displays the name, type, and location of the device. The device list can be filtered by entering keywords in a search box 640. A user can rank the device list by name, type, or location by selecting one of the three buttons 462 representing the device attributes. The user can save the new group information by clicking the "Done" button 634, and/or return to the group information panel 604 by clicking the cancel button 632.

FIGS. 7A-E depict screen views of user interfaces for a "schedule-based" program for automatically controlling the window or windows in a group in accordance with a preset schedule. The depicted screens of user interfaces allow the user to adjust various parameters associated with the schedule.

Figure 7A:
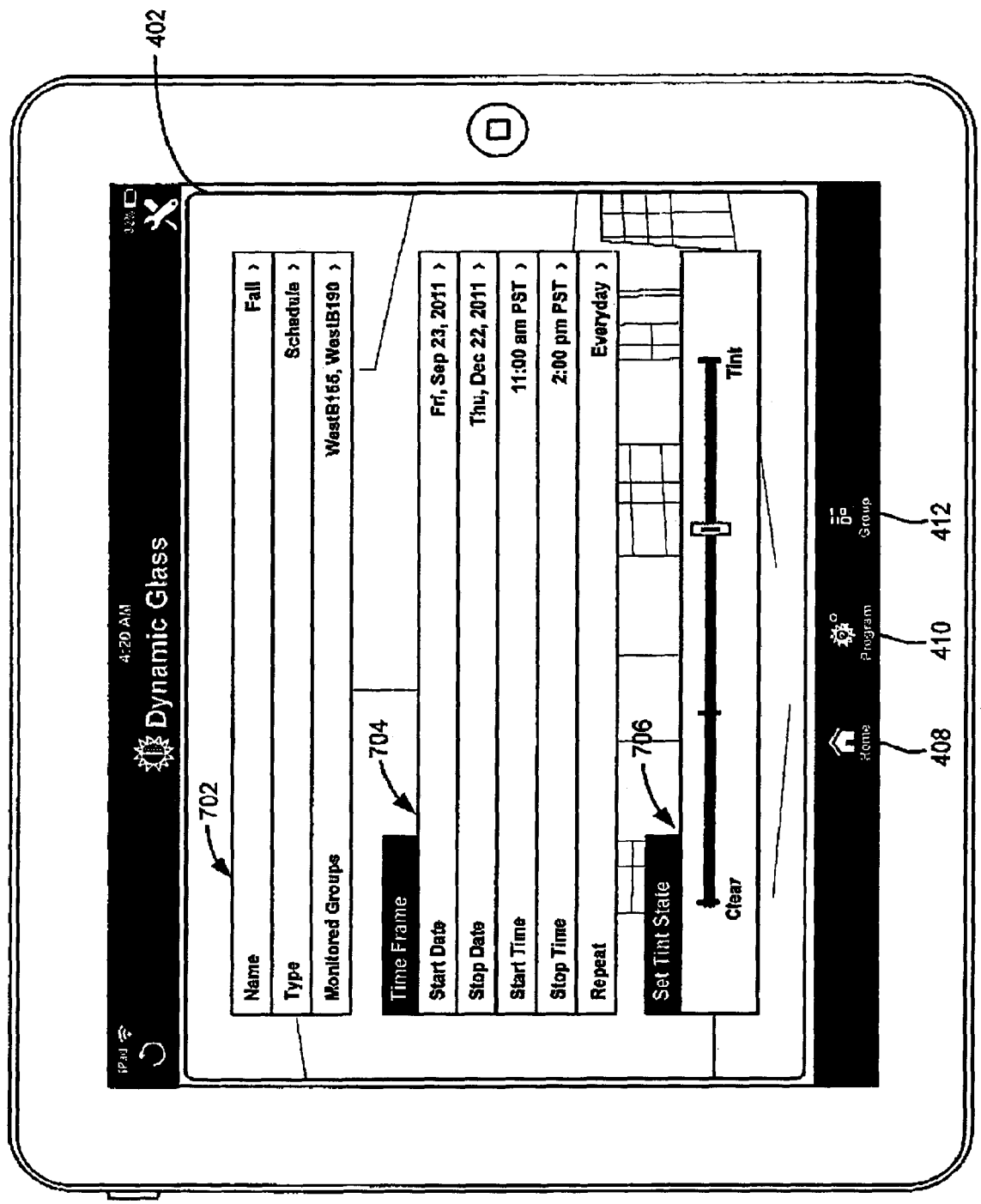
FIGS. 7A-E are screenshots depicting user interfaces for entering or editing schedule based rules for window control applications.
Figure 8A:
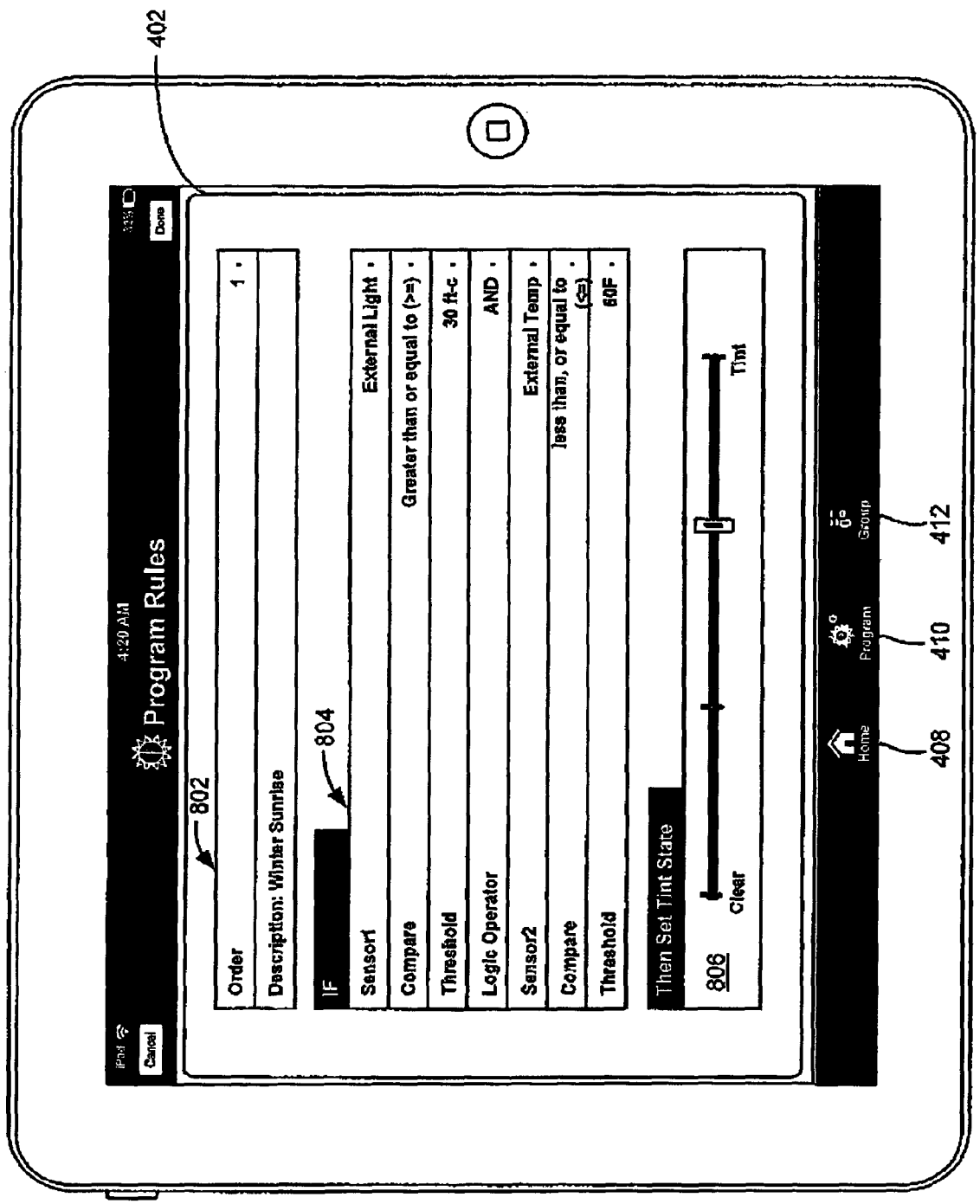
FIGS. 8A and 8B are screenshots depicting a user interface for entering or editing sensor based rules for a window control application.
Figure 8B:
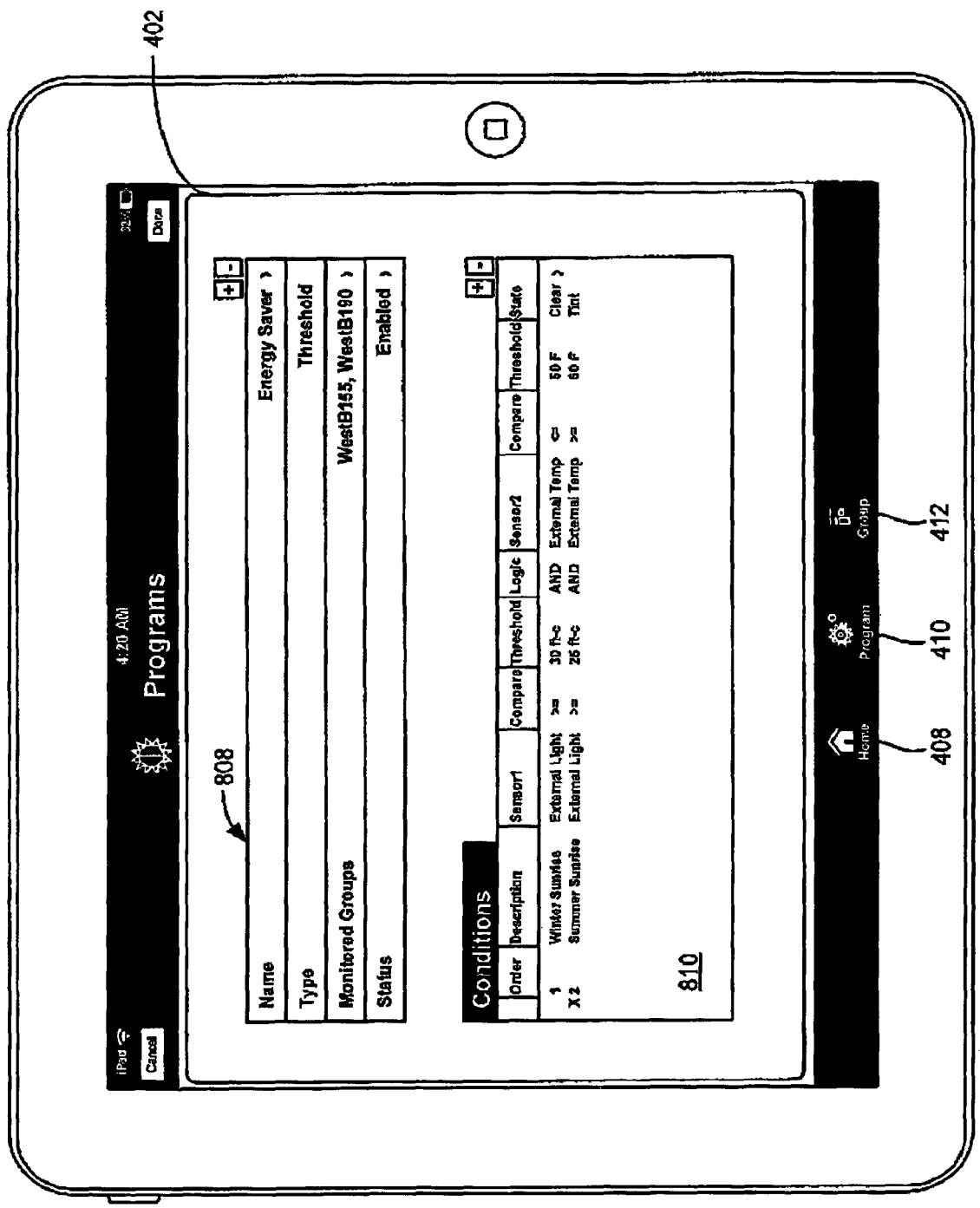

As depicted in FIG. 7A of a tablet based application, the tablet screen 402 displays a top panel 702, a "Time Frame" panel 704 and a "Set Tint State" panel 706. The top panel 702 includes the name of the program ("Fall" in this example), the type of program (e.g., schedule program versus sensor program), and the groups monitored or controlled by the schedule program. In certain embodiments, the user can set the type of program and the groups operating under the control the program.

The Time Frame panel 704 allows the user to set start and stop dates associated with the schedule, start and stop times for each day the schedule program is active, and the unit of repetition associated with the schedule. In the depicted example, the schedule repeats every day. Other alternatives that may be presented to the user include, for example, weekdays and weekends. In certain embodiments, the user interface may allow the user to set multiple start and stop times over the course of a day. Thus, for example, while Time Frame panel 704 shows only one start time and one-stop time. In alternative embodiments, the panel may show two or more start times and correspondingly two or more stop times, as such is the case in the example shown in FIG. 7C.

In the Set Tint State panel 706, the user is permitted to select a particular tint state to be applied during the time frame set in panel 704. In the depicted example, the user has selected an intermediate tint state for use between 11 AM and 2 PM Pacific Standard Time during the days of autumn.

Figure 7B:
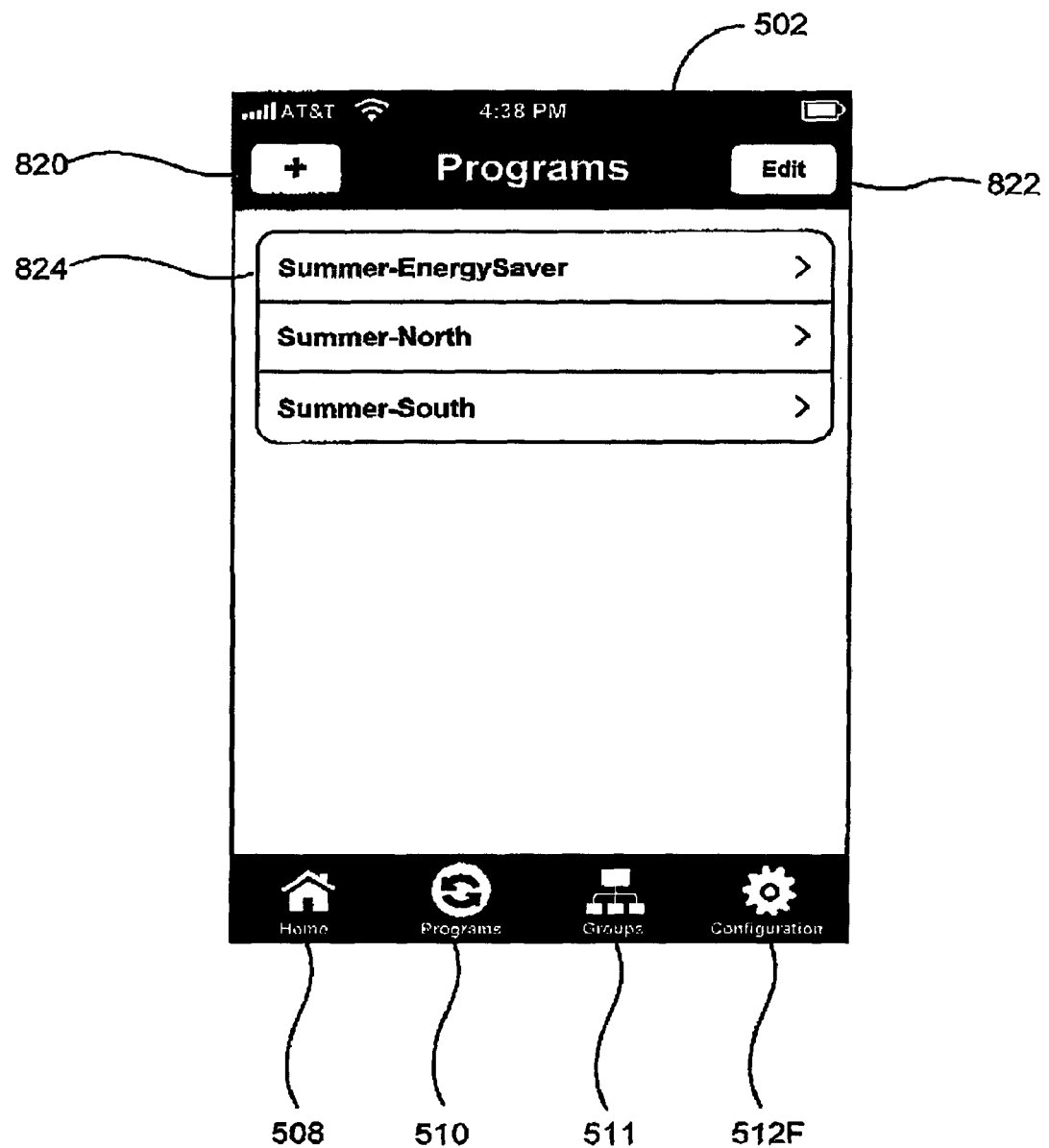
Figure 7C:
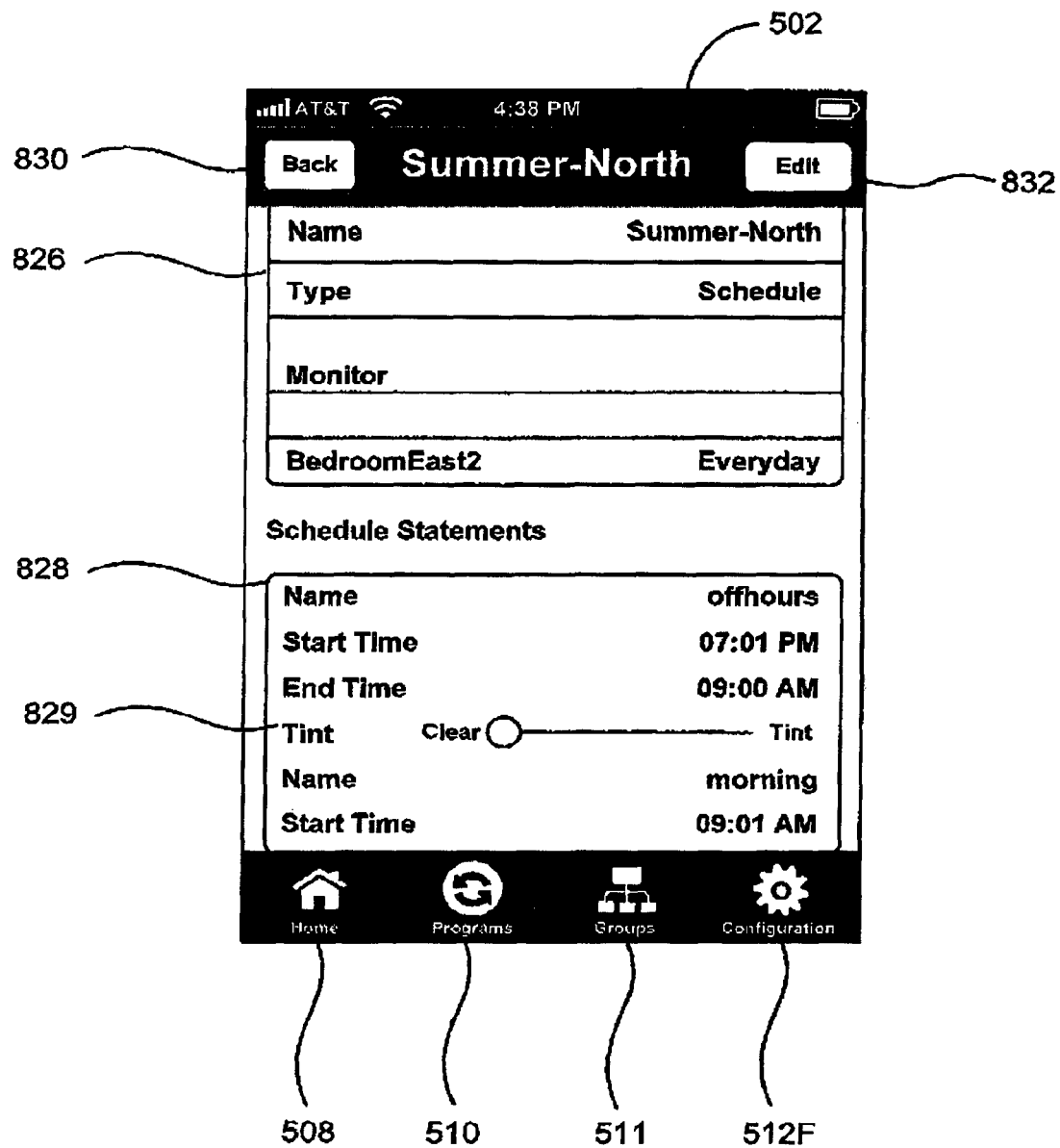

FIGS. 7B-E depict a user interface implemented on a smartphone display 502 for viewing, defining, and editing schedule based programs. FIG. 7B shows a programs screen 824 activated by pressing the programs button 510. This example, the programs screen 824 displays a list of user or system predefined automatic programs. The user can start to add a new program by clicking the "add" button 820, or start to edit the list of programs by clicking the "Edit" button 822. By selecting a specific program displayed in the list, the user can access the detailed information about the selected program, as shown in FIG. 7C.

Figure 7D:
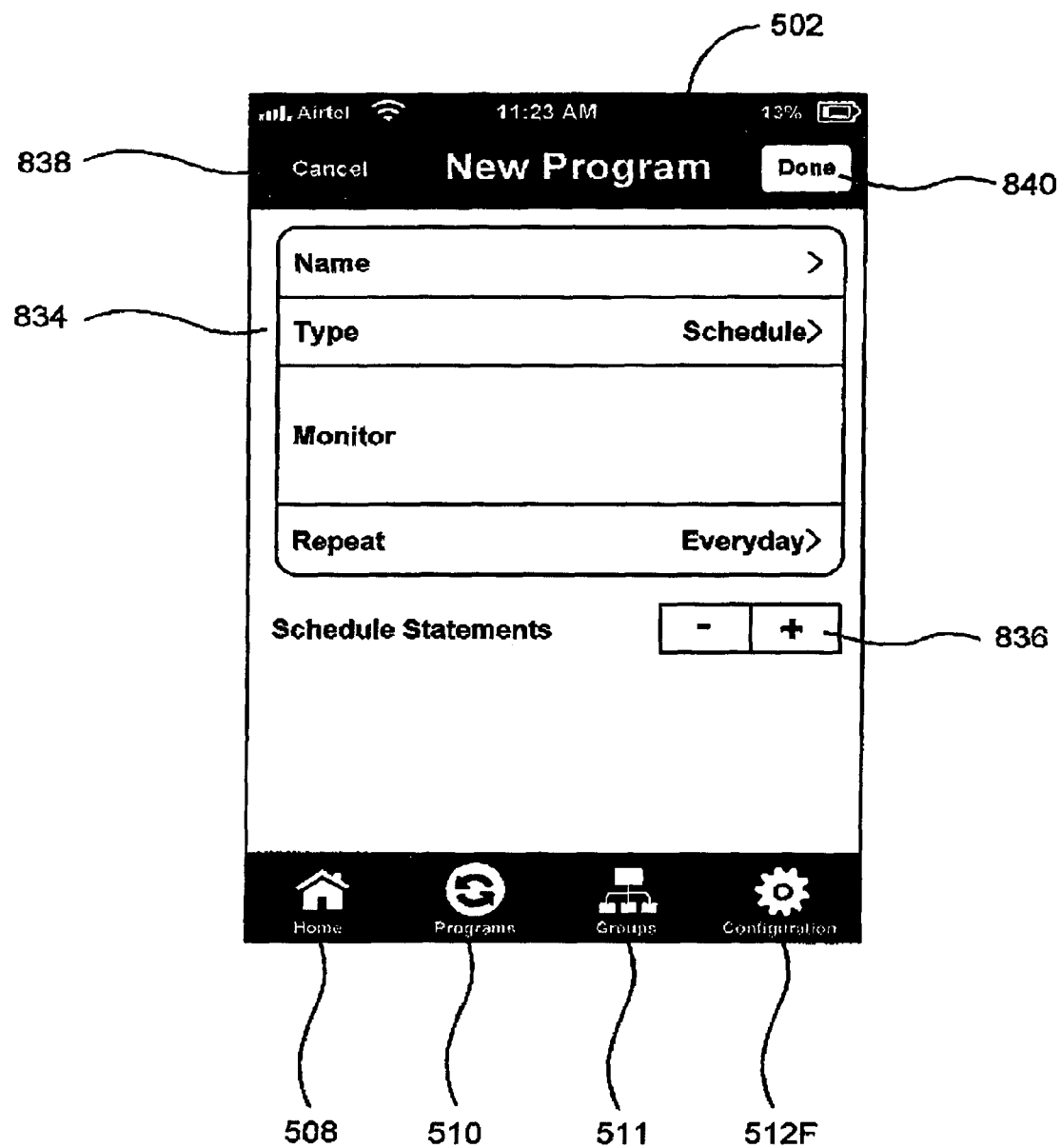

As illustrated in FIG. 7C, the detailed information of a program is shown by a program attributes subpanel 826 and a schedule statements subpanel 828. The program attributes subpanel 826 shows the name, type, monitored groups and devices, and repeating intervals for specific program, and is example, the "Summer-North" program. The schedule statements subpanel displays the schedules in this program. In this example, the program includes multiple time periods, the first being "off hours" period starting from 7:01 PM to 9:00 AM, with window tint set to a clear level as indicated by a sliding tint bar 829. The program also includes a "morning" period starting at 9:01 AM associated with a different level of tint (not shown). A user can edit various information displayed in the program attributes subpanel 826 and the schedule statements subpanel 828 by clicking the "Edit" button 832, such information includes, but is not limited to, name of the program, repeating interval, name of the period, start and end time of the period, and tint level for the period. By clicking the "Back" button 830, the user can go back to the programs screen 824 of FIG. 7B. FIG. 7D shows a new program panel 834 that allows a user to define a new program. The user can activate the new program panel 834 by clicking the "Add" button 820 in the program screen 824 shown in FIG. 7B. The user can define a name, type, monitored devices, and repeating periods of the program in the new program panel. Furthermore, the user can add or subtract a period for this program, wherein the period has the same parameters as shown in the schedule statements subpanel 828 of FIG. 7C. The user can save a newly defined program by clicking the "Done" button 840, or cancel the operation and go back to the programs screen 824 of FIG. 7B.

Figure 7E:
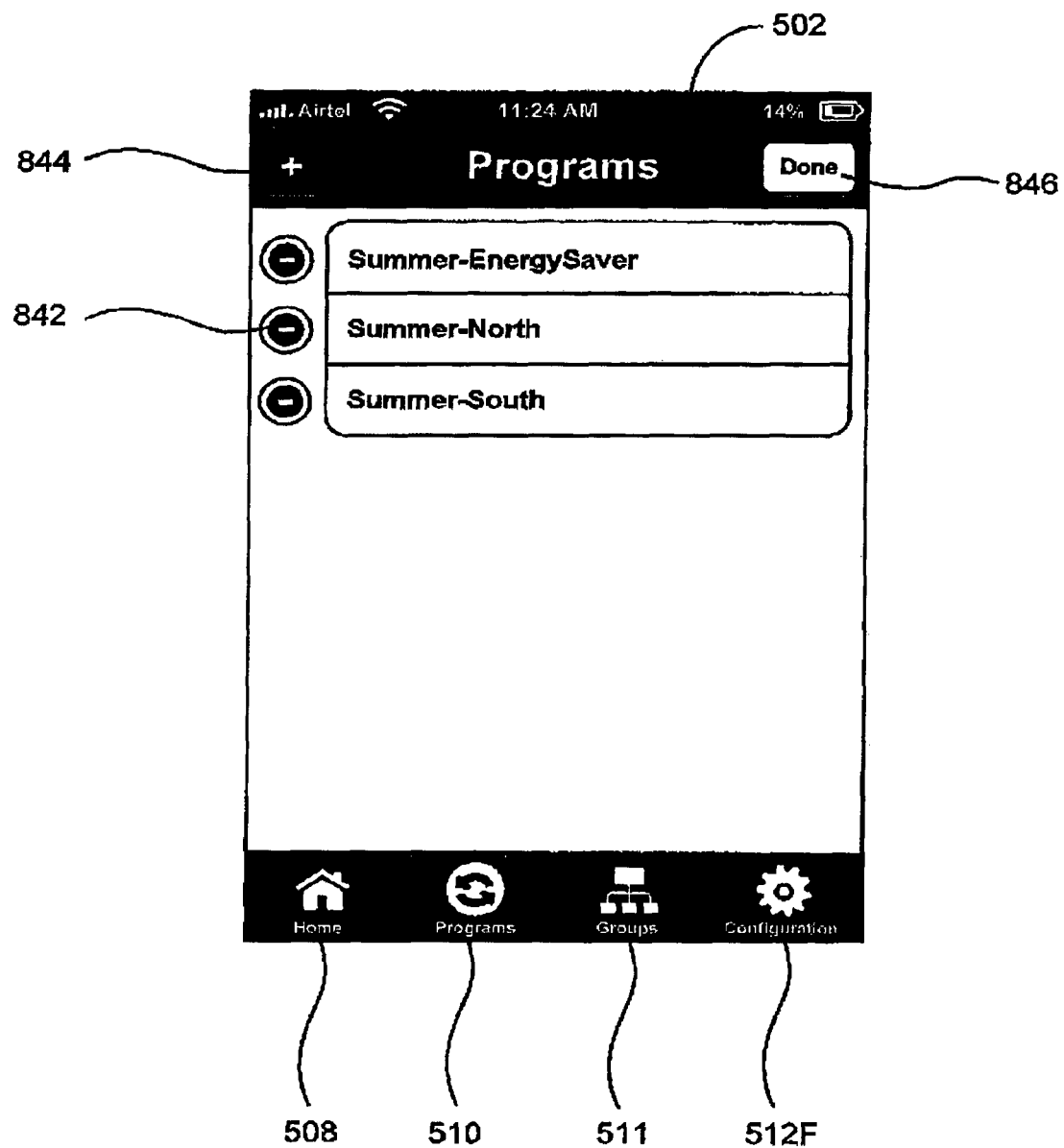

FIG. 7E shows an edit program panel 842 that allows a user to define a new program. The user can activate the edit program panel 842 by clicking the "Edit" button 822 in the program screen 824 shown in FIG. 7B. Here, the user may delete the program by clicking one of the delete buttons in the edit program panel 842 or start to add a new program by clicking the "Add" button 844. By clicking the "Done" button 846, the user can return to the programs screen 824 of FIG. 7B.

FIGS. 8A and 8B depict user interface program screens that permit the user to create or modify a sensor-based program and/or the conditions used in such program. The user interface screens are depicted on a tablet display 402.

The screen depicted in FIG. 8A includes a name and priority panel 802, a set of sensor conditions panel 804, and a result panel 806. The name and priority panel 802 specifies the name of the program condition in question and its priority. The priority is illustrated in a horizontal bar titled "order" with an associated pick list of priority values. The sensor conditions panel 804 includes a list of sensors that the user has selected for the sensor-based program in question. The user is permitted to select these sensors from among those associated with the group to which the program will apply. In the depicted example, there are two sensors identified in panel 804. The program condition employing these sensors defines conditions for applying the current values from these sensors in an algorithm that compares the sensor values against particular thresholds. In the depicted example, the user has selected an external light sensor as "Sensor1" and defined a condition in which output of Sensor1 is compared against a threshold of 30 foot-candles. Similarly, the user has defined an external temperature sensor as "Sensor2" and defined as a condition the comparison of the external temperature to a threshold of 50° F. Further, the user has set as a first condition a requirement that the value of Sensor1 is greater than or equal to the threshold of 30 foot-candles. Additionally, the user has set a second condition in which the value of Sensor2 is less than or equal to the threshold of 50° F. When both of these conditions are met (as indicated by the logic operator "AND"), the result specified in panel 806 will apply. As shown, the user has shown that control state to be an intermediate tint state.

FIG. 8A depicts a screen that allows a user to define a single sensor-based rule. In various embodiments, there will be two or more sensor-based rules (and possibly schedule-based rules as well) that are potentially applicable at any instant in time. Collectively the rules may serve as a "program." These rules may each have their own associated priority, which indicates the order in which the rule is to be considered before applying it. This aspect of the rules is further illustrated in FIG. 8B where a conditions panel 810 lists multiple rules as well as their associated priority and underlying algorithm. In the depicted embodiment, a rule named Winter Sunrise is given a higher priority than a rule named Summer Sunrise. With this arrangement of rules in a program, the network controller and/or the associated application will, at any instant in time, first consider whether the conditions of Winter Sunrise apply. If they do, the control state of Winter Sunrise will apply. If, however, the conditions of Winter Sunrise do not apply, then the application and/or the network window controller will consider the conditions of Summer Sunrise. If these apply, then the control state of Summer Sunrise will be implemented. Multiple additional rules may be employed to create a list of three, four, five, or more such rules. These rules and their associated priorities collectively comprise a program named Energy Saver as shown in panel 808 of FIG. 8B. Panel 808 additionally shows the status of the program (enabled or disabled), the group or groups that respond to the program, and the type of program. Options for type include threshold comparisons, as well as more complicated programs such as those based on linear or non-linear equations with coefficients, mean values of parameters, etc.

Situations where Requests from Applications are not Honored

In certain embodiments, requests to control or monitor devices via a window control application may be denied or overridden when necessary to effect a policy, a decision by a higher priority user, or the like. In some cases, the decision to override is made by arbiter logic executing on the network (e.g., a network window controller). In some implementations, a decision to override a user's attempted action is conveyed to the user through a message delivered via the application's user interface. See FIG. 1E and the associated discussion for a simple example.

As mentioned above, some application users may be given higher priorities than others. Such priority differences can provide a convenient way to arbitrate between conflicting commands for controlling the same device but issued from two different application user interfaces, one command from an interface for a low priority user and another from an interface for a higher priority user. In various embodiments, the command issued from the interface for the lower priority user would not be honored by the window network. Additionally, commands issued from certain users or systems will take precedence over conflicting commands regardless of whether such users or systems operate using a window management application. For example, a building manager or other high level building administrator may issue commands without using a window control application, and such commands will be given priority over any conflicting command issuing from an application used by a lower priority user. Similarly, certain instructions issued from a building management system or other high level power management system for a building may automatically take precedence over conflicting commands issued from an application.

The following are some examples of situations where a user's control request presented via a device control application is denied or overridden.

1. A peak load signal is received from energy utility during a hot day and the BMS or facilities manager overrides all commands or rules issued via applications, and forces all windows to tint to save energy on an air conditioning load.

2. A facilities manager is conducting upgrades or maintenance and does not want any interference caused by spurious commands issued by applications.

3. There is a pre-scheduled power outage, and a facilities manager decides to clear all windows to let more natural light in while power is out.

4. A heating system is down during winter and a facilities manager decides to bring in more solar energy into the building.

5. A building's air conditioning system is broken, and the facilities manager decides to keep all the heat out by tinting all or many windows.

In the list of scenarios for overriding user control, the first one indicates that a command from an application may be overridden when a peak load signal from energy utility is received. For example, on a day when utility energy consumption is very high due to increased heating or air-conditioning loads, the utility may send out a signal to its large customers such as commercial buildings indicating that energy consumption should be reduced. In some cases, the utility may charge more for energy while operating under the conditions. The network controller of a building that receives such signal may automatically take actions to block some or all instructions from an application that are inconsistent with the need to reduce energy consumption. For example, the network controller may automatically force the windows to remain tinted regardless of instructions from an application to make the windows transparent. In other embodiments, a network administrator or other superuser may program the network controller to prevent user override of the low-energy consumption settings.

More sophisticated implementations of network override of user actions are possible. Some have to do with policies for ensuring energy conservation policies. Other policies may be in place to protect windows or other devices from damage under certain conditions. One example of a policy intended to protect or preserve the long life of the window is one that requires that a window switch state periodically even if an automated network controller or a user controller does not indicate that a switch of states is warranted. For example, it may be desirable to have a windows switch tint states at least every 15 hours in order to lengthen the window life. To this end, the network controller may override a user command that would have the window in a single state for 15 hours. In one example, the network controller simply cycles the window through transition in the middle of the night to ensure that it transitions at least once every 24 hours. Alternatively, the controller can send the window through a transition once before business hours and again after business hours.

In another example, a network policy may require that the windows not be in a highly tinted state when they might be exposed to a strong escalation radiant solar energy exposure and potentially undergo thermal shock. For example, a policy may require that east facing windows in the building not be in a state of more than a defined level of tint during a time beginning 10 minutes before sunrise and ending one half hour after sunrise. Any application issued rule or manual attempt to configure an east facing window such that it exceeds the tint threshold during this duration would be rejected by the window controller.

Examples of Adaptive Control

In certain embodiments, the logic for controlling optical switchable devices infers that a new rule should be suggested or that a change to an existing rule should be suggested. The logic making this inference and suggestion may be implemented solely within a control application or with such application in conjunction with a network controller, particularly with software executing thereon. A simple schematic representation of such adaptive control is depicted in FIG. 1F and the associated discussion.

Figure 9:
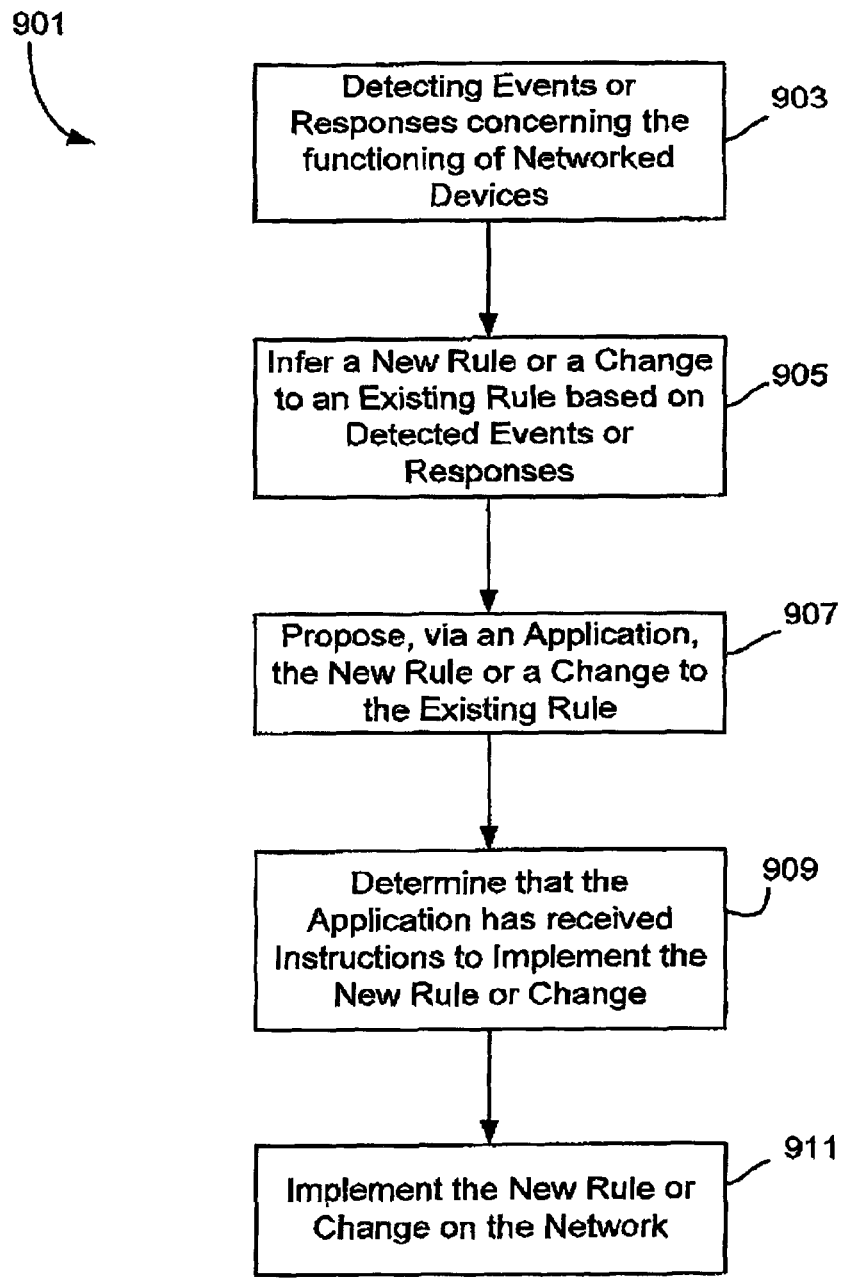
FIG. 9 is a flow chart depicting an adaptive control algorithm implemented with the aid of a window control application.

Examples of two types of adaptive control are (1) inferring control behavior from user actions (e.g., repeated manual operations) and (2) inferring control behavior from the environment (e.g., by monitoring sensors and/or power consumption). An example of an adaptive control procedure is depicted in the flow chart of FIG. 9. As shown there, a procedure 901 begins with the application and/or associated logic detecting particular events relevant to the functioning of the devices on the network. See block 903. Such detected events are typically repeated events from which a result or behavior can be inferred by the process of induction. See block 905. From this result or behavior, the application and/or associated logic proposes a rule to a user via a user interface in the application. See block 907. Thereafter the application and/or associated logic determines whether the user has accepted the proposed rule by responding through the user interface. See block 909. If the user has accepted the proposal, the network controller (or other appropriate entity) implements the proposed rule. See block 911

In certain embodiments, from the application's or network controller's perspective, the adaptive control logic may observe that a user is taking the same actions in a consistent manner—e.g., at the same time each day. The adaptive control logic then infers that a rule (schedule or sensor based for example) may be applied to implement consistent results that have been observed. The logic then develops the new or modified rule and suggests it to the user via the user interface on the remote device. The application then waits for a response from the user, which response elects to adopt the suggested rule, reject the suggested rule, or, as permitted in some implementations, modify the suggested rule. If the proposed rule is accepted or modified, the adaptive control logic then implements the accepted rule.

A few examples of adaptive control follow.
1. A user preference for tint level as a function of day/time is determined by monitoring and then used to override an automated setting. (e.g., user Jeff is in now in room 22 on the $3^{rd}$ floor, and it has been observed consistently that he likes the glass partially tinted when he is in this room.)
2. Monitoring of the effect of powering on/off air conditioning to determine the impact of a building's thermal mass on its response to air conditioning, and, based on this impact, giving the air conditioning command to turn off/on in anticipation of the impact of the building's thermal mass. More generally, the adaptive control logic determines how fast or slow the temperature in one or more locations within a building responds to a change in a driver. Drivers may be air conditioning, heating, and solar radiation allowed in or blocked by windows.
3. The adaptive control logic determines that optimal settings for glass states change due to shadowing or reflection from a new neighboring building or from shadowing from tree. This effect may be inferred from a user (or multiple user's) window tint adjustments to compensate for the new building or tree. Using this inference, the adaptive control logic proposes a change to the tinting algorithms in the effected rooms.

Regarding the use of adaptive control logic to characterize the response of a building, some further points may be instructive. Commands to change lighting or window tinting provide an immediate effect on the radiation in a room. Temperature changes controlled by air conditioning or heating are slow by comparison. The temperature response is due in some measure to the thermal mass of a building. Unfortunately, the thermal mass varies widely from building-to-building and even from room-to-room within a building. To address this issue, adaptive control logic may monitor temperature response times after heating or air conditioning systems are powered on or off. From this information, the logic can characterize the response times of the building or portion of a building. Note that the response information from within the building may be obtained with the aid of a network controller.

In another example, an energy model for a particular season suggests that east facing windows of a building should be tinted at 9:00 AM. However, the application and/or network controller determine from monitoring of sensors that the east facing rooms receive more solar energy than expected prior to 9:00 AM. In fact, the rooms become too hot too early and require cooling to maintain a comfortable temperature. Based on this insight, the adaptive control logic determines that it should propose an adjusted tinting rule in which the east facing windows are tint at 8:30 AM, rather than 9:00 AM to conserve energy. Assuming that the user of the application accepts this proposal, the application and/or network controller will continue to monitor the early morning temperature in the east facing rooms. If it is found that there is still too much solar energy flowing through the east facing windows, the application may propose a further adjustment to the rule in which tinting occurs at 8:00 AM.

Example Application Programming Interface API for a Window Control Application

In certain implementations, an application programming interface (API) is provided for window control applications. Such API may be used to develop applications for various remote device platforms including Microsoft Windows™, iPhone, and Android. Through such API internal developers, 3rd party developers, and systems integrators can implement new applications or extend existing applications to monitor and control optically switchable devices on a network.

In certain embodiments, the API provides portability and interoperability with common mobile, web, and embedded computing environments. The API is not tied to any specific language. Different platforms have different language requirements; e.g., objective C is typical of iOS, Java is typical of Android, etc. The API is generalizable to any language.

The API is typically used to create a layer of abstraction that separates application-level task and presentation logic from the underlying security, storage, communications, networking, and device-specific protocol layers comprising the management infrastructure for a building or other structure. The API allows clients to create, delete, view, and modify management objects without regard to their physical location and native access details.

Conclusion

Although the foregoing embodiments have been described in some detail to facilitate understanding, the described embodiments are to be considered illustrative and not limiting. It will be apparent to one of ordinary skill in the art that certain changes and modifications can be practiced within the scope of the appended claims.

What is claimed is:
1. A system for controlling a plurality of windows, the system comprising:
a plurality of sensors associated with the windows;
at least one first control system of the windows;
one or more second control systems of a plurality of window controllers coupled to the windows; and
one or more third control systems, each including a command and communication device coupled to at least one of the window controllers; wherein
the first control system is configured to control one or more of:
(a) transmissivity of the plurality of windows based on sensor information from sensors of the windows,

(b) direction from the second control systems to the plurality of window controllers; and
(c) direction from the third control systems to the plurality of window controllers;

the second control systems and the third control systems are configured to direct, in cooperation with the plurality of windows, the transmissivity of the plurality of windows;

the third control systems are configured to direct, in cooperation with the plurality of window controllers and the plurality of windows, the transmissivity of the plurality of windows, based on the sensor information from the sensors of the windows or information obtained from a network to which the command and communication device is coupled; and one or more of the first control system, the second control systems and the third control systems are configured to infer a new rule for controlling optical states of the plurality of windows based on a monitored history of user instructions and the sensor information.

2. The system of claim 1, wherein the first control system includes a network window controller, the second control systems include an intermediate level window controller, and the third control system includes a low level window controller.

3. The system of claim 1, wherein the system is configured to control the plurality of windows based at least in part on weather information gathered from the network.

4. The system of claim 1, wherein the sensor information includes sensor information from light, image, sound or temperature sensors of one or more of the plurality of windows.

5. The system of claim 1, wherein one or more of the first control system, the second control systems and the third control systems are configured to control the plurality of windows based on a user input.

6. The system of claim 1, wherein the first control system, the second control systems and the third control systems are configured to cooperate to control the plurality of windows based on a combination of sensory input from the windows, user input, and information from the network.

7. The system of claim 1, wherein the first control system, the second control systems, and the third control systems are configured to cooperate to control temperature of an interior of a building by controlling transmissivity of the plurality of windows.

8. The system of claim 1, wherein one or more of the first control system, the second control systems, and the third control systems are responsive to inputs received from a remote device communicatively coupled with one or more of the first control system, the second control systems and the third control systems.

9. The system of claim 1, further comprising logic for using the information provided by the plurality of sensors to determine whether to change a state of at least one of the plurality of windows.

10. A method for controlling a plurality of windows, the method comprising:
controlling, from at least one first control system one or more of:
(a) transmissivity of the plurality of windows, based on sensor information from one or more sensors associated with the windows,
(b) direction from a second control system comprising a plurality of window controllers coupled to the plurality of windows; and
(c) direction from a third control system of a command and communication device coupled to one or more of the plurality of window controllers;

directing, from the second control system, in cooperation with the plurality of windows, the transmissivity of the plurality of windows; and directing, from the third control system, in cooperation with the plurality of window controllers and the plurality of windows, transmissivity of at least one of the plurality of windows, based on the sensor information or information obtained from a network to which the command and communication device is coupled; wherein one or more of the first control system, the second control system and the third control system are configured to infer a new rule for controlling optical states of the plurality of windows based on a monitored history of user instructions and the sensor information.

11. The method of claim 10, wherein the first control system includes a network window controller, the second control system includes an intermediate level window controller, and the third control system includes a low level window controller.

12. The method of claim 10, wherein controlling the plurality of windows is based at least in part on weather information gathered from the network.

13. The method of claim 10, wherein the sensor information includes sensor information from light, image, sound or temperature sensors of one or more of the plurality of windows.

14. The method of claim 10, further comprising overriding, based on a user input, one or more of the first control system, the second control system and the third control system, to control the plurality of windows.

15. The method of claim 10, further comprising cooperating by the first control system, the second control system of the third control system to control the plurality of windows based on a combination of sensory input from the windows, user input, and information from the network.

16. The method of claim 10, further comprising cooperating, by the first control system, the second control system, and the third control system to control temperature of an interior of a building by controlling transmissivity of the plurality of windows.

17. The method of claim 10, wherein one or more of controlling, from the first control system, directing, from the second control system, and directing, from the third control system, are responsive to inputs received from a remote device communicatively coupled with one or more of the first control system, the second control system and the third control system.

18. The method of claim 10, further comprising logic for using the information provided by the sensors to determine whether to change a state of at least one of the plurality of windows.

19. A computer program product comprising a non-transitory computer readable medium storing non-transitory instructions configured to control a plurality of windows, the instructions configured to:
control, from at least one first control system one or more of:
(a) transmissivity of the plurality of windows, based on sensor information from sensors of the windows,
(b) direction from a second control system comprising a plurality of window controllers coupled to the plurality of windows; and (c) direction from a third control system of a command and communication device coupled to one or more of the plurality of window controllers;

direct, from the second control system, in cooperation with the plurality of windows, transmissivity of the plurality of windows;

direct, from the third control system, in cooperation with the plurality of window controllers and the plurality of windows, transmissivity of at least one of the plurality of windows, based on the sensor information or information obtained from a network to which the command and communication device is coupled; wherein one or more of the first control system, the second control system and the third control system are configured to infer a new rule for controlling optical states of the plurality of windows based on a monitored history of user instructions and the sensor information.

20. The computer program product of claim 19, wherein the first control system includes a network window controller, the second control system includes an intermediate level window controller, and the third control system includes a low level window controller.

\* \* \* \* \*